US011943241B2

(12) United States Patent
Ithal et al.

(10) Patent No.: US 11,943,241 B2
(45) Date of Patent: *Mar. 26, 2024

(54) COMPACT CLOUD ACCESS NETWORK BASED ON ROLE-TO-RESOURCE DETECTION WITH RESOURCE STATE CHANGE TRACKING AND PROVENANCE

(71) Applicant: Normalyze, Inc., Los Altos, CA (US)

(72) Inventors: Ravishankar Ganesh Ithal, Los Altos, CA (US); Yang Zhang, Los Altos, CA (US); Mummoorthy Murugesan, Fremont, CA (US)

(73) Assignee: Normalyze, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,161

(22) Filed: Mar. 1, 2023

(65) Prior Publication Data

US 2023/0208861 A1    Jun. 29, 2023

Related U.S. Application Data

(63) Continuation of application No. 18/090,195, filed on Dec. 28, 2022, which is a continuation of application
(Continued)

(51) Int. Cl.
*H04L 9/40* (2022.01)
*G06F 9/451* (2018.01)
(Continued)

(52) U.S. Cl.
CPC .......... *H04L 63/1416* (2013.01); *G06F 9/451* (2018.02); *G06F 16/211* (2019.01);
(Continued)

(58) Field of Classification Search
CPC .................. H04L 63/1416; H04L 63/1433
(Continued)

(56) References Cited

U.S. PATENT DOCUMENTS 8,190,850 B1    5/2012  Davenport et al.
8,392,997 B2 *  3/2013  Chen .................. H04L 63/1433
                                                    709/224
(Continued)

FOREIGN PATENT DOCUMENTS

WO    2017049439 A1    3/2017

OTHER PUBLICATIONS

Samaraweera et al., Security and Privacy Implications on Database Systems in Big Data Era: A Survey, IEEE Transactions on Knowledge and Data Engineering vol. 33, No. 1, dated Jul. 2019, 20 pages.

(Continued)

*Primary Examiner* — Badri Champakesan
(74) *Attorney, Agent, or Firm* — Flagship Patents; Sikander M. Khan; Chris Volkmann

(57) ABSTRACT

A system for streamlined analysis of access sub-networks in a cloud environment is disclosed. The system comprises memory storing access sub-networks in a cloud environment between a plurality of resources and a plurality of users, memory storing user-to-role mappings for roles assigned to the plurality of users, and accumulation logic having access to the access sub-networks and to the user-to-role mappings. The accumulation logic is configured to traverse the access sub-networks to build a number U user-to-resource mappings between the plurality of users and the plurality of resources, and evaluate the U user-to-resource mappings against the user-to-role mappings to accumulate a number R role-to-resource mappings between the roles and the plurality of resources.

18 Claims, 47 Drawing Sheets

Related U.S. Application Data

No. 17/858,903, filed on Jul. 6, 2022, now Pat. No. 11,575,696.

(60) Provisional application No. 63/246,310, filed on Sep. 21, 2021, provisional application No. 63/246,313, filed on Sep. 21, 2021, provisional application No. 63/246,315, filed on Sep. 21, 2021, provisional application No. 63/246,303, filed on Sep. 20, 2021.

(51) Int. Cl.
  G06F 16/21 (2019.01)
  G06F 16/245 (2019.01)
  G06F 16/35 (2019.01)
  G06F 16/95 (2019.01)
  G06F 21/57 (2013.01)
  G06F 21/62 (2013.01)

(52) U.S. Cl.
  CPC ...... *G06F 16/24569* (2019.01); *G06F 16/355* (2019.01); *G06F 16/95* (2019.01); *G06F 21/577* (2013.01); *G06F 21/6227* (2013.01); *H04L 63/083* (2013.01); *H04L 63/102* (2013.01); *H04L 63/104* (2013.01); *H04L 63/1433* (2013.01); *H04L 63/18* (2013.01); *H04L 63/205* (2013.01); *G06F 2221/034* (2013.01); *G06F 2221/2141* (2013.01)

(58) Field of Classification Search
  USPC .......................................................... 726/23
  See application file for complete search history.

(56) References Cited

U.S. PATENT DOCUMENTS

| | | | |
|---|---|---|---|
| 8,402,514 B1* | 3/2013 | Thompson | H04L 63/08 726/4 |
| 8,578,442 B1 | 11/2013 | Banerjee | |
| 8,689,324 B2* | 4/2014 | Bowman | G06F 21/6218 726/4 |
| 9,092,500 B2 | 7/2015 | Varadharajan et al. | |
| 9,910,881 B1 | 3/2018 | Brooker | |
| 10,032,450 B2 | 7/2018 | Olmstead | |
| 10,609,044 B2* | 3/2020 | Andow | G06F 21/16 |
| 11,108,828 B1 | 8/2021 | Curtis | |
| 11,256,661 B1 | 2/2022 | Gassner | |
| 11,271,929 B1 | 3/2022 | McFarland | |
| 11,283,809 B2 | 3/2022 | Bogdanich Espina | |
| 11,422,871 B1 | 8/2022 | Mounirou et al. | |
| 11,461,183 B2 | 10/2022 | Govindan | |
| 11,477,183 B1 | 10/2022 | Brandwine et al. | |
| 2004/0034794 A1* | 2/2004 | Mayer | G06F 21/567 709/224 |
| 2006/0236408 A1 | 10/2006 | Yan | |
| 2006/0242704 A1 | 10/2006 | Aviani | |
| 2007/0180498 A1 | 8/2007 | Choudhary | |
| 2007/0185875 A1 | 8/2007 | Chang | |
| 2007/0226796 A1 | 9/2007 | Gilbert | |
| 2008/0104244 A1 | 5/2008 | Chen | |
| 2008/0288330 A1 | 11/2008 | Hildebrand | |
| 2012/0209997 A1 | 8/2012 | Duan | |
| 2012/0210419 A1 | 8/2012 | Choudhary | |
| 2014/0068718 A1 | 3/2014 | Mureinik | |
| 2014/0201642 A1 | 7/2014 | Vicat-Blanc | |
| 2015/0347683 A1 | 12/2015 | Ansari et al. | |
| 2016/0366183 A1 | 12/2016 | Smith | |
| 2017/0063899 A1* | 3/2017 | Muddu | G06F 40/134 |
| 2017/0078322 A1 | 3/2017 | Seiver | |
| 2017/0155672 A1 | 6/2017 | Muthukrishnan | |
| 2017/0208151 A1 | 7/2017 | Gil | |
| 2017/0299633 A1 | 10/2017 | Pietrowicz | |
| 2018/0232528 A1 | 8/2018 | Williamson et al. | |
| 2019/0228186 A1 | 7/2019 | Atreya et al. | |
| 2019/0243865 A1 | 8/2019 | Rausch | |
| 2020/0007455 A1 | 1/2020 | Chhabra et al. | |
| 2020/0057864 A1 | 2/2020 | Parthasarathy | |
| 2020/0134076 A1 | 4/2020 | Ogrinz | |
| 2020/0186515 A1 | 6/2020 | Bansal | |
| 2020/0213357 A1 | 7/2020 | Levin et al. | |
| 2020/0272740 A1 | 8/2020 | Obee | |
| 2020/0396222 A1 | 12/2020 | Gargaro | |
| 2020/0401696 A1 | 12/2020 | Ringlein | |
| 2021/0014265 A1* | 1/2021 | Hadar | H04L 63/1433 |
| 2021/0084048 A1 | 3/2021 | Kannan | |
| 2021/0089353 A1 | 3/2021 | Shear | |
| 2021/0089422 A1* | 3/2021 | Kim | G06F 11/3079 |
| 2021/0182607 A1 | 6/2021 | Agarwal | |
| 2021/0243190 A1 | 8/2021 | Bargury et al. | |
| 2021/0243208 A1* | 8/2021 | Rubin | H04L 63/1433 |
| 2021/0271565 A1 | 9/2021 | Bhavanarushi et al. | |
| 2021/0336934 A1 | 10/2021 | Deshmukh et al. | |
| 2021/0392142 A1 | 12/2021 | Stephens et al. | |
| 2022/0021652 A1 | 1/2022 | Moghe | |
| 2022/0094614 A1 | 3/2022 | Khurshid | |
| 2022/0094643 A1 | 3/2022 | Cook | |
| 2022/0116455 A1 | 4/2022 | Raghunath | |
| 2022/0198015 A1 | 6/2022 | Webster | |
| 2022/0200869 A1 | 6/2022 | Erlingsson | |
| 2022/0245175 A1 | 8/2022 | Hawco et al. | |
| 2022/0292002 A1 | 9/2022 | Kumar et al. | |
| 2022/0335151 A1 | 10/2022 | Stephen et al. | |

OTHER PUBLICATIONS

U.S. Appl. No. 17/939,501—Notice of Allowance, dated Mar. 7, 2023, 10 pages.

Anonymous, Amazon Neptune features, Amazon Neptune, retrieved on Aug. 15, 2022, 9 pages. Retrieved from the internet [URL: https://aws.amazon.com/neptune/features/ ].

Anonymous, Assign Azure roles using the Azure portal, Microsoft, dated Dec. 29, 2021, 12 pages. Retrieved on Aug. 16, 2022. Retrieved from the internet [URL: https://docs.microsoft.com/en-us/azure/role-based-access-control/role-assignments-portal?tabs=current].

Anonymous, Choose predefined roles, Google Cloud IAM, retrieved on Aug. 15, 2022, 6 pages. Retrieved from the interent [URL: https://cloud.google.com/iam/docs/choose-predefined-roles].

Anonymous, Install the AWS Security Hub App and view the Dashboards, sumo logic, retrieved on Aug. 15, 2022, 6 pages. Retrieved from the internet [URL: https://help.sumologic.com/07Sumo-Logic-Apps/01Amazon_and_AWS/AWS_Security_Hub/3-Install_the_AWS_Security_Hub_App_and_view_the_Dashboards ].

Anonymous, Policies and penmission in IAM, Amazon AWS, retrieved on Aug. 15, 2022, 16 pages. Retrieved from the internet [URL: https://docs.aws.amazon.com/IAM/latest/UserGuide/access_policies.html].

U.S. Appl. No. 17/939,522—Non-Final Office Action, dated Dec. 19, 2022, 15 pages.

Anonymous, Policy Evaluation Logic, Amazon AWS User Guide, retrieved on Aug. 15, 2022, 19 pages. Retrieved from the internet [URL: https://docs.aws.amazon.com/IAM/latesl/UserGuide/reference_policies_evaluation-logic.html].

U.S. Appl. No. 17/939,501—Non-Final Office Action, dated Dec. 1, 2022, 15 pages.

Anonymous, Understanding roles, Google Cloud, retrieved on Aug. 15, 2022, 5 pages. Retrieved from the internet [URL: https://cloud.google.com/iam/docs/understanding-roles].

Anonymous, What is Azure role-based access control (Azure RBAC)?, Microsoft, dated Jun. 27, 2022, 12 pages. Retrieved on Aug. 16, 2022. Retrieved from the internet [URL: https://docs.microsoft.com/en-us/azure/role-based-access-control/overview].

Anthony, Mastering AWS Security—Create and maintain a secure cloud ecosystem, Packt, dated Oct. 2017, 247 pages.

Broadcom, Symantec Cloud Workload Protection for Storage, retrieved on Aug. 15, 2022, 4 pages. Retrieved from the internet [URL: https://techdocs.broadcom.com/us/en/symantec--security-software/

(56) References Cited

OTHER PUBLICATIONS endpoint-security-and-management/cloud-workload-protection-for-storage/1-0.hlml?locale=EN_US].

Watson, Classify sensitive data in your environment using Amazon Macie, dated Apr. 4, 2018, Amazon AWS, 7 pages. Retrieved on Aug. 15, 2022. Retrieved from the internet [URL: https://aws.amazon.com/blogs/security/classify-sensitive-data-in-your-environment-using-amazon-macie/].

Jing et al., Discover sensitive data by using custom data identifiers with Amazon Macie, Amazon AWS, dated Aug. 26, 2020, 12 pages. Retrieved on Aug. 15, 2022. Retrieved from the internet [URL: https://aws.amazon.com/blogs/security/discover-sensitive-data-by-using-custom-data-identifiers-with-amazon-macie/].

U.S. Appl. No. 17/858,903—Notice of Allowance, dated Sep. 28, 2022, 12 pages.

U.S. Appl. No. 17/858,907—Notice of Allowance, dated Dec. 1, 2022, 11 pages.

U.S. Appl. No. 17/858,914—Notice of Allowance, dated Dec. 2, 2022, 3 pages.

U.S. Appl. No. 17/858,914—Notice of Allowance, dated Nov. 21, 2022, 12 pages.

U.S. Appl. No. 17/858,919—Final Office Action, dated Dec. 14, 2022, 43 pages.

U.S. Appl. No. 17/858,919—Non-Final Office Action, dated Sep. 16, 2022, 34 pages.

U.S. Appl. No. 17/939,489—Notice of Allowance, dated Nov. 28, 2022, 13 pages.

\* cited by examiner

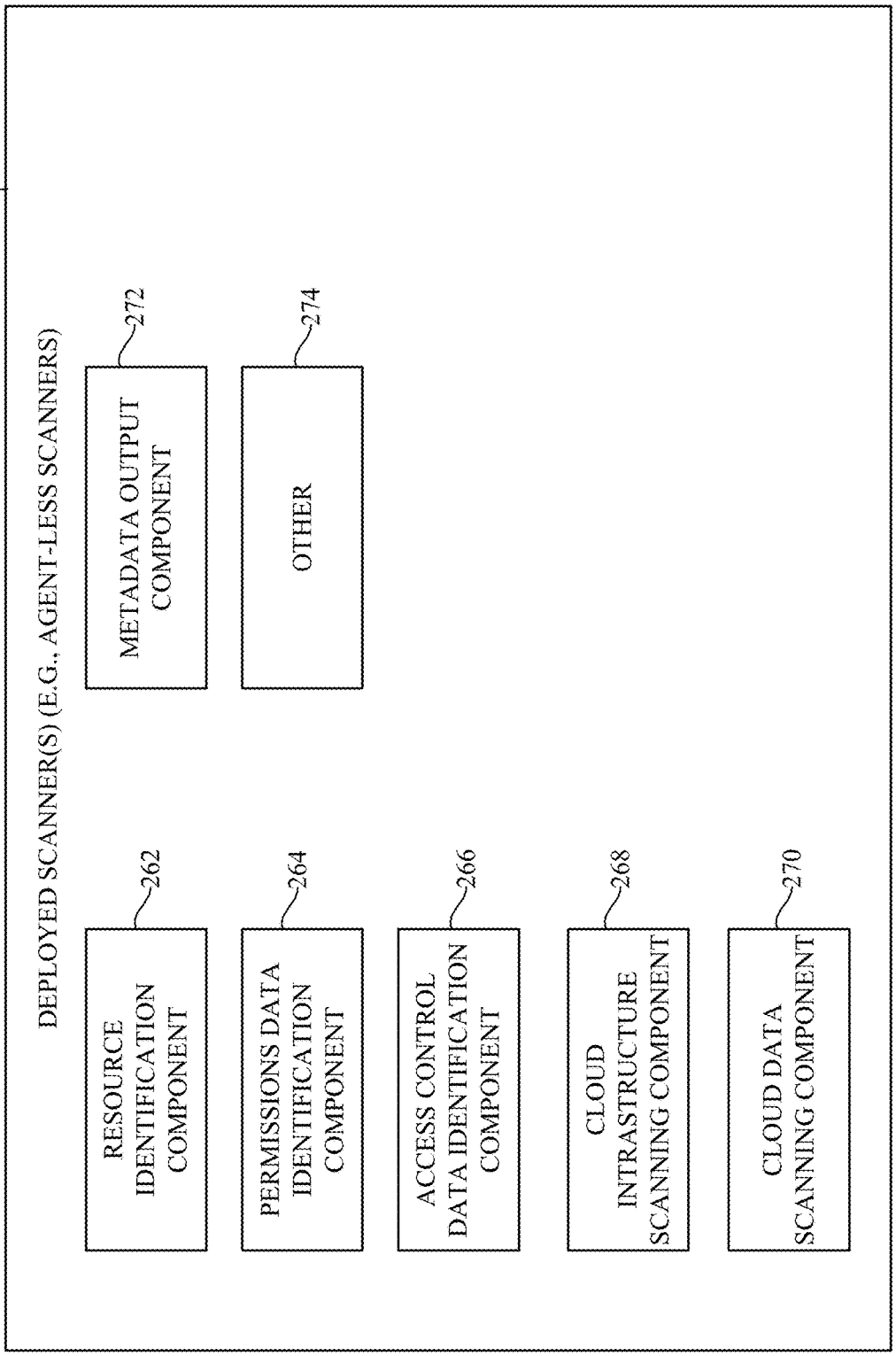

Risk Signatures

| Name | Signature Id | Description | Result Header | Resource | Tags | Likelihood Factor | Impact Factor |
|---|---|---|---|---|---|---|---|
| s3_bucket_mfa_deletion_not_enabled | 3017 | S3 Bucket's MFA delete is disabled | account_id \| account_name \| bucket_id +6 | bucket_arn | aws \| s3 | 7 | |
| s3_bucket_not_enable_transfer_acceleration | 3022 | S3 Bucket's transfer acceleration is disabled | account_id \| account_name \| bucket_id +6 | bucket_arn | aws \| s3 \| configuration_check | 3 | |
| s3_bucket_granting_write_access_to_all_authenticated_users | 3026 | S3 Bucket's grants WRITE (Upload/Delete) access to all authenti... | account_id \| account_name \| bucket_id +6 | bucket_arn | aws \| s3 \| iam | 10 | |
| s3_bucket_server_side_encryption_not_enabled | 3013 | S3 Bucket's default encryption is not enabled | account_id \| account_name \| bucket_id +6 | bucket_arn | aws \| s3 \| GDPR | 7 | |
| s3_bucket_name_not_dns_compilant | 3012 | S3 Bucket's name is not DNS complaint | account_id \| account_name \| bucket_id +6 | bucket_arn | aws \| s3 | 3 | |
| s3_bucket_not_enable_object_lock | 3021 | S3 Bucket's object lock is not enabled | account_id \| account_name \| bucket_id +6 | bucket_arn | aws \| s3 | 3 | |
| iam_password_policy_with_minimal_length_less_than_14_having_access_to_sensitive_data | 2534 | IAM User's password policy does not require minimal length o... | account_id \| account_name \| bucket_id +8 | bucket_arn | aws \| iam | 10 | 10 |

1-30 of 230 items

FIG. 12

| Risks | | | | | | |
|---|---|---|---|---|---|---|
| Top Risks | All Risks | | | | | |
| Time Range | All | | | | | |
| Search | primaryResource:arn:aws:s3::hr-customer2-demo | account Id 23XXXXXX | | | | |
| Description | Resource ARN | Account Id | Tags | Impact | Likelihood | Signatureid |
| s3 Bucket Matches Profile with Personal Data | arn:aws:s3::hr-customer2-demo | 23XXXXXX | GDPR CCPA HIPAA +2 | HIGH | LOW | 10001 |
| s3 bucket contains sensetive data and is also accessbi... | arn:aws:s3::hr-customer2-demo | 23XXXXXX | aws data_protection | HIGH | HIGH | 2107 |
| IAM User's password policy does not require minimal t... | arn:aws:s3::hr-customer2-demo | 23XXXXXX | aws iam | HIGH | HIGH | 2534 |
| IAM User does not have password policy and has access... | arn:aws:s3::hr-customer2-demo | 23XXXXXX | aws iam | HIGH | HIGH | 2537 |
| publicly accessible EC2 instance has access to S3 buck... | arn:aws:s3::hr-customer2-demo | 23XXXXXX | compute security aws | HIGH | HIGH | 4014 |
| S3 Bucket is outside of Europe | arn:aws:s3::hr-customer2-demo | 23XXXXXX | aws s3 GDPR | LOW | LOW | 3000 |
| S3 Bucket's default encryption is not enabled | arn:aws:s3::hr-customer2-demo | 23XXXXXX | aws s3 GDPR | LOW | HIGH | 3013 |
| S3 Bucket's AWS KMS key is disabled | arn:aws:s3::hr-customer2-demo | 23XXXXXX | aws s3 | LOW | HIGH | 3014 |

Data Stores

| Type | Name | Volume | File Type | AccountId | Impact |
|---|---|---|---|---|---|
| S3Bucket | hr-cutome... | 93.98MB | ▤▤▤ +2 | 23XXXXX... | HIGH |
| S3Bucket | education-c... | 143.93MB | ▤▤▤ +3 | 23XXXXX... | HIGH |
| S3Bucket | cloudtrail-n... | 406.19MB | ▤ | 19XXXXX... | HIGH |
| S3Bucket | ads-customs... | 74.96MB | ▤▤▤ | 23XXXXX... | HIGH |

Sidebar:
- Home
- Visualization
- Risks
- Inventory
  - Data
  - Assets
- Data Scan
  - Profiles
  - Entities
  - Scan Settings
- Risk Investigation
  - Risk Signatures
  - Query Builder
  - Automations
- Settings
  - Accounts
  - Team Management
  - Integrations Panel (700): Users | Roles | Resources | External Users | External Roles  — (714, 716, 718, 720, 722, 724)

Search

| User Name | Access Type | Creation Date | Last Accessed |
|---|---|---|---|
| arn:aws:iam::23XXXXXX:user/johndoe | CAN_WRITE CAN_READ | 4 months ago | |
| arn:aws:iam::23XXXXXX:user/janedoe@normalyze.ai | CAN_WRITE CAN_READ | 3 months ago | |
| arn:aws:iam::23XXXXXX:user/jdoe+demo@normalyze.ai | CAN_WRITE CAN_READ | 5 months ago | 21 days ago |
| arn:aws:iam::23XXXXXX:user/escott+demo@normalyze.ai | CAN_WRITE CAN_READ | 5 months ago | |
| arn:aws:iam::23XXXXXX:user/aeri+demo | CAN_WRITE CAN_READ | 5 months ago | 2 months ago |
| arn:aws:iam::23XXXXXX:user/will+demo@normalyze.ai | CAN_WRITE CAN_READ | 9 months ago | |
| arn:aws:iam::23XXXXXX:user/mike+demo@normalyze.ai | CAN_WRITE CAN_READ | 9 months ago | |

726

Access details of webui.normalyze.link — 732

Users  Roles  Resources

Search 🔍

1-10 of 15 items  < 1 2 >  10 / page  ⚙▾

| User Name | Access Type | Creation Date |
|---|---|---|
| arn:aws:iam::19XXXXXX:user/ari | CAN_READ CAN_WRITE | 2 months ago |
| arn:aws:iam::19XXXXXX:user/mike@normalyze.ai | CAN_READ CAN_WRITE | 2 months ago |
| arn:aws:iam::19XXXXXX:user/will+aws+main | CAN_READ CAN_WRITE | 7 months ago |
| arn:aws:iam::19XXXXXX:user/janedoe+main | CAN_READ CAN_WRITE | 7 months ago |
| arn:aws:iam::19XXXXXX:user/johndoe@nor... | CAN_READ CAN_WRITE | 4 months ago |
| arn:aws:iam::19XXXXXX:user/bob@normalyze.ai | CAN_READ CAN_WRITE | a months ago |
| arn:aws:iam::19XXXXXX:user/eric@normalyze.ai | CAN_READ CAN_WRITE | 2 months ago |
| arn:aws:iam::19XXXXXX:user/ryan+main | CAN_READ CAN_WRITE | 7 months ago |
| arn:aws:iam::19XXXXXX:user/steveba@normalyze.ai | CAN_READ CAN_WRITE | 2 months ago |
| arn:aws:iam::19XXXXXX:user/dfee | CAN_READ CAN_WRITE | 4 months ago |

Access details of webui.normalyze.link  
734

Users  Roles  Resources

Search 🔍

1-10 of 11 items  < 1  2 >  10 / page  ⚙ ˅

| Role Name | Access Type | Creation Date |
|---|---|---|
| arn:aws:iam::45XXXXX:role/platform-45XXXXX-... | CAN_READ | 6 days ago |
| arn:aws:iam::45XXXXX:rty_role | CAN_READ CAN_WRITE | 5 months ago |
| arn:aws:iam::45XXXXX:role/deploy-compute_access-sm | CAN_READ CAN_WRITE | 3 months ago |
| arn:aws:iam::45XXXXX:role/normalyze-45XXXXX | CAN_READ | a months ago |
| arn:aws:iam::45XXXXX:role/EnableDeployAcce... | CAN_READ CAN_WRITE | 3 months ago |
| arn:aws:iam::45XXXXX:role/test_scan | CAN_READ CAN_WRITE | 7 months ago |
| arn:aws:iam::45XXXXX:role/OrganizationAccountAccess... | CAN_READ | 7 months ago |
| arn:aws:iam::45XXXXX:role/analyzerplatform-051_ | CAN_READ CAN_WRITE | a day ago |
| arn:aws:iam::45XXXXX:role/cloud_scanner | CAN_READ | 7 months ago |
| arn:aws:iam::45XXXXX:role/AWSCloudFormationStackSe... | CAN_READ | a months ago |

FIG. 18

Access details of webui.normalyze.link

Users   Roles   Resources

Search 🔍

| Resource Name | Access Type | Creation Date |
|---|---|---|
| am:aws:lambda:us-west-2:45XXXXX:function:riskupdate... | CAN_READ CAN_WRITE | |
| am:aws:ec2:us-east-2:45XXXXX:instance/i-3lkjhjwer7g... | CAN_READ CAN_WRITE | |
| am:aws:lambda:us-east-2:45XXXXX:function:crawler_la... | CAN_READ | |
| am:aws:lambda:us-east-2:45XXXXX:function:scanner_la... | CAN_READ | |

FIG. 19

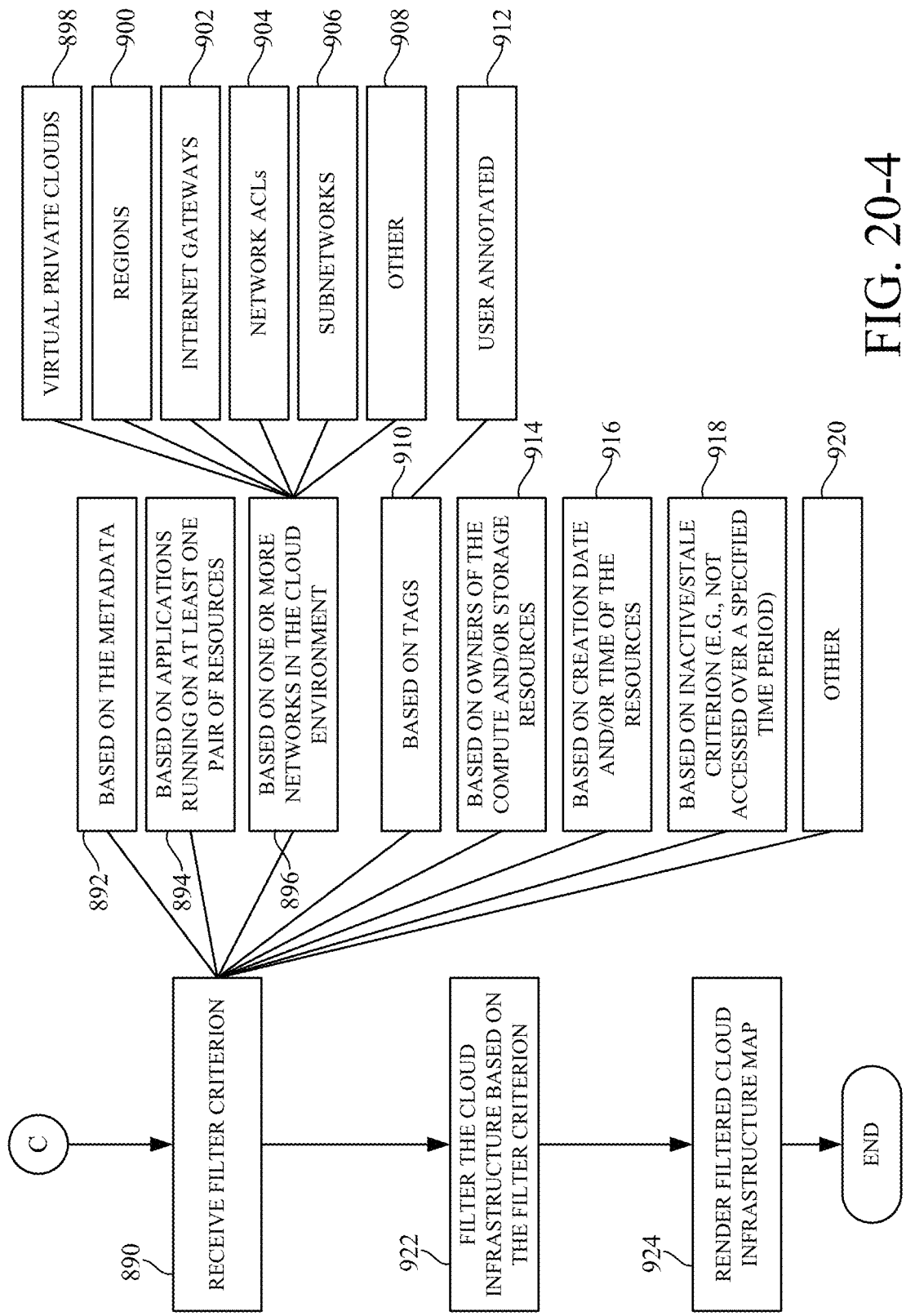

Tenant [UberDash ˅]   🔔  👤 John Doe   ˅

Home / Risk knobs

Data Scan Schedule

[+ New schedule]

Scan ONLY selected datastores

Scanning 42GB (200,000 objects in 45 datastores)
Sampling rate set at 10%        1026
About 27GB scanned in 8 minutes
ⓘ Scanning status  ▭▭▭▭▭▭▭▭▭▭▭ 65% datastores selected by name (2)
[s3-prod-bkup1] [s3-staging-bkup1]

[M][T][W][T][F][S][S]
[2:45PM] 🕐

[Stop] | [⊘ Scan now]

Scan ALL datastores EXCEPT selected datastores selected by tag (3)
[Production (34)] [RDS (3)] [PostGres (4)]  +  datastores selected by name (2)
[s3-prod-bkup1] [s3-staging-bkup1]

[M][T][W][T][F][S][S]
[2:45PM] 🕐

[Edit] | [⊘ Scan now]

Scan ONLY selected datastores datastores selected by tag (3)      datastores selected by name (2)

[M][T][W][T][F][S][S]

⤺ Home
▭ Data Exposure
⏱ Insights
🔧 Settings  ˅
   Accounts
   Scan Settings
   User Managment
❓ Help

Properties of AWSRole - normalyze-45XXXXX

▷ {
    arn : "arn:aws:iam::45XXXX:roe/normalyze-45XXXXX"
    cratedate : "2021-08-17 05:26:02+00:00"
    firstseen : "1629956945933"
    id : 11930
    lastupdated : 1630153466
    name : "normalyze-45XXXXX:"
    path : "/"
    releid : "FRE89JML52WS"
}

FIG. 27

Properties of AWSLambda - myTestFunction

{
  arn : "arn:aws:lambda:us-east-2:19XXXXXXX:function:myTestFunction"
  description : ""
  firstseen : "1629956945933"
  id : "arn+aws:lambada:us:east-2:19XXXXXXXX:function:myTestFunction"
  lastupdated : 1630153466
  memory : 128
  modifieddate : " 2021-08-06T17:03:58.496+0000"
  name : "myTestFunction"
  runtime : "python3.7"
  timeout : 303
}

FIG. 30

Home / Resources
Resources

Team: John Doe

Resources  Changes

Search 🔍

1-10 of 218 items   < 1 2 3 4 5 ... 22 >

| arn | Account Id | Resource Type | Name | Region | Details |
|---|---|---|---|---|---|
| arn:aws:ecr:us:west-2:543098234985:repository/data-scan-c23c34 | 543098234985 | ECRRepository | data-scan-c23c34 | us-west-2 | Details |
| arn:aws:ecr:us:east-2:543098234985:repository/metdata-crawl53 | 543098234985 | ECRRepository | metdata-crawl53 | us-east-2 | Details |
| arn:aws:ecr:us:west-2:543098234985:repository/cand-retr | 543098234985 | ECRRepository | cand-retr | us-west-2 | Details |
| arn:aws:ecr:us:east-2:543098234985:repository/data-scanner-c23c34 | 543098234985 | ECRRepository | data-scanner-c23c34 | us-east-2 | Details |
| arn:aws:ecr:us:west-2:543098234985:repository/data-scanner-c23c34 | 543098234985 | ECRRepository | data-scanner-c23c34 | us-west-2 | Details |
| arn:aws:ecr:us:east-1:543098234985:repository/data-scanner-c23c34 | 543098234985 | ECRRepository | data-scanner-c23c34 | us-east-1 | Details |
| arn:aws:ecr:us:east-1:543098234985:repository/metadata-crawl-c4 | 543098234985 | ECRRepository | metadata-crawl-c4 | us-east-1 | Details |
| arn:aws:ecr:us:west-2:543098234985:repository/metadata-crawl-f3 | 543098234985 | ECRRepository | metadata-crawl-f3 | us-west-2 | Details |
| arn:aws:ecr:us:east-1:543098234985:repository/data-scan-c324f | 543098234985 | ECRRepository | data-scan-c324f | us-east-1 | Details |

FIG. 31

```
data-scanner-b468d429-e5f1-44e1-b64f-2b2fe4661804
▷ {
    createAt : "2021-09-10 02:17:12+00:00"
    encryptionConfiguration : {
        encryptionType : "AES256"
    }
    ▷ imageScanningConfiguration : {
        scanOnPush : false
    }
    imageTagMutability : "MUTABLE"
    original : {
        TeamId : 6
        accountId : "8972435844"
        arn :
        "arn:aws:ecr:us-west-2:8972435844:repository/data-scan-bd9-ef1
        234ikj93
        hash : "03ljkf90324244"
        id : 3428
        name : "data-scanfe4661804"
        region : "us-west-2"
        resourceType : "ECRRepository"
    }
    registryId : "8972435844"
    repositoryArn :
    "arn:aws:ecr:us-west-2:8972435844:repository/data-scan-4-e5f1-44ei
    -f35f3g34jj"
    repositoryName : "data-scan046d2-e1-4i-6f-2bfe64"
    repositoryUrl :
    "8972435844.dkr.ecr.us-west-2.amazonaws.com/8972435844"
}
```

Home / Resources
Resources

Team: John Doe

Resources    Changes

| arm | Account Id | Resource Type | Name | Region | Details |
|---|---|---|---|---|---|
| arn:aws:iam::543098234985:user/kap+demo@platform.a1 | 543098234985 | AWSUser | kap+demo@platform.a1 | aws+global | Details |
| arn:aws:s3:::accounting-customer2-demo | 543098234985 | S3Bucket | accounting-customer2-demo | us-east-2 | Details |
| arn:aws:s3:::ads-customer2-demo | 543098234985 | S3Bucket | ads-customer2-demo | us-east-2 | Details |
| arn:aws:iam::543098234985:user/erik+demo@platform.ai | 543098234985 | AWSUser | erik+demo@platform.ai | aws+global | Details |
| arn:aws:s3:::ads-customer-challenging-bucket | 543098234985 | S3Bucket | customer-challenging-bucket | us-east-2 | Details |
| arn:aws:s3:::control-customer2-demo | 543098234985 | S3Bucket | control-customer2-demo | us-east-2 | Details |
| arn:aws:iam::543098234985:role/aws-service-role/support.amazonaws | 543098234985 | AWSRole | AWSServiceRoleForSupport | aws+global | Details |
| arn:aws:s3:::education-customer2-demo | 543098234985 | S3Bucket | education-customer2-demo | us-east-2 | Details |
| arn:aws:iam::543098234985:role/aws-service-role/cloudtrail.amazon | 543098234985 | ECRRepository | AWSServiceRoleForCloudTr... | aws+global | Details |
| arn:aws:iam::543098234985:user/ravsa+demo@platform.ai | 543098234985 | AWSUser | ravsa+demo@platform.ai | aws+global | Details |

FIG. 33

Home / Resources
Resources

Resources　　Changes

Search 🔍

[resourceType: AWSRole ✕] [arn:aws:iam:258972395875:role/config-service-main ✕]

| arn | Account Id | Resource Type | Name | Region | Details |
|---|---|---|---|---|---|
| arn:aws:iam:258972395875:role/config-service-main | 258972395875 | AWSRole | config-service-main | aws+global | Details |

Team [John Doe]

1270

1272

History

```
{
  "Arn" : "arn:aws:iam:258972395875:role/config-service-main",
  "AssumeRolePolicyDocument" : {
      "Statement": [
         {\n    \"Sid\": \"sts:AssumeRolw\",\n \"Effect\": \"allow\",\n \"Principal\": {\n\"Service\": \"ecs-tasks.amazonaws.com\"\n }\n}"
      ],
      "Version": "2012-10-17"
  },
  "CreateDate": "2021-03-02 10:39:08+00:00",
  "MaxSessionDuration": 3600,
  "Path" : "/",
  "RoleId": "TFLERFIL7896FERE",
  "RoleName" : "config-service-main"
},
```

FIG. 34

```
config-service-main
▷ {
    "Arn" : "arn:aws:iam:258972395875:role/config-service-main",
    ▷ "AssumeRolePolicyDocument" : {
        ▷ "Statement": [
  1274 ──▷ 0 : {
                Action : "sts:AssumeRole"
  1276 ──      Effect : "Allow"
                ▷ Principal : {
                    Service : "ecs-tasks.amazonaws.com"
                }
                Sid : ""
            }
        ]
        Version : "2012-10-17"
    }
    CreateDate : "021-03-02 10:39:08+00:00"
    MaxSessionDuration : 3600
    Path : "/"
    RoleId : "IFLERFIL7896FERE"
    RoleName : "config-service-main"
    ▷ Original : { . . . }
}
```

FIG. 35

COMPACT CLOUD ACCESS NETWORK BASED ON ROLE-TO-RESOURCE DETECTION WITH RESOURCE STATE CHANGE TRACKING AND PROVENANCE

CROSS-REFERENCE TO RELATED APPLICATIONS

The present application is a continuation of and claims priority to U.S. patent application Ser. No. 18/090,195, filed Dec. 28, 2022, which is a continuation of and claims priority to U.S. patent application Ser. No. 17/858,903, filed Jul. 6, 2022, which is based on and claims the benefit of U.S. provisional patent application Ser. Nos. 63/246,303, filed Sep. 20, 2021, 63/246,310, filed Sep. 21, 2021, 63/246,313, filed Sep. 21, 2021, and 63/246,315, filed Sep. 21, 2021; the contents of these applications are hereby incorporated by reference in their entirety.

FIELD OF THE TECHNOLOGY DISCLOSED

The technology disclosed generally relates to cloud environments. More specifically, but not by limitation, the present disclosure relates to improved systems and methods of cloud security posture management (CSPM), cloud infrastructure entitlement management (CIEM), cloud-native application protection platform (CNAPP), and/or cloud-native configuration management database (CMDB).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud computing provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

The discussion above is merely provided for general background information and is not intended to be used as an aid in determining the scope of the claimed subject matter.

SUMMARY

A system for streamlined analysis of access sub-networks in a cloud environment is disclosed. The system comprises memory storing access sub-networks in a cloud environment between a plurality of resources and a plurality of users, memory storing user-to-role mappings for roles assigned to the plurality of users, and accumulation logic having access to the access sub-networks and to the user-to-role mappings. The accumulation logic is configured to traverse the access sub-networks to build a number U user-to-resource mappings between the plurality of users and the plurality of resources, and evaluate the U user-to-resource mappings against the user-to-role mappings to accumulate a number R role-to-resource mappings between the roles and the plurality of resources.

Example 1 is a system for streamlined analysis of access sub-networks in a cloud environment, comprising:
  memory storing access sub-networks in a cloud environment between a plurality of resources and a plurality of users, wherein a subject access sub-network makes a subject resource accessible to one or more users;
  memory storing user-to-role mappings for roles assigned to the plurality of users, wherein the roles are defined at a resolution of the cloud environment; and
  accumulation logic, having access to the access sub-networks and to the user-to-role mappings, and configured
  to traverse the access sub-networks to build a number U user-to-resource mappings between the plurality of users and the plurality of resources, and
  to evaluate the number U user-to-resource mappings against the user-to-role mappings to accumulate a number R role-to-resource mappings between the roles and the plurality of resources.

Example 2 is the system of any or all previous examples, where $R \ll U$.

Example 3 is the system of any or all previous examples, wherein the number U user-to-resource mappings is greater than approximately one hundred times the R role-to-resource mappings.

Example 4 is the system of any or all previous examples, wherein the number U user-to-resource mappings is greater than approximately one thousand times the R role-to-resource mappings.

Example 5 is the system of any or all previous examples, further configured to:
  trace access communication paths between the roles and the plurality of resources based on the number R role-to-resource mappings; and
  construct a compact access network graph that graphically depicts access links along the traced access communication paths as edges between nodes representing the roles and the plurality of resources.

Example 6 is the system of any or all previous examples, wherein a particular role-to-resource mapping in the number R role-to-resource mappings maps a particular role to a particular subset of resources in the plurality of resources.

Example 7 is the system of any or all previous examples, wherein the accumulation logic is configured to:
  detect a new resource assigned the particular role; and
  automatically map the detected new resources to the particular subset of resources.

Example 8 is the system of any or all previous examples, wherein the compact access network graph is graphically updated to reflect the automatic mapping between the new resource, the particular role, and the particular subset of resources.

Example 9 is the system of any or all previous examples, further configured to track a history of anomalous states detected for resources in the plurality of resources.

Example 10 is the system of any or all previous examples, wherein the history of anomalous states is tracked over a timeline.

Example 11 is the system of any or all previous examples, wherein the history of anomalous states is tracked as a diff between a non-anomalous state and a successive anomalous state.

Example 12 is the system of any or all previous examples, wherein the history of anomalous states is tracked as a diff between successive anomalous states.

Example 13 is the system of any or all previous examples, wherein the history of anomalous states is tracked as a diff between successive versions of the resources.

Example 14 is the system of any or all previous examples, wherein respective versions of the resources are determined from respective configurations of the resources.

Example 15 is the system of any or all previous examples, wherein the anomalous states are manually triggered.

Example 16 is the system of any or all previous examples, wherein the anomalous states are programmatically triggered.

Example 17 is the system of any or all previous examples, wherein the history of anomalous states, the timeline, and the diff are graphically generated with a play back feature and a play forward feature.

Example 18 is a computer-implemented method for streamlined analysis of access sub-networks in a cloud environment, the computer-implemented method comprising:
  identifying access sub-networks in a cloud environment between a plurality of resources and a plurality of users, wherein a subject access sub-network makes a subject resource accessible to one or more users;
  obtaining user-to-role mappings for roles assigned to the plurality of users, wherein the roles are defined at a resolution of the cloud environment;
  traversing the access sub-networks to build a number U user-to-resource mappings between the plurality of users and the plurality of resources; and
  evaluating the U user-to-resource mappings against the user-to-role mappings to accumulate a number R role-to-resource mappings between the roles and the plurality of resources.

Example 19 is the computer-implemented method of any or all previous examples, where R<<U.

Example 20 is the computer-implemented method of any or all previous examples, and further comprising:
  tracing access communication paths between the roles and the plurality of resources based on the number R role-to-resource mappings; and
  constructing a compact access network graph that graphically depicts access links along the traced access communication paths as edges between nodes representing the roles and the plurality of resources.

Example 21 is the computer-implemented method of any or all previous examples, wherein a particular role-to-resource mapping in the number R role-to-resource mappings maps a particular role to a particular subset of resources in the plurality of resources.

Example 22 is the computer-implemented method of any or all previous examples, and further comprising:
  detecting a new resource assigned the particular role; and
  automatically mapping the detected new resources to the particular subset of resources.

Example 23 is the computer-implemented method of any or all previous examples, and further comprising:
  graphically updating the compact access network graph to reflect the automatic mapping between the new resource, the particular role, and the particular subset of resources.

Example 24 is the computer-implemented method of any or all previous examples, and further comprising:
  tracking a history of anomalous states detected for resources in the plurality of resources.

Example 25 is the computer-implemented method of any or all previous examples, and further comprising:
  graphically generating a play back feature and a play forward feature with the history of anomalous states.

Example 26 is the computer-implemented method of any or all previous examples, and further comprising at least one of:
  manually triggering the anomalous states; or
  programmatically triggering the anomalous states.

Example 27 is a system for streamlined analysis of access sub-networks in a cloud environment, comprising:
  memory storing access sub-networks in a cloud environment between a plurality of storage resources and a plurality of compute resources, wherein a subject access sub-network makes a subject storage resource accessible to one or more compute resources;
  memory storing compute resource-to-role mappings for roles assigned to the plurality of compute resources, wherein the roles are defined at a resolution of the cloud environment; and
  accumulation logic, having access to the access sub-networks and to the compute resource-to-role mappings, and configured
  to traverse the access sub-networks to build a number U compute resource-to-storage resource mappings between the plurality of compute resources and the plurality of storage resources, and
  to evaluate the number U compute resource-to-storage resource mappings against the compute resource-to-role mappings to accumulate a number R role-to-storage resource mappings between the roles and the plurality of storage resources.

Example 28 is the system of any or all previous examples, further configured to:
  trace access communication paths between the roles and the plurality of storage resources based on the number R role-to-storage resource mappings; and
  construct a compact access network graph that that graphically depicts access links along the traced access communication paths as edges between nodes representing the roles and the plurality of storage resources.

Example 29 is the computer-implemented method of any or all previous examples, where R<<<U.

Example 30 is the computer-implemented method of any or all previous examples, wherein the number U user-to-resource mappings is greater than approximately one hundred times the R role-to-resource mappings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 4 is a block diagram illustrating one example of a deployed scanner.

FIGS. 10-1, 10-2, 10-3, and 10-4 (collectively referred to as FIG. 10) provide a flow diagram illustrating an example operation for streamlined analysis of security posture.

FIG. 12 illustrates one example of a user interface display that displays a set of risk signatures.

FIG. 13 illustrates one example of a user interface display that graphically depicts vulnerability risks.

FIG. 15 illustrates one example of a user interface display that graphically depicts breach likelihood and impact scores.

FIG. 16 illustrates one example of a user interface display having a details pane that displays details for a given resource.

FIG. 17 illustrates one example of a display pane showing user access details for a particular data store.

FIG. 18 illustrates one example of a display pane showing role access details for a particular data store.

FIG. 19 illustrates one example of a display pane showing resource access details for a particular data store.

FIGS. 20-1, 20-2, 20-3, and 20-4 (collectively referred to as FIG. 20) provide a flow diagram illustrating one example of infrastructure analysis and query execution.

FIGS. 21-1 and 21-2 (collectively referred to as FIG. 21) provide a flow diagram illustrating one example of cloud data scanning in a cloud service.

FIGS. 22 and 23 illustrated example user interface displays for defining a scan schedule.

FIGS. 24-1 and 24-2 (collectively referred to as FIG. 24) provide a flow diagram illustrating one example of depicting access links along communication paths between roles and resources.

FIGS. 25, 26, 27, 28, 29, and 30 illustrate examples of user interface displays having visualizations of access communication paths.

FIG. 31 shows one example of a user interface display to visualize resources identified based on data scanning performed on a cloud service.

FIGS. 32, 33, 34, and 35 show example user interface displays representing a particular resource.

DETAILED DESCRIPTION

Figure 1:
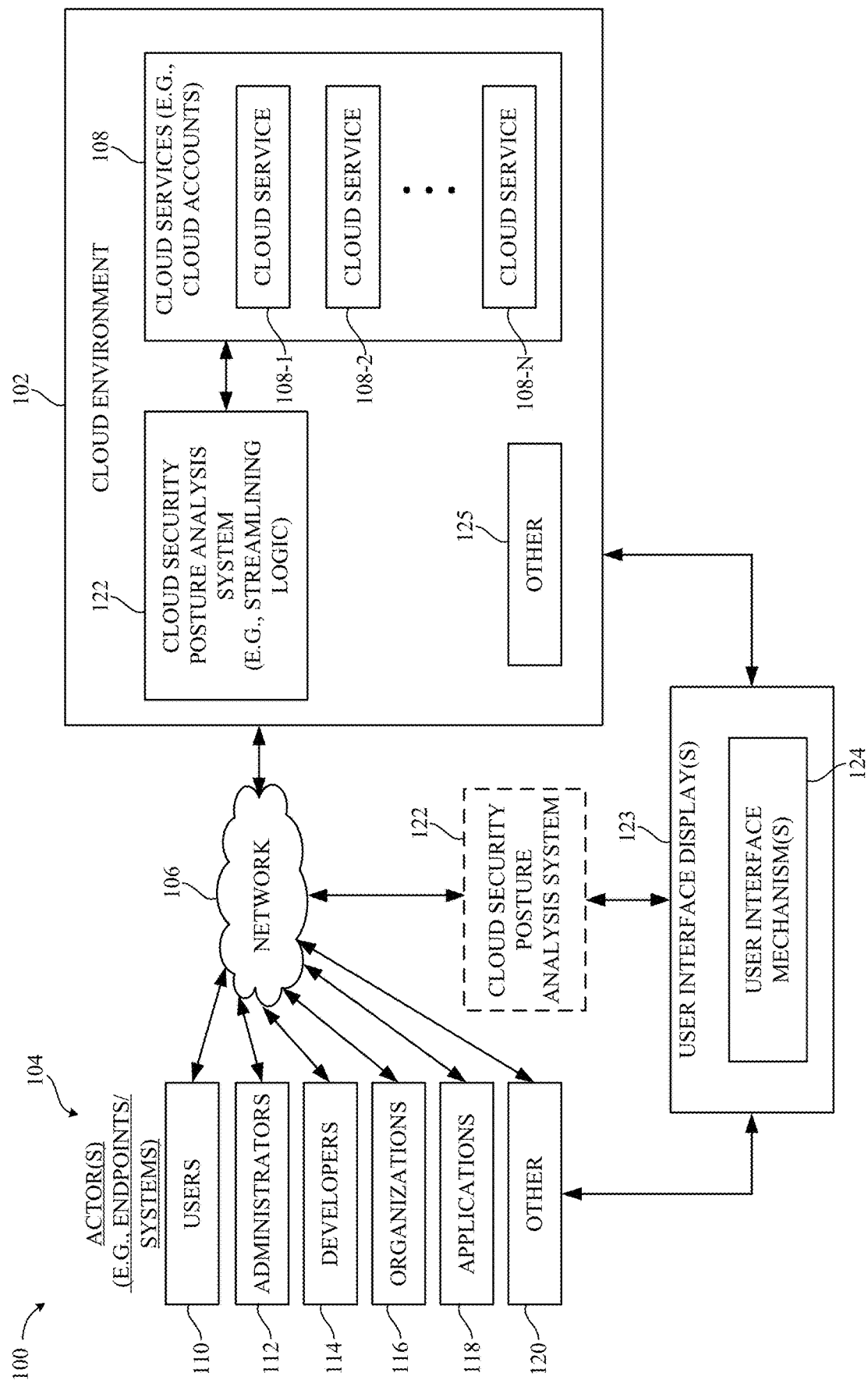
FIG. 1 is a block diagram illustrating one example of a cloud architecture.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, cloud computing environments are used by organizations or other end-users to store a wide variety of different types of information in many contexts and for many uses. This data can often include sensitive and/or confidential information, and can be the target for malicious activity such as acts of fraud, privacy breaches, data theft, etc. These risks can arise from individuals that are both inside the organization as well as outside the organization.

Cloud environments often include security infrastructure to enforce access control, data loss prevention, or other processes to secure data from potential vulnerabilities. However, even with such security infrastructures, it can be difficult for an organization to understand the data posture and breadth of access to the data stored in the cloud in the organization's cloud account. In other words, it can be difficult to identify which users have access to which data, and which data may be exposed to malicious or otherwise unauthorized users, both inside or outside the organization.

The present system is directed to a cloud security posture analysis system configured to analyze and take action on the security posture of a cloud account. The system discovers sensitive data among the cloud storage resources and discovers access patterns to the sensitive data. The results are used to identify security vulnerabilities to understand the data security posture, detect and remediate the security vulnerabilities, and to prevent future breaches to sensitive data. The system provides real-time visibility and control on the control data infrastructure by discovering resources, sensitive data, and access paths, and tracking resource configuration, deep context and trust relationships in real-time as a graph or other visualization. It is noted that the technology disclosed herein can depict all graph embodiments in equivalent and analogous tabular formats or other visualization formats based on the data and logic disclosed herein.

The system can further score breach paths based on sensitivity, volume, and/or permissions to show an attack surface and perform constant time scanning, by deploying scanners locally within the cloud account. Thus, the scanners execute in the cloud service itself, with metadata being returned indicative of the analysis. Thus, in one example, an organization's cloud data does not leave the organization's cloud account. Rather, the data can be scanned in place and metadata sent for analysis by the cloud security posture analysis system, which further enhances data security.

FIG. 1 is a block diagram illustrating one example of a cloud architecture 100 in which a cloud environment 102 is accessed by one or more actors 104 through a network 106, such as the Internet or other wide area network. Cloud environment 102 includes one or more cloud services 108-1, 108-2, 108-N, collectively referred to as cloud services 108. As noted above, cloud services 108 can include cloud storage services such as, but not limited to, AWS, GCP, Microsoft Azure, to name a few.

Further, cloud services 108-1, 108-2, 108-N can include the same type of cloud service, or can be different types of cloud services, and can be accessed by any of a number of different actors 104. For example, as illustrated in FIG. 1, actors 104 include users 110, administrators 112, developers 114, organizations 116, and/or applications 118. Of course, other actors 120 can access cloud environment 102 as well.

Architecture 100 includes a cloud security posture analysis system 122 configured to access cloud services 108 to identify and analyze cloud security posture data. Examples of system 122 are discussed in further detail below. Briefly, however, system 122 is configured to access cloud services 108 and identify connected resources, entities, actors, etc. within those cloud services, and to identify risks and violations against access to sensitive information. As shown in FIG. 1, system 122 can reside within cloud environment 102 or outside cloud environment 102, as represented by the dashed box in FIG. 1. Of course, system 122 can be distributed across multiple items inside and/or outside cloud environment 102.

Users 110, administrators 112, developers 114, or any other actors 104, can interact with cloud environment 102 through user interface displays 123 having user interface mechanisms 124. For example, a user can interact with user interface displays 123 provided on a user device (such as a mobile device, a laptop computer, a desktop computer, etc.) either directly or over network 106. Cloud environment 102 can include other items 125 as well.

Figure 2:
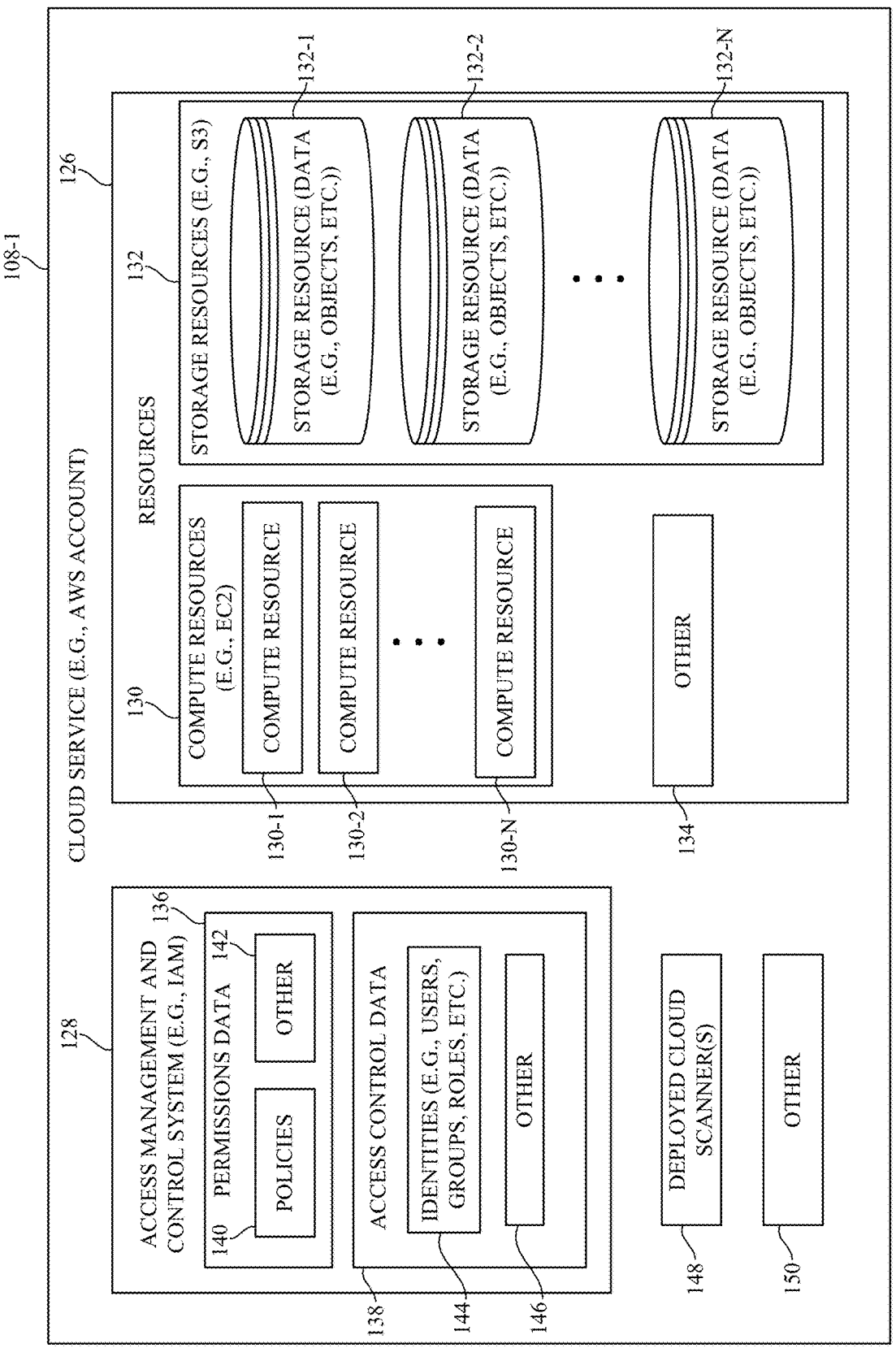
FIG. 2 is a block diagram illustrating one example of a cloud service.

FIG. 2 is a block diagram illustrating one example of cloud service 108-1. For the sake of the present discussion, but not by limitation, cloud service 108-1 will be discussed in the context of an account within AWS. Of course, other types of cloud services and providers are within the scope of the present disclosure.

Cloud service 108-1 includes a plurality of resources 126 and an access management and control system 128 configured to manage and control access to resources 126 by actors 104. Resources 126 include compute resources 130, storage resources 132, and can include other resources 134. Compute resources 130 include a plurality of individual compute resources 130-1, 130-2, 130-N, which can be the same and/or different types of compute resources. In the present example, compute resources 130 can include elastic compute resources, such as elastic compute cloud (AWS EC2) resources, AWS Lambda, etc.

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a server-less, event-driven compute service that allows a user to run code for many different types of applications or backend services without provisioning or managing servers.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on permissions data 136 and/or access control data 138. System 128 illustratively includes identity and access management (IAM) functionality that controls access to cloud service 108-1 using entities (e.g., IAM entities) provided by the cloud computing platform.

Permissions data 136 includes policies 140 and can include other permissions data 142. Access control data 138 includes identities 144 and can include other access control data 146 as well. Examples of identities 144 include, but are not limited to, users, groups, roles, etc. In AWS, for example, an IAM user is an entity that is created in the AWS service and represents a person or service who uses the IAM user to interact with the cloud service. An IAM user provides the ability to sign into the AWS management console for interactive tasks and to make programmatic requests to AWS services using the API, and includes a name, password, and access keys to be used with the API. Permissions can be granted to the IAM user to make the IAM user a member of a user group with attached permission policies. An IAM user group is a collection of IAM users with specified permissions. Use of IAM groups can make management of permissions easier for those users. An IAM role in AWS is an IAM identity that has specific permissions, and has some similarities to an IAM user in that the IAM role is an AWS identity with permission policies that determine what the identity can and cannot do in AWS. However, instead of being uniquely associated with one person, a role is intended to be assumable by anyone who needs it. Roles can be used to delegate access to users, applications, and/or services that don't normally have access to the AWS resources. Roles can be used by IAM users in a same AWS account and/or in different AWS accounts than the role. Also, roles can be used by computer resources 130, such as EC2 resources. A service role is a role assumed by a service to perform actions in an account on behalf of a user. Service roles include permissions required for the service to access the resources needed by the service. Service roles can vary from service to service. A service role for an EC2 instance, for example, is a special type of service role that an application running on an EC2 instance can assume to perform actions.

Policies 140 can include identity-based policies that are attached to IAM identities can grant permissions to the identity. Policies 140 can also include resource-based policies that are attached to resources 126. Examples include S3 bucket policies and IAM role trust policies. An example trust policy includes a JSON policy document that defines the principles that are trusted to assume a role. In AWS, a policy is an object that, when associated with an identity or resource, defines permissions of the identity or resource. AWS evaluates these policies when an IAM principal user or a role) makes a request. Permissions in the policy determine whether the request is allowed or denied. Policies are often stored as JSON documents that are attached to the IAM identities (user, groups of users, role).

A permissions boundary is a managed policy for an IAM identity that defines the maximum permissions that the identity-based policies can grant to an entity, but does not grant the permissions. Further, access control lists (ACLs) control which principles in other accounts can access the resource to which the ACL is attached. ACLs can be similar to resource-based policies. In some implementations of the technology disclosed, the terms "roles" and "policies" are used interchangeably.

Cloud service 108-1 includes one or more deployed cloud scanners 148, and can include other items 150 as well. Cloud scanner 148 run locally on the cloud-based services and the server systems, and can utilize elastic compute resources, such as, but not limited to, AWS Lambda resources. Cloud scanner 148 is configured to access and scan the cloud service 108-1 on which the scanner is deployed. Examples are discussed in further detail below. Briefly, however, a scanner accesses the data stored in storage resources 132, permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc., entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 122 can determine that a resource belongs to a given account and create a relationship between the policy attached to a resource and/or identify the roles that can be taken up by a user.

Figure 3:
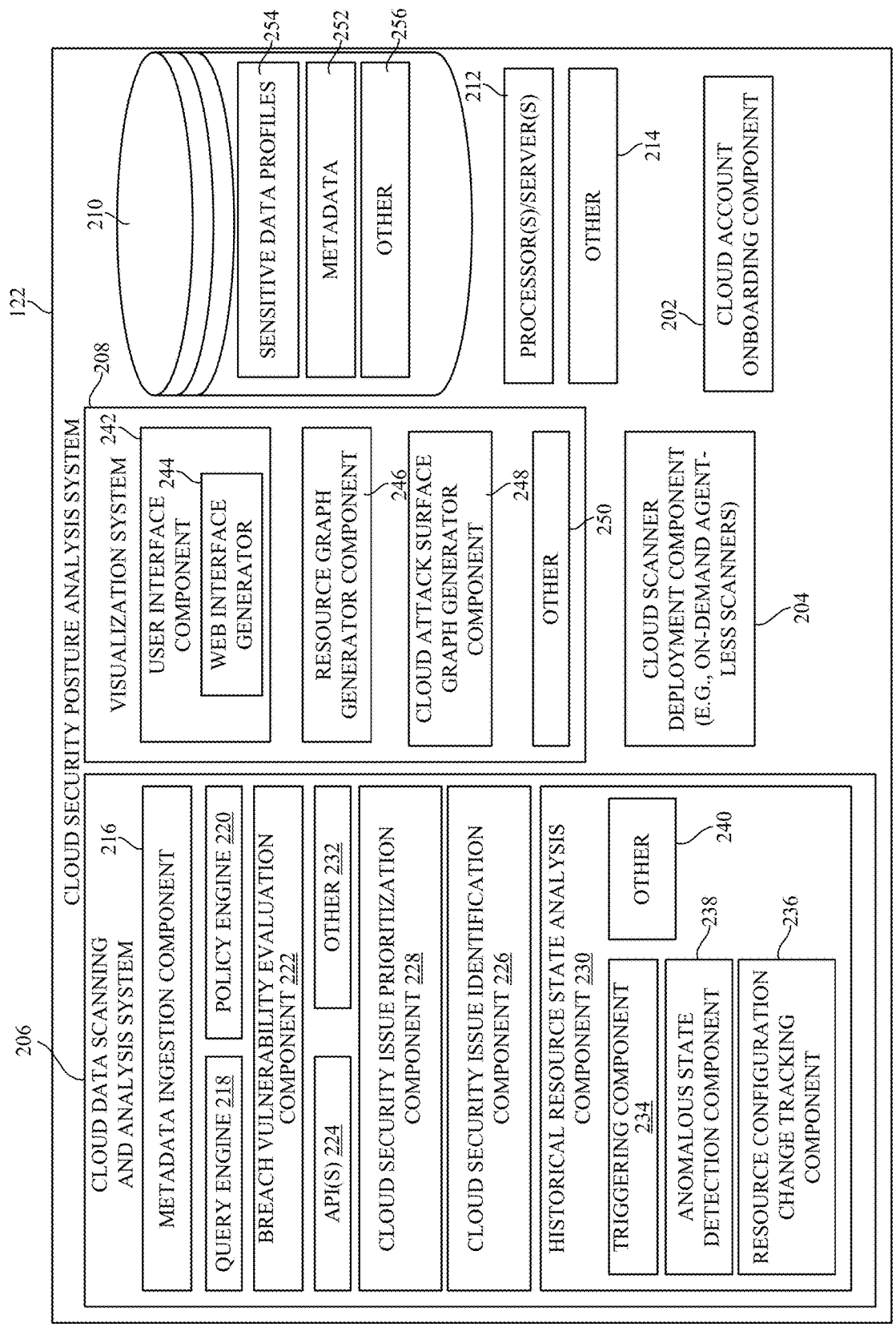
FIG. 3 is a block diagram illustrating one example of a cloud security posture analysis system.

FIG. 3 is a block diagram illustrating one example of cloud security posture analysis system 122. As noted above, system 122 can be deployed in cloud environment 102 and/or access cloud environment 102 through network 106 shown in FIG. 1.

System 122 includes a cloud account onboarding component 202, a cloud scanner deployment component 204, a cloud data scanning and analysis system 206, a visualization system 208, and a data store 210. System 122 can also include one or more processors or servers 212, and can include other items 214 as well.

Cloud account onboarding component 202 is configured to onboard cloud services 108 for analysis by system 122. After onboarding, cloud scanner deployment component 204 is configured to deploy a cloud scanner (e.g., deployed cloud scanner(s) 148 shown in FIG. 2) to the cloud service. In one example, the deployed scanners are on-demand agent-less scanners configured to perform agent-less scanning within the cloud service. One example of an agent-less scanner does not require agents to be installed on each specific device or machine. The scanners operate on the resources 126 and access management and control system 128 directly within the cloud service, and generate metadata that is returned to system 122. Thus, in one example, the actual cloud service data is not required to leave the cloud service for analysis. Cloud data scanning and analysis system 206 includes a metadata ingestion component 216 configured to receive the metadata generated by the deployed cloud scanner(s) 148. System 206 also includes a query engine 218, a policy engine 220, a breach vulnerability evaluation component 222, one or more application programming interfaces (APIs) 224, a cloud security issue identification component 226, a cloud security issue prioritization component 228, historical resource state analysis component 230, and can include other items 232 as well.

Query engine 218 is configured to execute queries against the received metadata and generated cloud security issue data. Policy engine 220 can execute security policies against the cloud data and breach vulnerability evaluation component 222 is configured to evaluate potential breach vulnerabilities in the cloud service. APIs 224 are exposed to users, such as administrators, to interact with system 122 to access the cloud security posture data.

Component 226 is configured to identify cloud security issues and component 228 can prioritize the identified cloud security issues based on any of a number of criteria.

Historical resource state analysis component 230 is configured to analyze a history of states of resources 126. Component 230 includes a triggering component 234 configured to detect a trigger that to perform historical resource state analysis. Triggering component 234 is configured to identify an event that triggers component 230 to analyze the state of resources 126. The event can be, for example, a user input to selectively trigger the analysis, or a detected event such as the occurrence of a time period, an update to a resource, etc. Accordingly, historical resource state can be tracked automatically and/or in response to user input.

Component 230 includes a resource configuration change tracking component 236 configured to track changes in the configuration of resources 126. Component 230 also includes an anomalous state detection component 238, and can include other items 240 as well. Component 238 is configured to detect the occurrence of anomalous states in resources 126. A resource anomaly can be identified where a given resource has an unexpected state, such as a difference from other similar resources identified in the cloud service.

Visualization system 208 is configured to generate visualizations of the cloud security posture from system 206. Illustratively, system 208 includes a user interface component 242 configured to generate a user interface for a user, such as an administrator. In the illustrated example, component 242 includes a web interface generator 244 configured to generate web interfaces that can be displayed in a web browser on a client device.

Visualization system 208 also includes a resource graph generator component 246, a cloud attack surface graph generator component 248, and can include other items 250 as well. Resource graph generator component 246 is configured to generate a graph or other representation of the relationships between resources 126. For example, component 246 can generate a cloud infrastructure map that graphically depicts pairs of compute resources and storage resources as nodes and network communication paths as edges between the nodes.

Cloud attack surface graph generator component 248 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

Data store 210 stores the metadata 252 obtained by metadata ingestion component 216, sensitive data profiles 254, and can store other items 256 as well. Examples of sensitive data profiles are discussed in further detail below. Briefly, however, sensitive data profiles 254 can identify data patterns that are categorized as sensitive or meeting some predefined pattern of interest. Pattern matching can be performed based on the target data profiles. For example, pattern matching can be performed to identify social security numbers, credit card numbers, other personal data, medical information, to name a few. In one example, artificial intelligence (AI) is utilized to perform named entity recognition (e.g., natural language processing modules can identify sensitive data, in various languages, representing names, company names, locations, etc.).

Figures 1, 10:
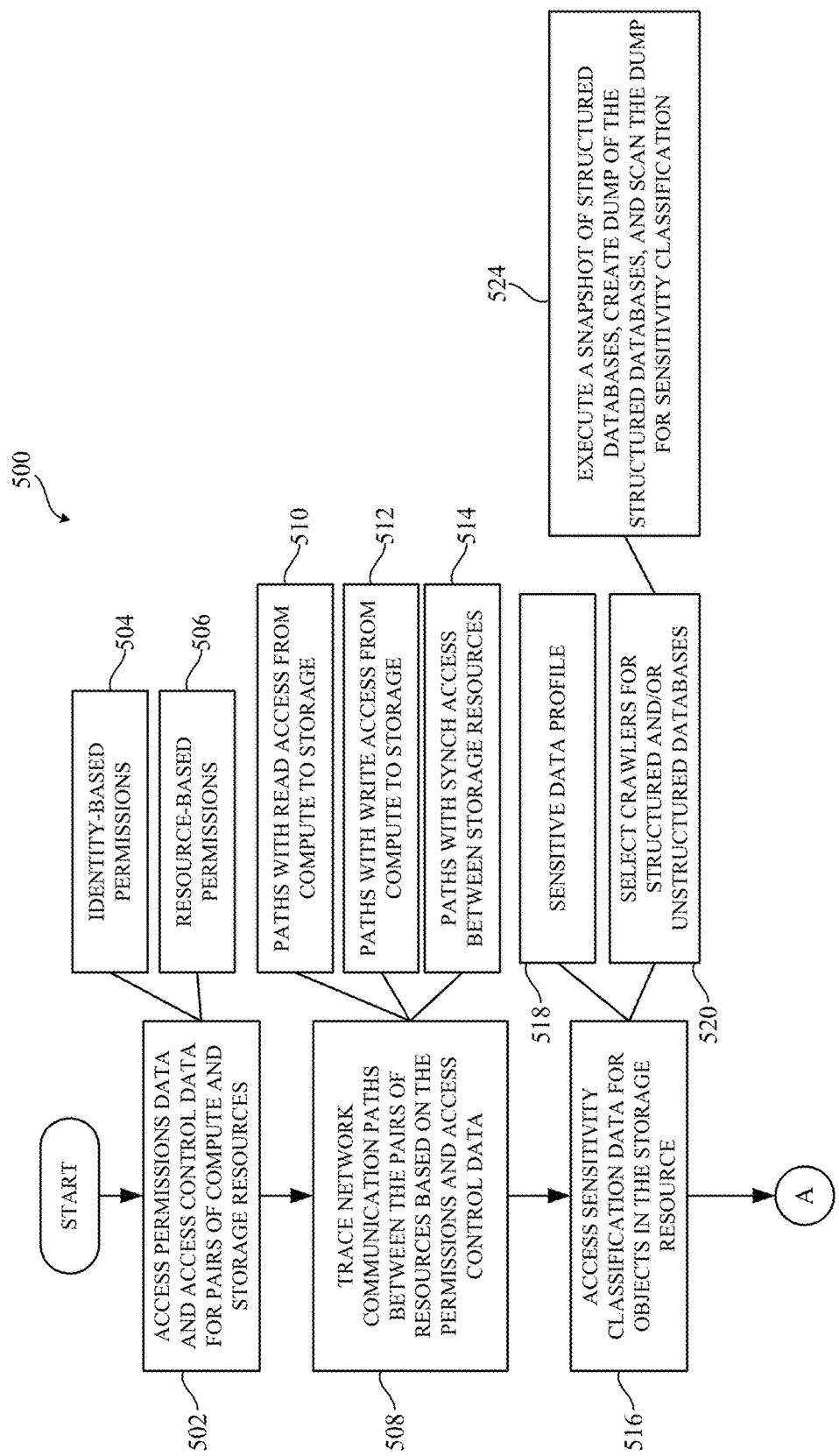
Figures 2, 10:
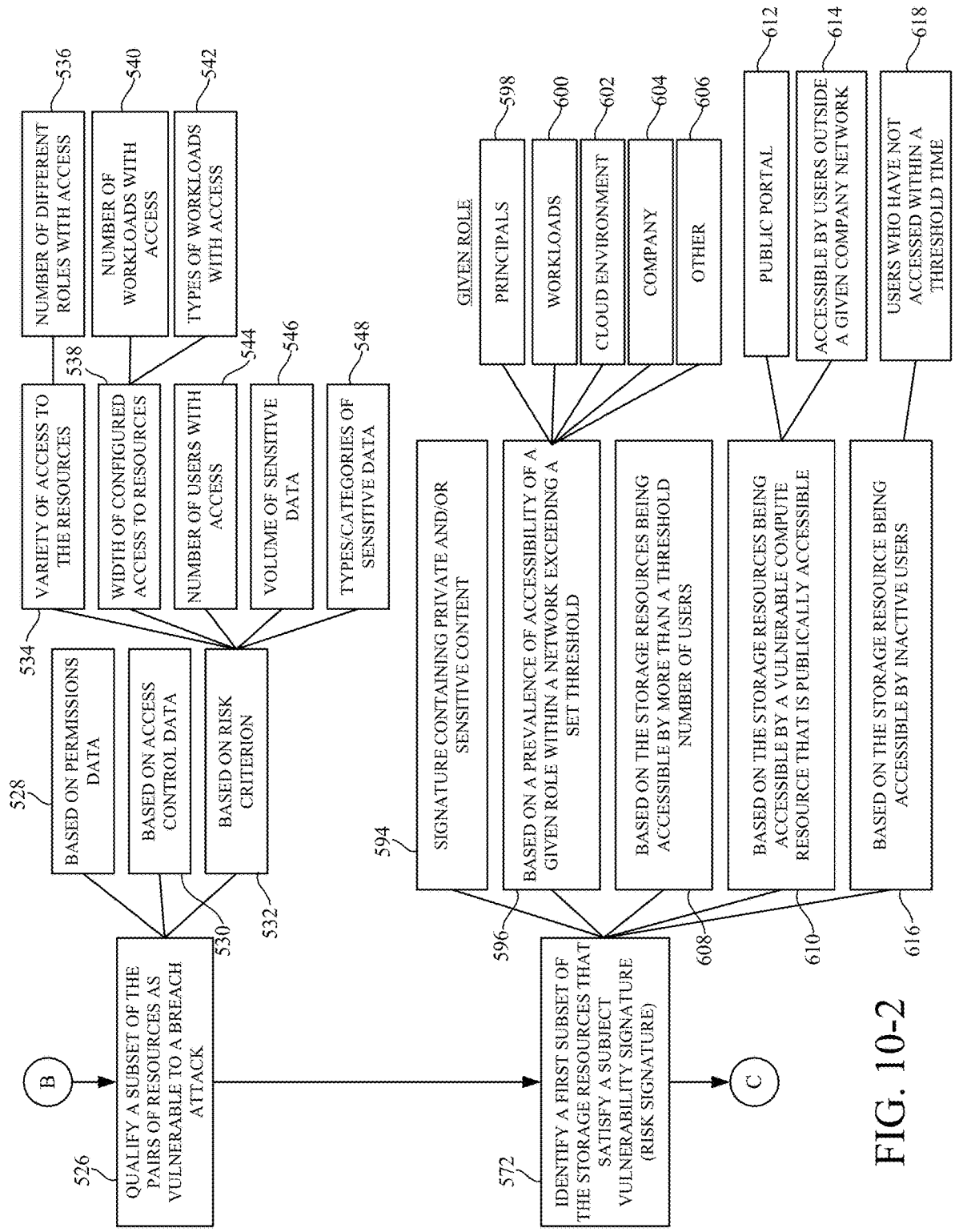
Figures 3, 10:
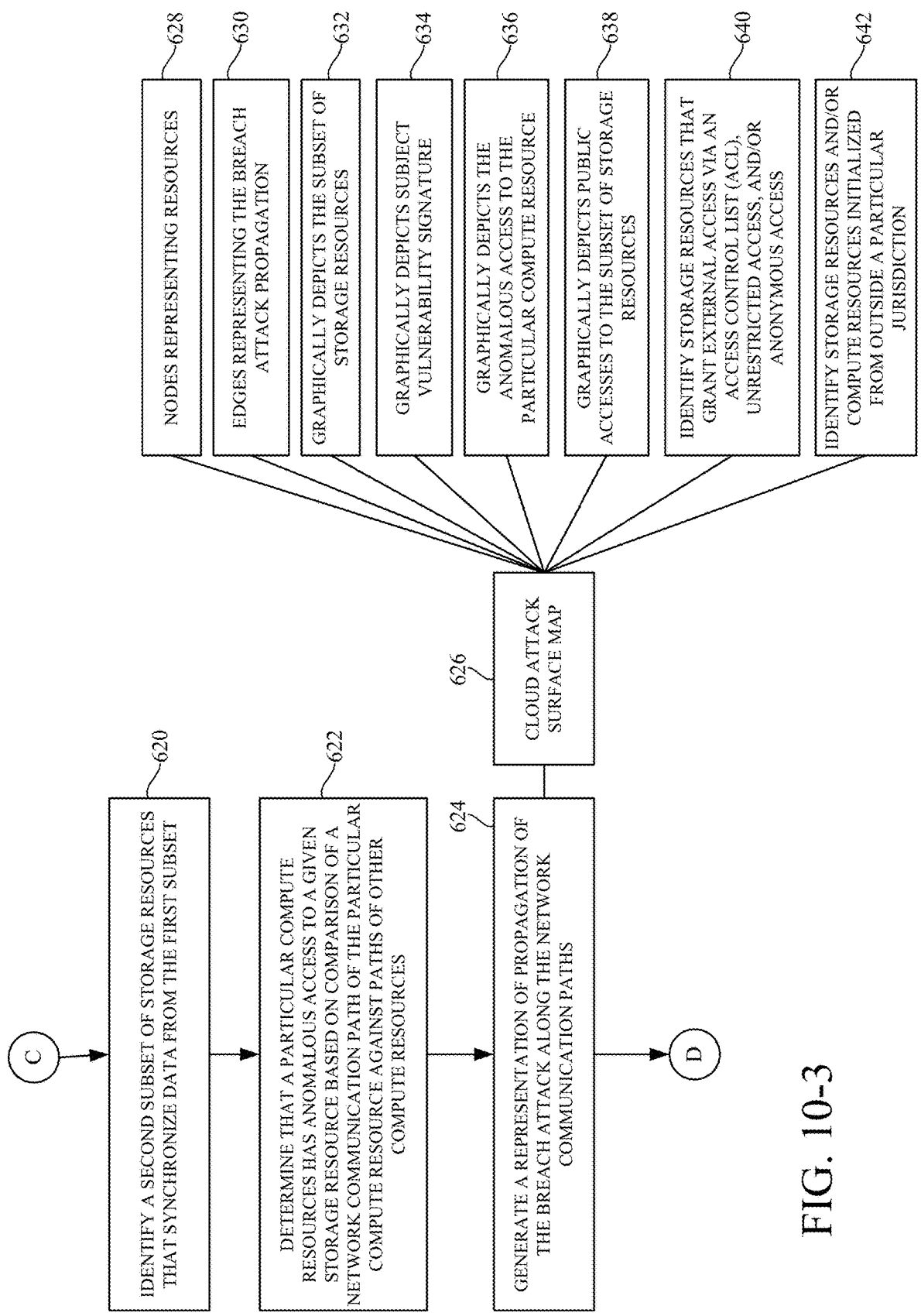
Figures 4, 10:
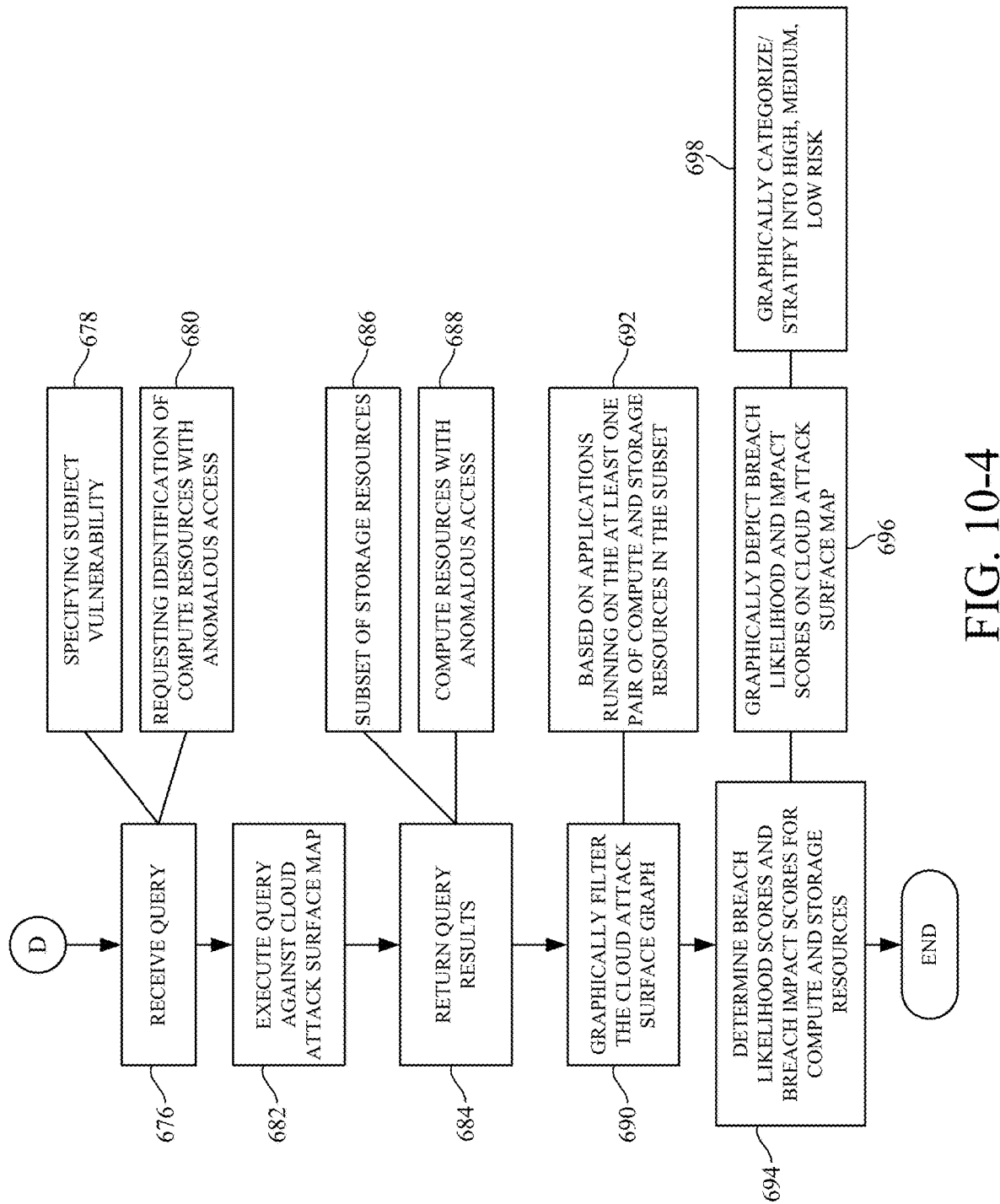

FIG. 4 is a block diagram illustrating one example of a deployed scanner 148. Scanner 148 includes a resource identification component 262, a permissions data identification component 264, an access control data identification component 266, a cloud infrastructure scanning component 268, a cloud data scanning component 270, a metadata output component 272, and can include other items 274 as well.

Resource identification component 262 is configured to identify the resources 126 within cloud service 108-1 (and/or other cloud services 108) and to generate corresponding metadata that identifies these resources. Permissions data identification component 264 identifies the permissions data 136 and access control data identification component 266 identifies access control data 138. Cloud infrastructure scanning component 268 scans the infrastructure of cloud service 108 to identify the relationships between resources 130 and 132 and cloud data scanning component 270 scans the actual data stored in storage resources 132. The generated metadata is output by component 272 to cloud security posture analysis system 122.

Figure 5:
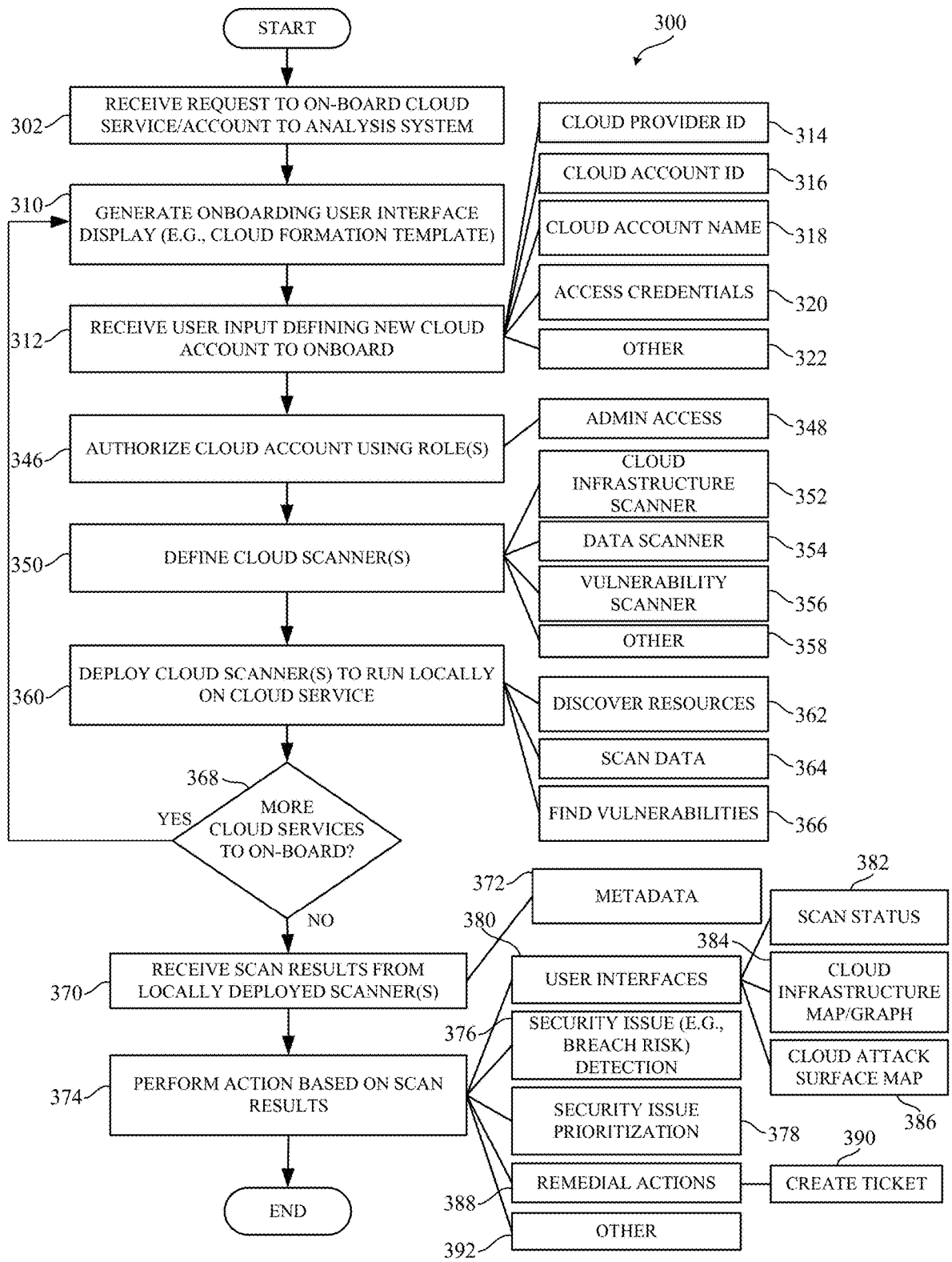
FIG. 5 is a flow diagram showing an example operation of on-boarding a cloud account and deploying one or more scanners.

FIG. 5 is a flow diagram 300 showing an example operation of system 122 in on-boarding a cloud account and deploying one or more scanners. At block 302, a request to on-board a cloud service to cloud security posture analysis system 122 is receives. For example, an administrator can submit a request to on-board cloud service 108-1.

Figure 6:
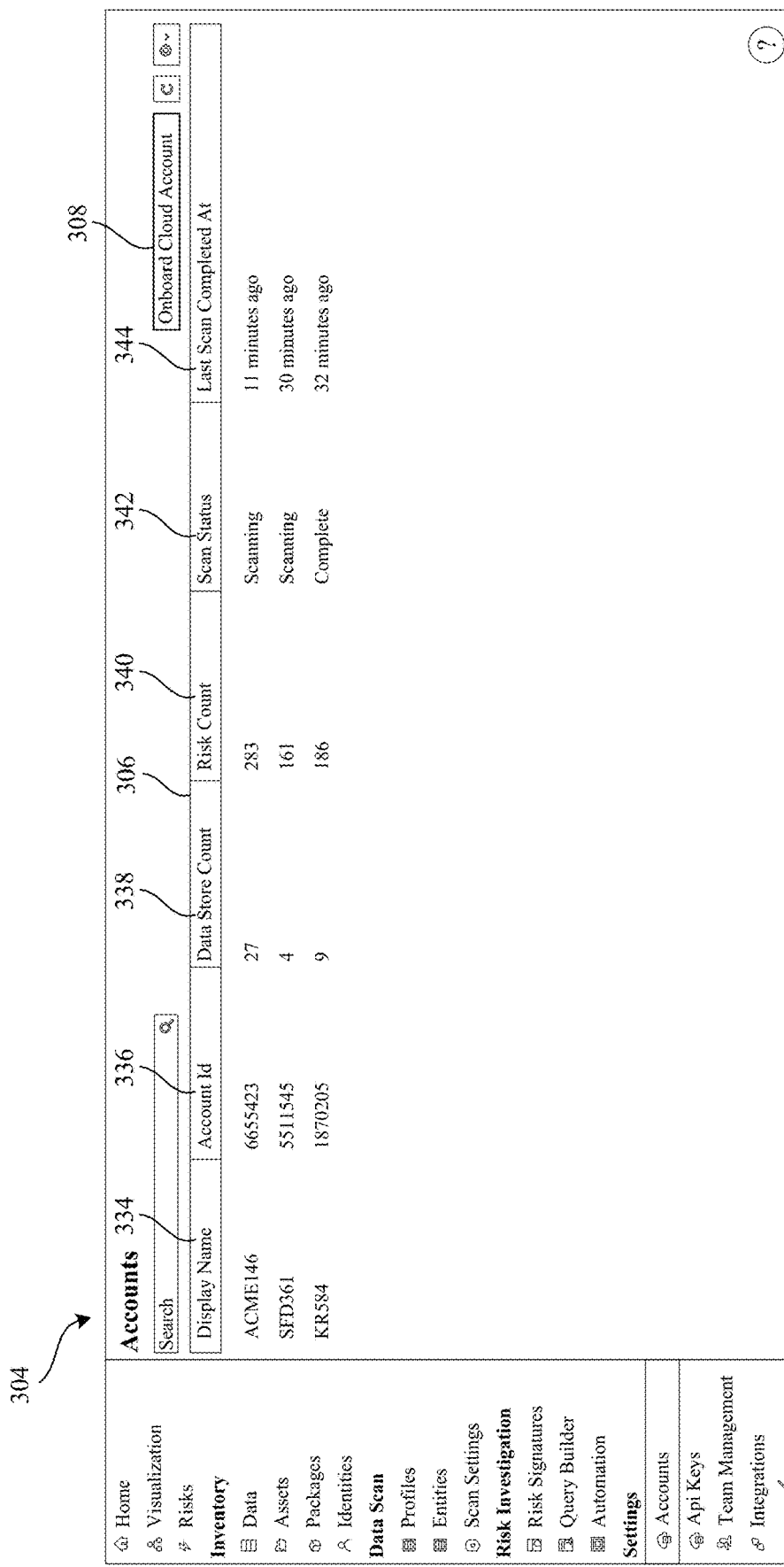
FIG. 6 illustrates one example of a user interface display representing on-boarded cloud accounts.

FIG. 6 illustrates one example of a user interface display 304 provided for an administrator. Display 304 includes a display pane 306 including a number of display elements representing cloud accounts that have been on-boarded to system 122. Display 304 includes a user interface control 308 that can be actuated to submit an on-boarding request at block 302.

Referring again to FIG. 5, at block 310, an on-boarding user interface display is generated. At block 312, user input is received that defines a new cloud account to be on-boarded. The user input can define a cloud provider identification 314, a cloud account identification 316, a cloud account name 318, access credentials to the cloud account 320, and can include other input 322 defining the cloud account to be on-boarded.

Figure 7:
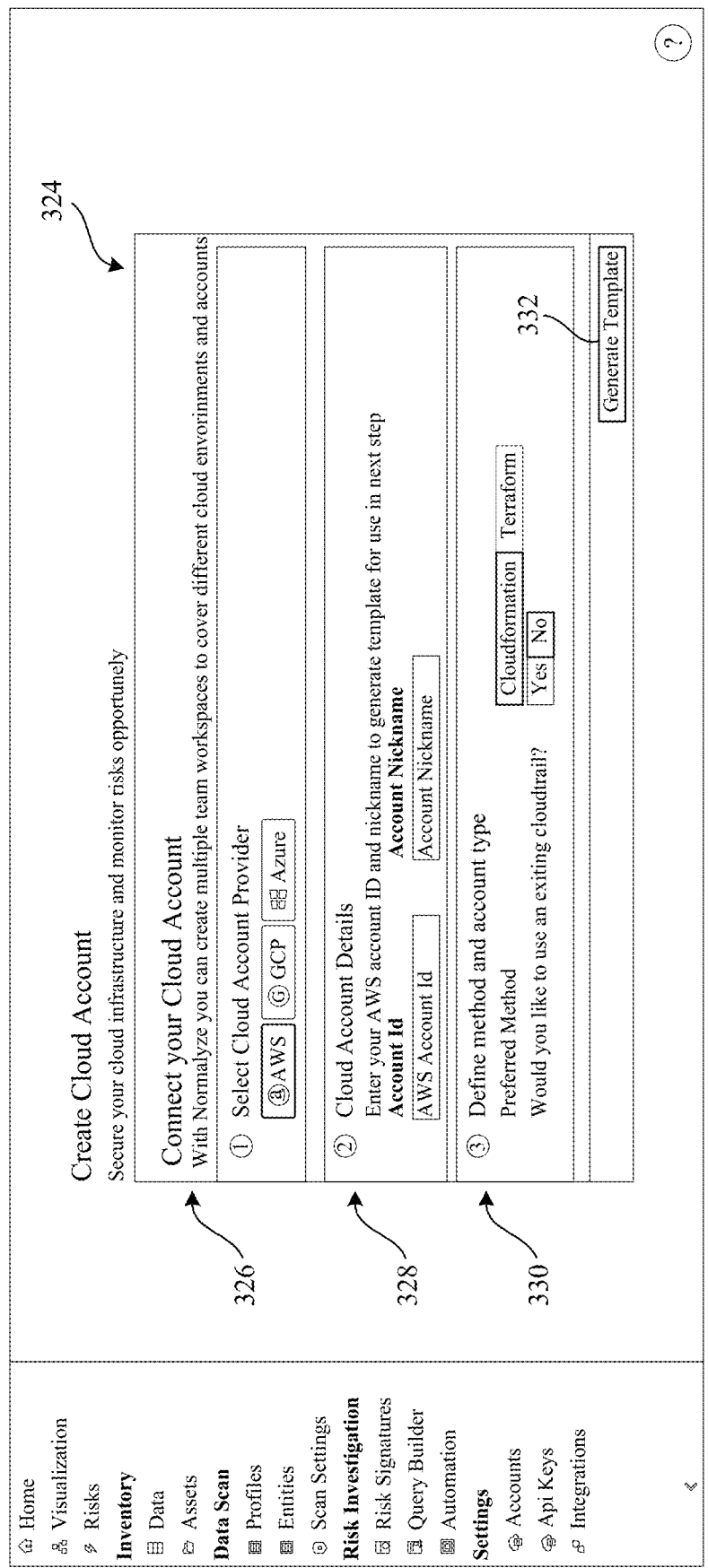
FIG. 7 illustrates one example of an on-boarding user interface display.

FIG. 7 illustrates one example of an on-boarding user interface display 324 that is displayed in response to user actuation of control 308.

Display 324 includes a user interface mechanism 326 configured to receive input to select or otherwise define a particular cloud account provider. In the illustrated example, mechanism 326 includes a plurality of selectable controls representing different cloud providers including, but not limited to, AWS, GCP, Azure.

Display 324 includes a user input mechanism 328 configured to receive input defining a cloud account identifier, and an account nickname. User input mechanisms 330 allow the user to define other parameters for the on-boarding. A user input mechanism 332 is actuated to generate a cloud formation template, or other template, to be used in the on-boarding process based on the selected cloud account provider.

Once the cloud account is connected to system 122, display 304 in FIG. 6 can be updated to show the details of the cloud account as well as the scan status. In FIG. 6, each entry includes a display name 334, an account ID 336, a data store count 338, and a risk count 340. Data store count 338 includes an indication of the number of data stores in the cloud account and the risk count 340 includes an indication of a number if identified security risks. A field 342 indicates the last scan status, such as whether the last scan has completed or whether the scanner is currently in progress or currently scanning. A field 344 indicates the time at which the last scan was completed.

Referring again to FIG. 5, at block 346, the cloud account is authorized using roles. For example, administrator access (block 348) can be defined for the cloud scanner using IAM roles. One or more cloud scanners are defined at block 350 and can include, but are not limited to, cloud infrastructure scanners 352, cloud data scanners 354, vulnerability scanners 356, or other scanners 358.

At block 360, the cloud scanners are deployed to run locally on the cloud service, such as illustrated in FIG. 2. The cloud scanners discover resources at block 362, scan data in the resources at block 364, and can find vulnerabilities at block 366. As discussed in further detail below, a vulnerability can identified based on finding a predefined risk signature in the cloud service resources. The risk signatures can be queried upon, and define expected behavior within the cloud service and locate anomalies based on this data.

At block 368, if more cloud services are to be on-boarded, operation returns to block 310. At block 370, the scan results from the deployed scanners are received. As noted above, the scan results include metadata (block 372) generated by the scanners running locally on the cloud service.

At block 374, one or more actions are performed based on the scan results. At block 376, the action includes security issue detection. For example, a breach risk on a particular resource (such as a storage resource storing sensitive data) is identified. At block 378, security issue prioritization can be performed to prioritize the detected security issues. Examples of security issue detection and prioritization are discussed in further detail below. Briefly, security issues can be detected by executing a query against the scan results using vulnerability or risk signatures. The risk signatures identify criterion such as accessibility of the resources, access and/or permissions between resources, and data types in accessed data stores. Further, each risk signature can be scored and prioritized based impact. For example, a risk signature can include weights indicative of likelihood of occurrence of a breach and impact if the breach occurs.

The action can further include providing user interfaces at block 380 that indicate the scan status (block 382), a cloud infrastructure representation (such as a map or graph) (block 384), and/or a cloud attack surface representation (map or graph) (block 386). The cloud attack surface representation can visualize vulnerabilities based on the low.

Remedial actions can be taken at block 388, such as creating a ticket (block 390) for a developer or other user to address the security issues. Of course, other actions can be taken at block 392. For instance, the system can make adjustments to cloud account settings/configurations to address/remedy the security issues.

Figure 8:
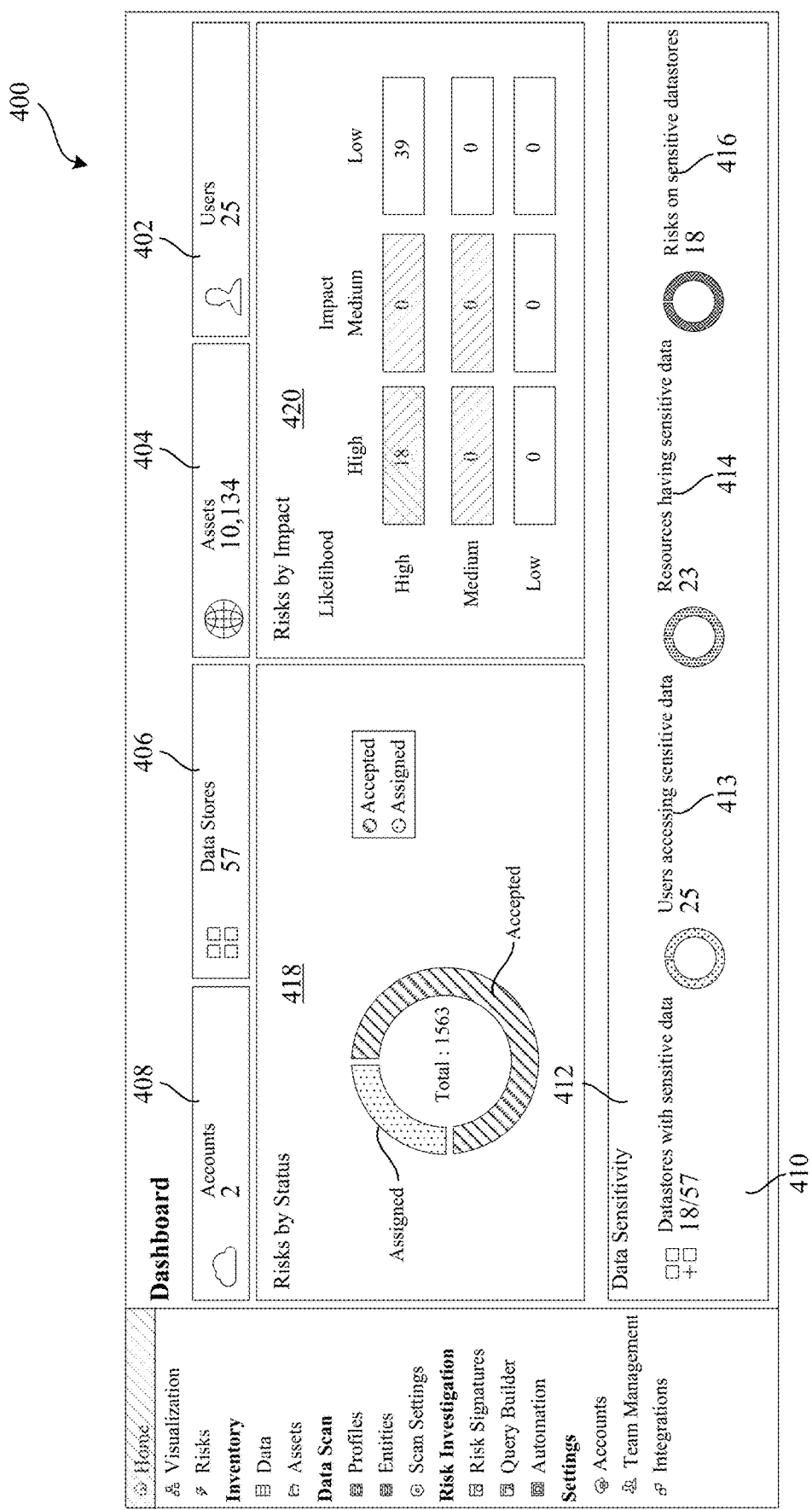
FIG. 8 illustrates one example of a user interface display having a dashboard representing on-boarded cloud service accounts.

FIG. 8 illustrates one example of a user interface display 400, that can be displayed at block 376. Display 400 provides a dashboard for a user which provides an overview of on-boarded cloud service accounts. The dashboard identifies a number of users 402, a number of assets 404, a number of data stores 406, and a number of accounts 408. A data sensitivity pane 410 includes a display element 412 that identifies a number of the data stores that include sensitive data, a display element 413 that identifies a number of users with access to the sensitive data, a display element 414 that identifies a number of resources having sensitive data, and a display element 416 that identifies a number of risks on the data stores having sensitive data. Further, graphs or charts can be generated to identify those risks based on factors such as status (display element 418) or impact (display element 420).

Display element 420 illustratively categorizes the risks based on impact as well as the likelihood of occurrence of those risks. Risk categorization is discussed in further detail below. Briefly, however, display element 420 stratifies one or more breach likelihood scores or breach impact scores categories representing different levels of severity, such as high, medium, and low severity levels. In one example, display element 420 is color coded based on the degree of impact of the risk (e.g., high impact is highlighted in red, medium impact is highlighted in yellow, and low impact is highlighted in green).

Figure 9:
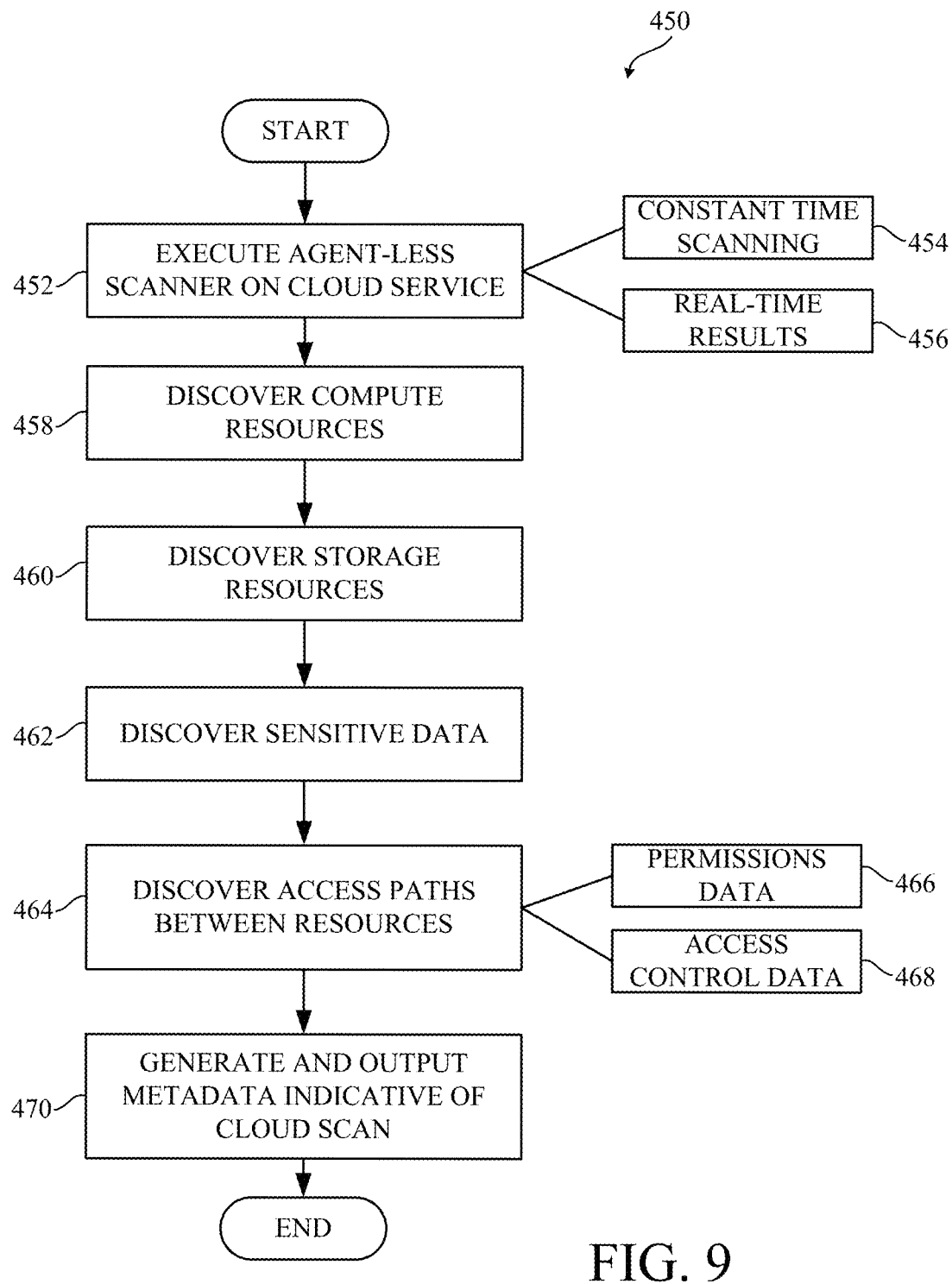
FIG. 9 is a flow diagram illustrating one example of cloud infrastructure scanning performed by a cloud scanner deployed in a cloud service.

FIG. 9 is a flow diagram 450 illustrating one example of cloud infrastructure scanning performed by cloud scanner 148 deployed in cloud service 108-1. At block 452, an agent-less scanner is executed on the cloud service. The scanner can perform constant time scanning at block 454.

An example constant time scanner runs an algorithm in which the running time does not depend, or has little dependence on, the size of the input. The scanner obtains a stream of bytes and looks for a multiplicity of patterns (one hundred patterns, two hundred patterns, three hundred patterns, etc.) in one pass through the stream of bytes, with the same or substantially similar performance.

Further, the scanner can return real-time results at block 456. Accordingly, cloud security posture analysis 122 receives updates to the security posture data as changes are made to the cloud services.

At block 458, the scanner discovers the compute resources 130 and, at block 460, the storage resources 132. Sensitive data can be discovered at block 462. The agent-less scanner does not require a proxy or agent running in the cloud service, and can utilize server-less containers and resources to scan the documents and detect sensitive data. The data can be accessed using APIs associated with the scanners. The sensitive data can be identified using pattern matching, such as by querying the data using predefined risk signatures.

At block 464, access paths between the resources are discovered based on permissions data 136 (block 466), and/or access control data 138 (block 468). A rule processing engine, such as using JSON metadata, can be utilized to analyze the roles and policies, and can build access relationships between the nodes representing the resources. The policies can be decoded to get access type (allow, deny, etc.) and the policy can be placed in a node to link from a source to target node and create the access relationship. At block 470, metadata indicative of the scanning results is generated and outputted by metadata output component 272.

FIGS. 10-1, 10-2, 10-3, and 10-4 (collectively referred to as FIG. 10) provide a flow diagram 500 illustrating an example operation for streamlined analysis of security posture. For sake of illustration, but not by limitation, FIG. 10 will be discussed in the context of cloud security posture analysis system 122 illustrated in FIG. 3. Security posture can be analyzed by system 206 using metadata 252 to return from the cloud service scanners.

At block 502, permissions data and access control data are accessed for pairs of compute and storage resources. The permissions and access control data can include identity-based permissions at block 504, resource-based permissions at block 506, or other permissions as well.

At block 508, network communication paths between the pairs of resources are traced based on the permissions and access control data. For example, the permissions and access control data can identify which paths have read access from a compute resource from a particular compute resource to a particular storage resource, as represented at block 510. Similarly, paths with write access from compute to storage resources can be identified at block 512, paths with synchronization access between storage resources can be identified at block 514. Of course, other types of paths can be identified as well.

For sake of example, but not by limitation, a directional graph is constructed to captures all resources as nodes, with labels assigned to the nodes for search and retrieval. In the AWS example, labels can mark a node as a database or S3 resource. Similarly, labels can represent actors as normal users, admins, developers, etc. Then, known relationships are identified between the nodes, for example using the information available from the cloud infrastructure configuration (e.g., defining a resource belongs to a given account). Similarly, a relationship can be created between the policy attached to a resource, and/or the roles that can be taken up by a user. In addition to storing static information, a rule processing engine (e.g., using JavaScript Object Notation (JSON) metadata) to analyze the roles and policies and build the "access" relationship between the nodes. The analysis can be used to decode the policy to get the access type (e.g., allow, deny, etc.), and the placement of the policy in a node can be used to link from the source node to target node and create the access relationship (e.g., allow, deny, etc.). Similarly, role definitions can be analyzed to find the access type. The graph can therefore include various types of nodes, updated to reflect direct relationships.

An iterative process can be performed to find transitive relationships between resources (e.g., resource access for a given entity/actors/resources). In one example, for each access relationship from a first node N1 to a second node N2, the process identify all incoming access relationships of N1. Then, the access types targeting node N1 are analyzed and updated. Using the relationships identified to access N1, the relationships to N2 are updated, and a new set of access relationships are identified to N2 through N1. The process continues to proceed to identify all such relationships with the goal of creating relationships to all nodes that have sensitive data.

In one example, block 508 identifies "access types" which include normalized forms of access permissions. For example, an access type "can read" can be defined to include a plurality of different read objects within AWS (e.g., defined in terms of allowable APIs). Similarly, the AWS permissions "PutObject" and "PutObjectAcl" are transformed to a normalized access type "can write" within system 122.

At block 516, sensitivity classification data is accessed for objects in the storage resources. The sensitivity classification data can include sensitive data profiles at block 518.

At block 520, crawlers can be selected for structured and/or unstructured databases. Crawling the databases can include executing a snapshot of structured databases, creating a dump of structured databases, and scanning the dump for sensitivity classification, as represented at block 524.

At block 526, a subset of the pairs of resources are qualified as vulnerable to a breach attack. The qualification can be based on the permissions data at block 528, the access control data at block 530, and/or risk criterion at block 532. The risk criterion can include any of a wide variety of different types of criteria. For example, a risk criterion can indicate a variety of access to the resources at block 534. One example includes a number of different roles with access to the resource, as represented at block 536.

Also, a risk criterion can indicate a width of configured access to the resources, at block 538. For example, the width of configured can include a number of workloads with access to the resources (block 540) and/or a type of workload with access to the resources (block 542).

A risk criterion can also indicate a number of users with access to the resources at block 544, a volume of sensitive data in the resources at block 546, and/or types of categories of sensitive data at block 548. Of course, other types of risk criterion can be utilized as well.

Figure 11:
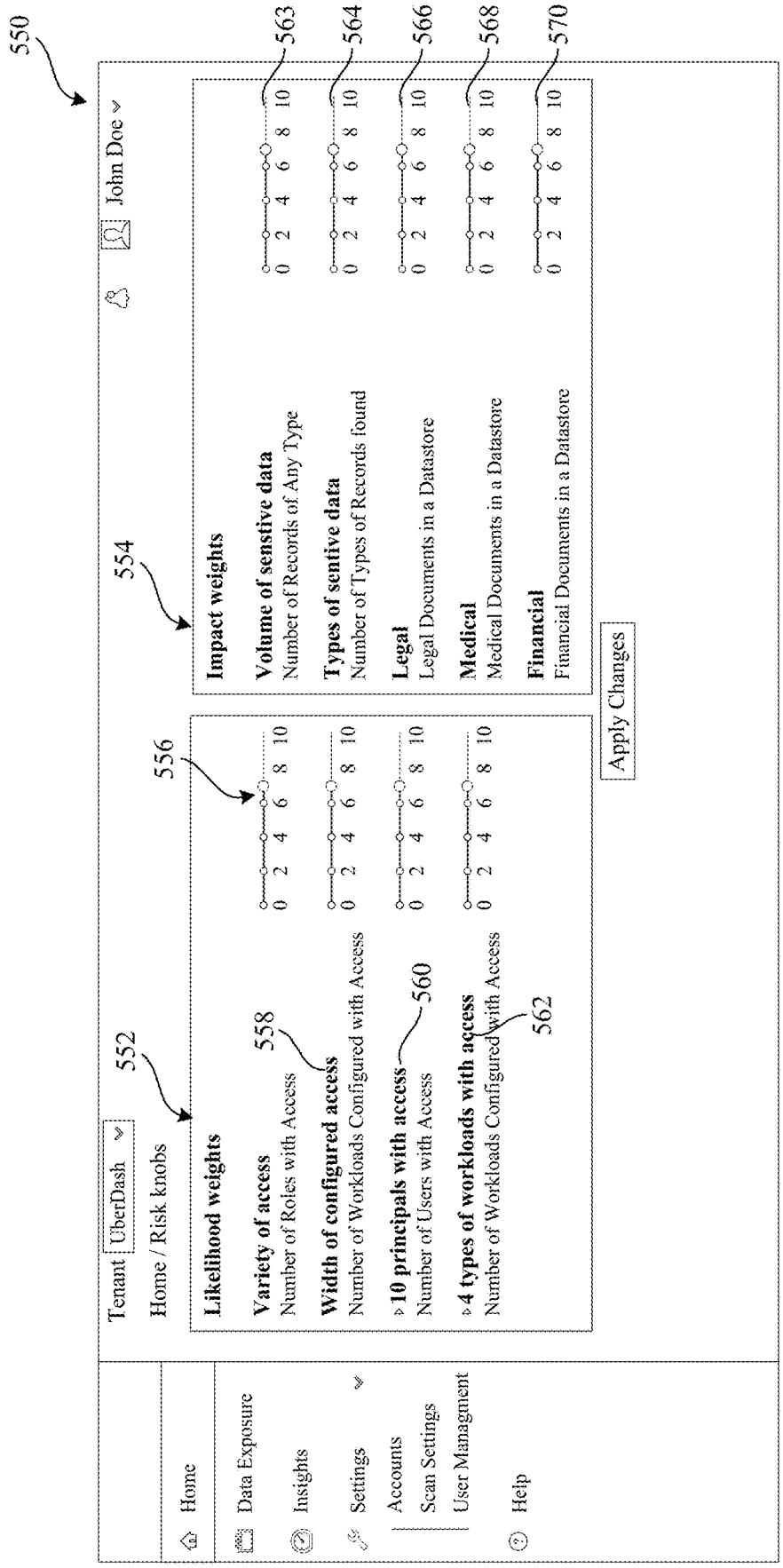
FIG. 11 illustrates one example of a user interface display that facilitates user definition of a risk criterion.

In one example, the risk criterion can be defined based on user input. FIG. 11 illustrates one example of a user interface display 550 that facilitates user definition of risk criterion. Display 550 includes a set of user input mechanisms that allows a user to define likelihood weights, represented at numeral 552, and impact weights, represented at 554.

For sake of illustration, a first user input mechanism 556 allows a user to set a weight that influences a likelihood score for variations in the variety of access to the resources (e.g., block 534). Similarly, controls 558, 560, and 562 allow a user to set weights that influence likelihood scores for a width of configured access, a number of principles or users with access, and the type of workloads with access, represented by reference numerals 558, 560, and 562, respectively.

Similarly, controls 563, 564, 566, 568, and 570, allow a user to set weights on impact scores for risk criterion associated with a volume of sensitive data, a type of sensitive data, and categories of sensitive data (i.e., legal data, medical data, financial data), respectively.

Referring again to FIG. 10, at block 572, a first subset of the storage resources that satisfy a subject vulnerability signature are identified. A subject vulnerability signature illustratively includes a risk signature indicative of a risk of vulnerability or breach.

FIG. 12 illustrates an example user interface display 574 that can be accessed from display 304 illustrated in FIG. 6, and displays a set of risk signatures. The risk signatures can be predefined and/or user-defined. For example, display 574 can include user input mechanisms that allow a user to add, delete, or modify a set of risk signatures 576. As noted above, each risk signature defines a set of criteria that the resources and data in cloud service 108-1 can be queries upon to identify indications of vulnerabilities in the cloud service. The risk signatures in FIG. 12 include a name field 578, a unique risk signature ID field 580, and a description identified in a description field 582. A result header field 584 identifies types of data that will be provided in the results when the risk signature is matched. A resource field 586 identifies the type of resource, and a tags field 588 identifies tags that label or otherwise identify the risk signature. Additionally, a likelihood factor field 590 indicates a likelihood factor that is assigned to the risk signature and an impact factor signature 592 indicates an impact factor assigned to the risk signature. The likelihood factor indicates a likelihood assigned to occurrence of the risk signature and the impact factor assigns an impact to the cloud service assigned to the occurrence of the risk signature. For sake of illustration, a likelihood factor of ten (out of a scale of ten) indicates that the vulnerability is likely to occur if the risk signature is identified in the cloud posture data, whereas a likelihood factor of one indicates a low likelihood. Similarly, an impact factor of ten (out of a scale of ten) indicates that the vulnerability is considered to have a high impact, whereas an impact factor of one indicates the vulnerability is considered to have a low impact on the cloud service.

A risk signature can be defined based upon any of a wide variety of criteria. For example, a risk signature can identify one or more configurations or settings of compute resources 130. Examples include, but are not limited to, a configuration that indicates whether the compute resource provides accessibility to a particular type of data, such as confidential data, medical data, financial data, personal data, or any other type of private and/or sensitive content. In another example, a risk signature indicates that a compute resource is publicly accessible, includes a public Internet protocol (IP) address, or has IP forwarding enabled. In another example, a risk signature indicates that a compute resource has monitoring disabled, has no IAM role assigned to the compute resource, has backup disabled, data encryption disabled, and/or a low or short backup retention policy. Also, a risk signature can identify password policies set for the compute resource. For instance, a risk signature can indicate a lack of minimum password policies, such as no minimum password length, no requirement of symbols, lowercase letters, uppercase letters, numbers, or password reuse policy. Also, a risk criterion can indicate a location of the compute resource, such as whether the compute resource is located outside of a particular region.

Risk signatures can also indicate configurations and/or settings of storage resources 132. For example, the configurations and settings can indicate authentication or permissions enforced by the storage resource, such as whether authentication is required for read, write, delete, synchronization, or any other operation. Also, the risk signature can indicate whether multi-factor authentication is disabled for the storage resource, as well as a breadth of permissions grants (e.g., whether all authenticated users are granted permissions within the storage resource). Also, a risk signature can indicate whether encryption is enabled by default, a password policy enforced by the storage resource, whether the storage resource is anonymously accessible, publicly accessible, has a key management service disabled, has logging disabled, life cycle management disabled, whether the storage resource is utilized for website hosting, has geo-restriction disabled, or has backup functionality disabled. Also, the risk signature can indicate a type of data stored by the storage resource, such as the examples discussed above.

Referring again to FIG. 10, the first subset of storage resources identified at block 572, are based on determining that the storage resources satisfy a risk signature of containing private and/or sensitive content, as represented at block 594. In another example, the subject vulnerability signature is based on a prevalence of accessibility of a given role within a network exceeding a set threshold, as represented at block 596. For instance, the given role can include principles (block 598), workloads (block 600), a cloud environment (block 602), a company (block 604), or other roles (block 606).

Also, the subject vulnerability signature can indicate that the storage resources are accessible by more than a threshold number of users, as represented at block 608. Also, the subject vulnerability signature can indicate that the storage resources are accessible by a vulnerable compute resource that is publicly accessible, as represented at block 610. This determination can be based on identifying that the compute resource is accessible through a public portal, at block 612 and/or is accessible by users outside a given company network at block 614.

As represented at block 616, the subject vulnerability signature can indicate that the storage resources are accessible by inactive users. For example, inactive users can include users who have not accessed the resources within a threshold time, at block 618.

At block 620, a second subset of storage resources are identified that synchronization data from the first subset. At block 622, a particular compute resource is determined to have anomalous access to a given storage resource. The identification of anomalous access can be based on a comparison of a network communication path of the particular compute resource against paths of other compute resources. For example, the paths of other compute resources can be used to identify an expected communication path for the particular compute resource and/or expected permission for the particular resource. Then, if a difference above a threshold is identified, the particular compute resource is identified as anomalous.

At block 624, a representation of the propagation of the breach attack along the network communication paths is generated. In one example, the representation includes a cloud attack surface map, as represented at block 626. An example cloud attack surface map includes nodes representing the resources (block 628) and edges representing the breach attack propagation (block 630). The map graphically depicts the subset of storage resources (block 632) and the subject vulnerability signature (block 634). Also, the map can graphically depict the anomalous access to the particular compute resource (block 636). For example, public accesses to the subset of storage resources can be graphically depicted at block 638 and storage resources that grant external access and/or resources that are initialized from outside a particular jurisdiction can be identified at blocks 640 and 642, respectively.

FIG. 13 illustrates one example of a user interface display 650 that graphically depicts vulnerability risks, in tabular form. In one example, display 650 renders the data discussed with respect to the cloud attack surface at block 626 of FIG. 10 in a table.

Figure 14:
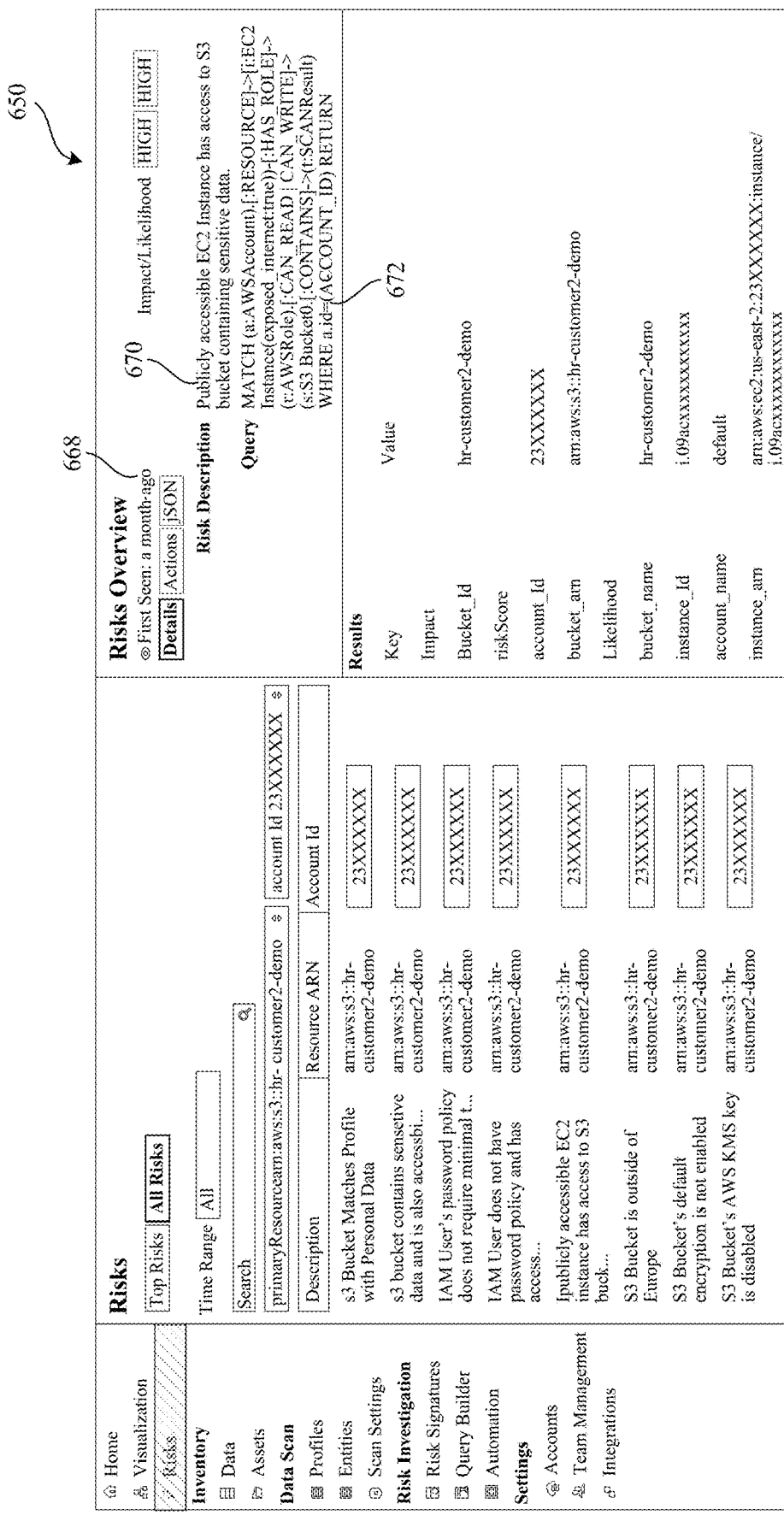
FIG. 14 illustrates one example of a details display pane.
Figures 1, 20:
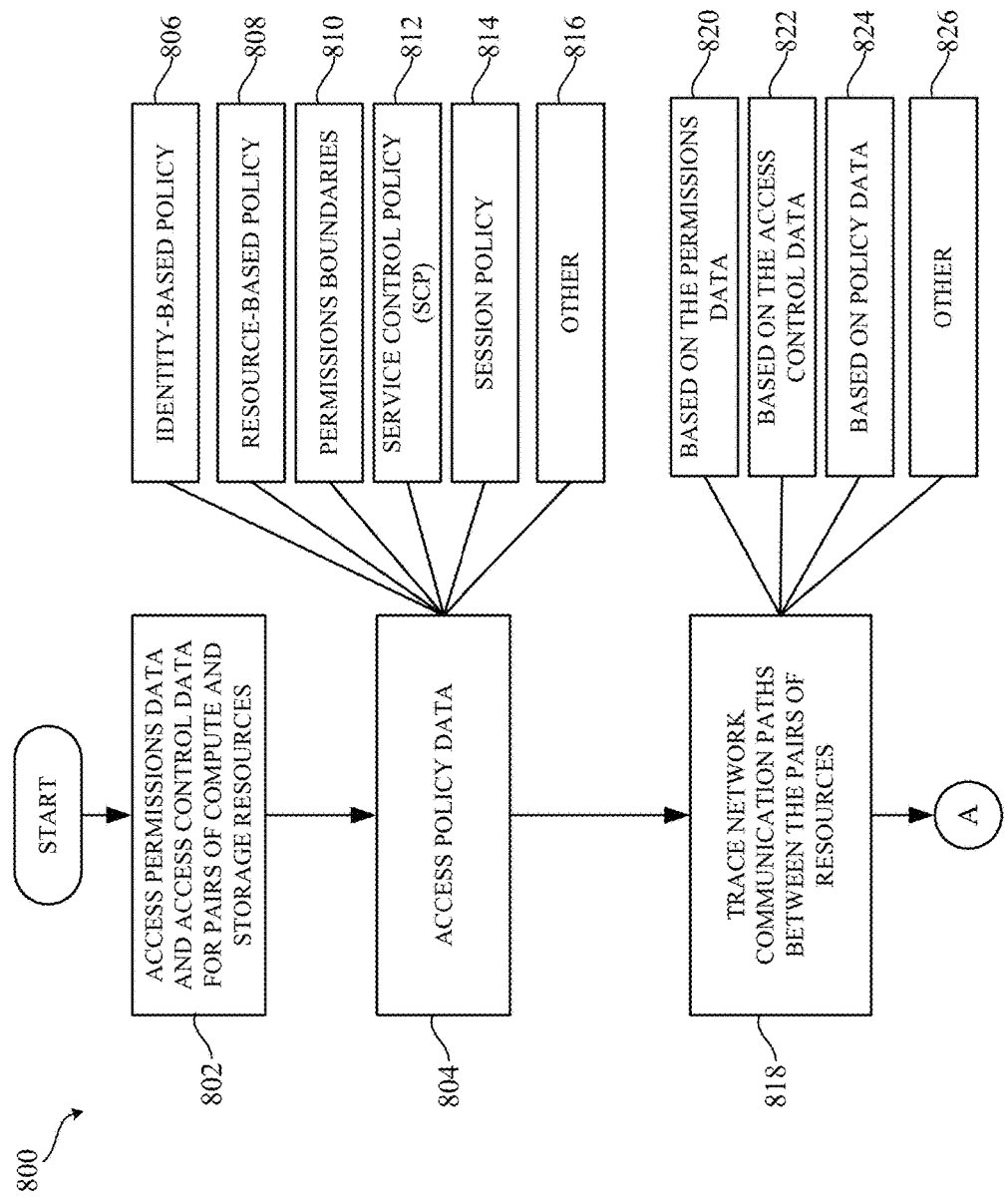
Figures 2, 20:
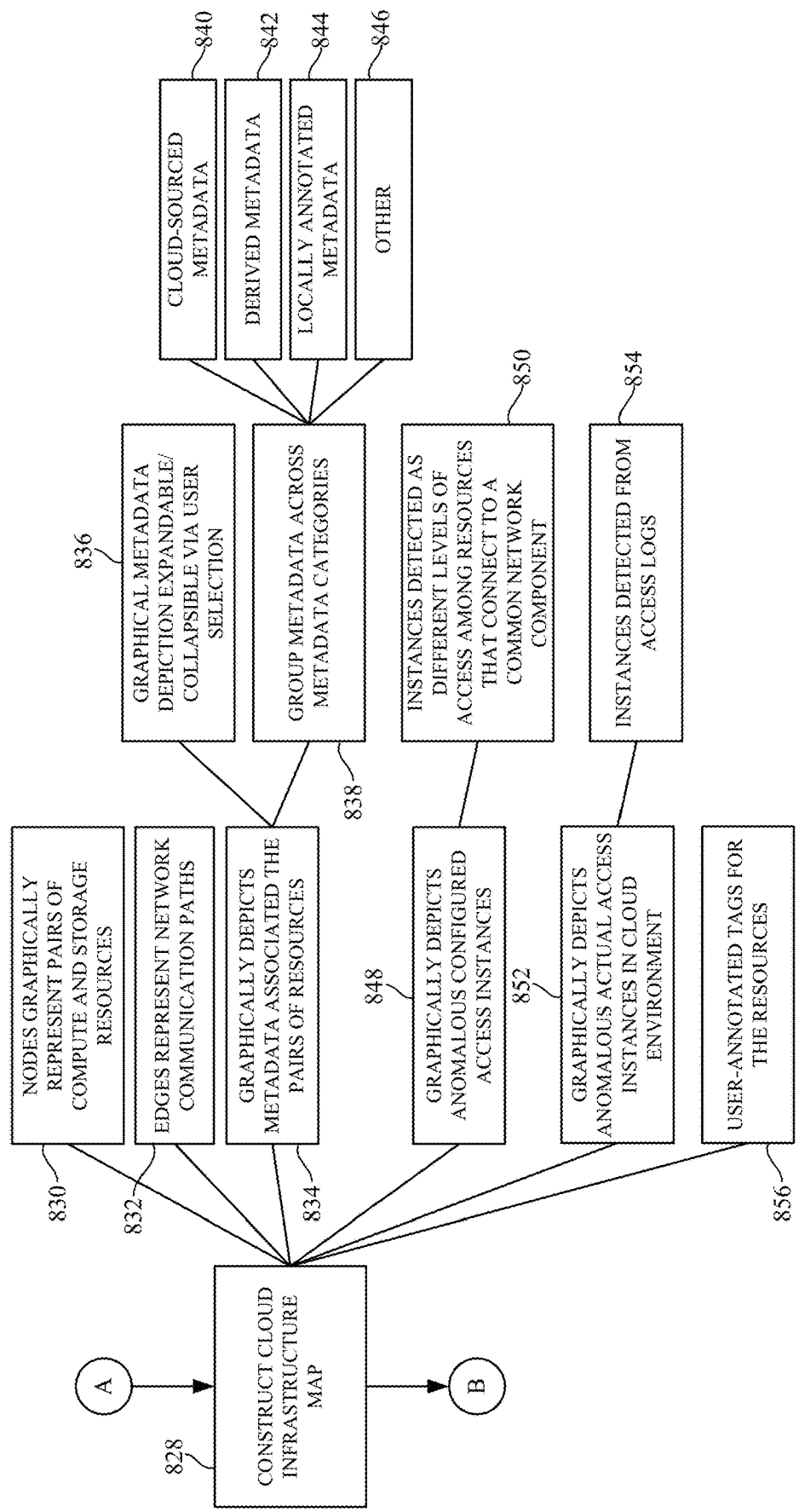
Figures 3, 20:
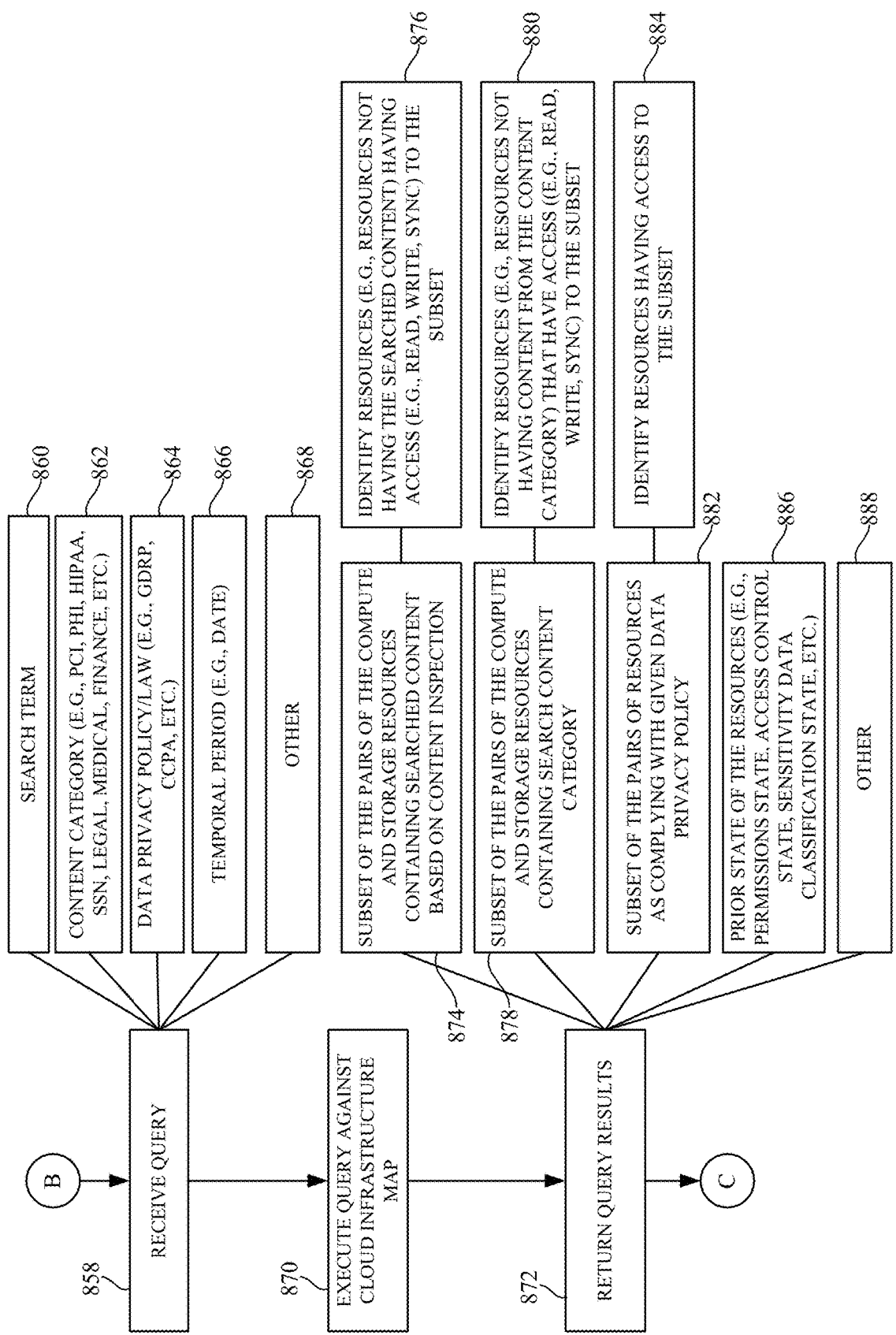

Display 650 includes a user input mechanism 652 to specify a time range for visualizing the risk, and includes a description 654, a resource identifier 656, and an account identifier 658 for the cloud service account. The display can also indicate the impact 660 and likelihood 662 of the vulnerability risk, as well as signature identifier 664 that identifies the particular risk signature that was matched. Display 650 also includes a details control 666 that is actuatable to display details of the identified risk. One example of a details display pane 668 is illustrated in FIG. 14. Display pane 668 shows a description of the risk at display element 670 and an indication 672 of the query utilized to match the risk signature.

Referring again to FIG. 10, at block 676, a query is received for execution against the results of the metadata analysis. For example, a query can specify a subject vulnerability at block 678 and/or the query can request identification of resources with anomalous access at block 680.

At block 682, the query is executed against the cloud attack surface map. For example, the cloud attack surface map can be filtered to identify results that match the query. The query results (e.g., the filtered map) is returned at block 684. The filtered results can include identifying a subset of storage resources that match the query (block 686) and/or resources having anomalous access at block 688.

The cloud attack surface graph is graphically filtered based on the results at block 690. For example, the graph can be filtered based on applications running on the pairs of resources in the identified subset (block 692). Breach likelihood scores and breach impact scores are determined for the resources at block 694, and the scores can be depicted on the cloud attack surface map at block 696. In one example, the scores are graphically categorized or stratified at block 698 into high, medium, or low risk. One example is discussed above with respect to FIG. 8.

Figure 15:
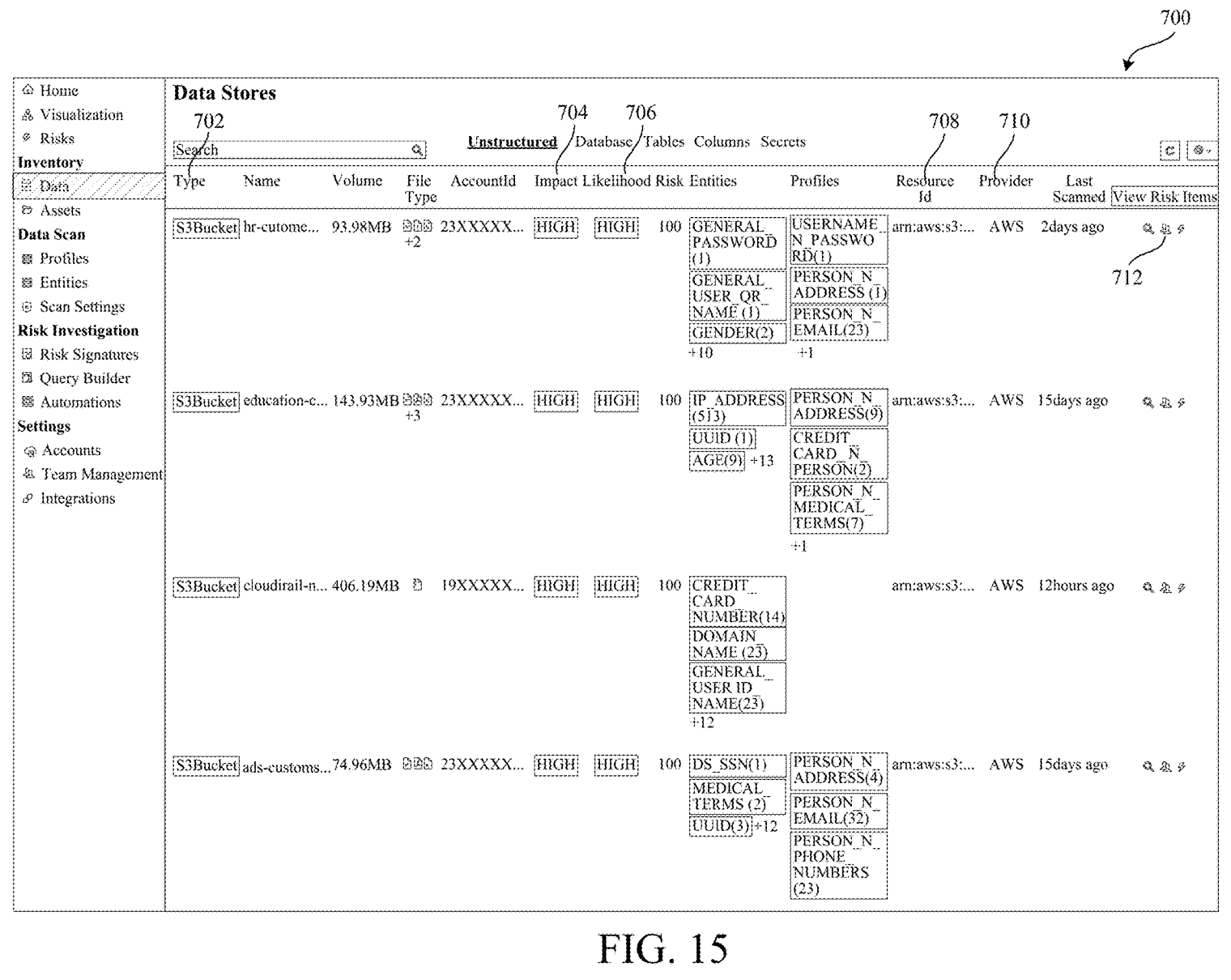

FIG. 15 illustrates one example of a user interface display 700 configured to graphically depict breach likelihood and impact scores. Display 700 identifies data stores in storage resources 132 that are identified as meeting a subject vulnerability. Each entry shown in display 700 identifies a type 702 of the resource, an impact score 704, a likelihood 706, a resource identifier 708 that identifies the resource, and a cloud service identifier 710 that identifies the particular cloud resource. Based on actuation of a risk item view generator mechanism 712, display 700 shows details for the given resource in a details pane 714, as shown in FIG. 16. Display pane 714 can show users 716 that have access to the resource, roles 718 that have access to the resource, other resources 720 that have access to the resource, as well as external users 722 or external roles 724. Display pane 714 also shows the access type 726.

FIG. 17 illustrates one example of a display pane 730 showing access details for a particular data store, along with a list of users who have access to that data store, and the access type for those users. Upon actuation of a roles actuator 732, the display shows a list of roles that have access to the data store, as shown in FIG. 18. Upon actuation of a resources actuator 734, the display shows a list of resources that have access to the data store, as shown in FIG. 19.

FIGS. 20-1, 20-2, 20-3, and 20-4 (collectively referred to as FIG. 20) provide a flow diagram 800 illustrating one example of infrastructure analysis and query execution. At block 802, permissions data and access control data for pairs of compute and storage resources is accessed. Policy data is accessed at block 804. For example, the policy data can include identity-based policies (block 806), resource-based policies (block 808), permissions boundaries (block 810), service control policies (SCP) (block 812), session policies (block 814) as well as other policies (block 816).

At block 818, network communication paths are traced between the pairs of resources. Tracing the network communication path can be based on the permissions data at block 820, the access control data at block 822, the policy data at block 824, and/or other data at block 826.

At block 828, a cloud infrastructure map is constructed. An example of a cloud infrastructure map includes nodes that graphically represent pairs of compute and storage resources (block 830), and edges that represent network communication paths between the resources (block 832). At block 834, the map graphically depicts metadata associated with the pairs of resources. For example, a graphical metadata depiction is expandable or collapsible via user selection, as represented at block 836. The metadata can be grouped across metadata categories at block 838, such as based on cloud-sourced metadata at block 840, derived metadata at block 842, locally annotated metadata at block 844, or based on other metadata categories at block 846.

The cloud infrastructure map can also graphically depict anomalous configured access instances at block 848. For example, block 848 can detect different levels of access among resources that connect to a common network component, as represented at block 850. At block 852, the map graphically depicts anomalous actual access instances in the cloud environment. For instance, the instances can be detected from access logs at block 854. User annotated tags for the resources can be depicted in the map at block 856 as well.

At block 858, a query is received. The query can include a search term 860, a content category (block 862), a data privacy policy (block 864), a temporal period (block 866), and can include other items 868 as well.

The query is executed at block 870 and query results are returned at block 872. For example, the query results can identify a subset of pairs of resources that contain the searched content at block 874. At block 876, resources are identified that do not have the search content, but have access to the subset. At block 878, the query results can identify a subset of the pairs of resources that contain a searched content category. For example, at block 880, resources are identified that do not have the content from the content category, but that have access to the subset of resources that have the searched content category.

At block 882, the query results can identify a subset of resources as complying with a given data privacy policy, specified in the query. Additionally, the results can identify resources that have access to the identified subset, at block 884. At block 886, a prior state of the resources is identified. Of course, the query results can identify other data 888 as well.

At block 890, a filter criterion is received. The filter criterion can be based on the metadata (block 892), based on applications running on at least one pair of resources (block 894), and/or based on one or more networks in the cloud environment (block 896). The networks can include virtual private clouds (VPCs) 898, regions 900, Internet gateways 902, network access control lists 904, sub networks 906, or other networks 908.

The filter criterion can also be based on tags at block 910, such as users annotated tags represented at block 912. The filter criterion can also be based on owners of the resources (block 914), a creation date and/or time of the resources (block 916), an inactive/stale criterion (block 918), or other filter criterion (block 920). At block 922, the cloud infrastructure map is filtered based on the filter criterion and a filtered cloud infrastructure map is rendered at block 924.

Figures 1, 21:
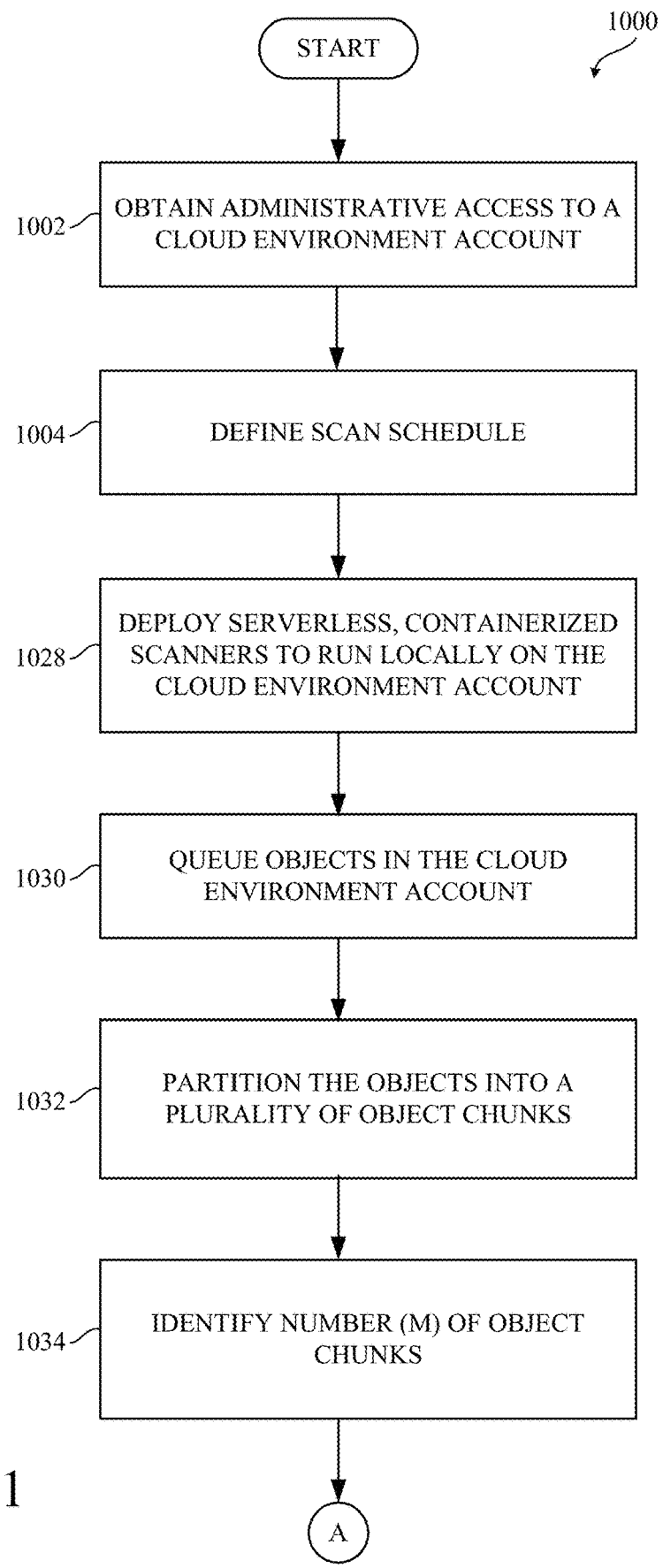
Figures 2, 21:
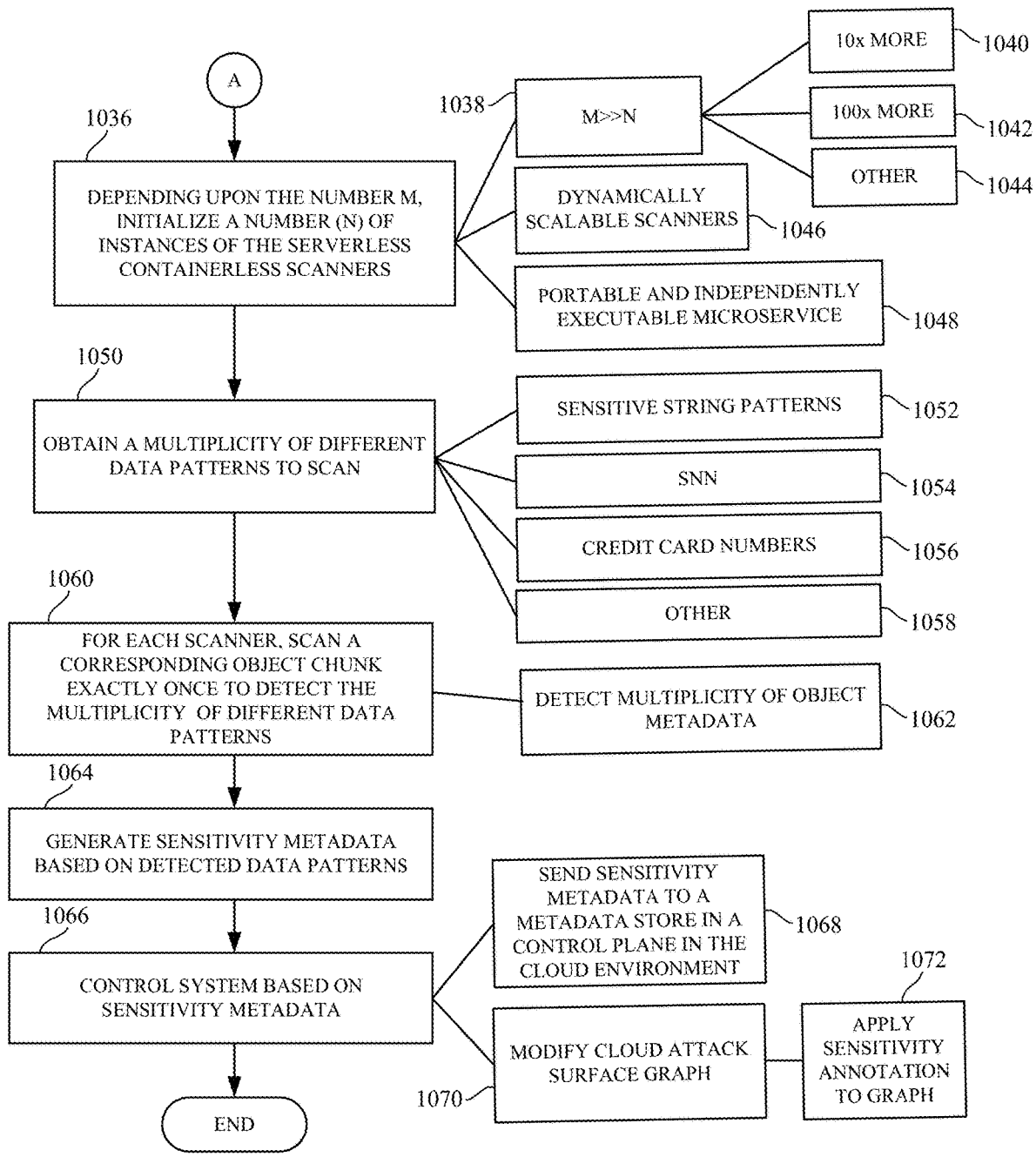

FIGS. 21-1 and 21-2 (collectively referred to as FIG. 21) provide a flow diagram 1000 illustrating one example of cloud data scanning in a cloud service. At block 1002, administrative access to the cloud account is obtained. A scan schedule for scanning the cloud account is defined at block 1004.

Figure 22:
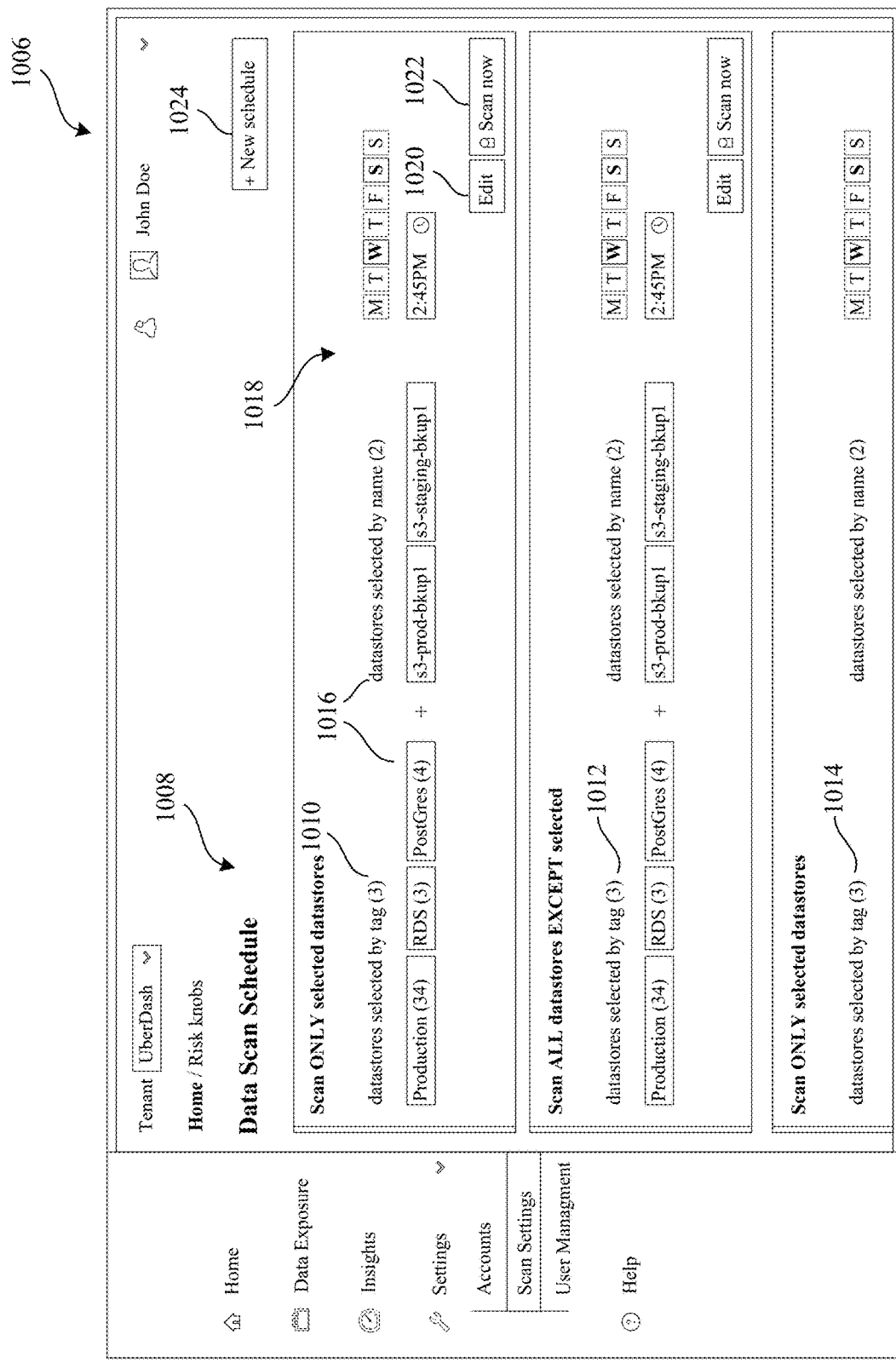

FIGS. 22 and 23 illustrates example user interface displays for defining a scan schedule at block 1004. As shown in FIG. 22, a user interface display 1006 includes a list 1008 of currently defined scan schedules 1010, 1012, 1014, etc. Each scan schedule is defined by a set of criteria 1016 for identifying which data stores are to be scanned, along with temporal criteria 1018 that define when the scan is to run. The scan schedule can be edited using an edit actuator 1020. Further, the data scan can be executed manually, through a control 1022. New schedules can be defined using a new schedule control 1024. FIG. 23 illustrates user interface display 1006 when a given one of the data scans has been initiated and includes a scan status indicator 1026.

Referring again to FIG. 21, block 1028 represents deployment and execution of a scanner locally on the cloud account. In one example, the data is access using APIs, and text is extracted using a text extraction method. Once the text is obtained, natural language processing (NLP) modules identify sensitive data in different languages. For instance, the scanner includes a file system crawler for each data store that is configured to identify pattern and context-based entities and/or machine learning-based entities, such as named entity recognition (names, company names, locations). Further, data loss prevention (DLP) engines can identify social security numbers, credit card numbers, etc. That is, the engine can identify which nodes content particular types of sensitive data.

A scanner is triggered and recognizers for sensitive entity detection are loaded, along with profiles for analysis. Text is extracted and entity detection is performed. In one example, the scanning is performed locally on the cloud service so that the organization's data does not leave the organization's cloud account, which can increase privacy and conformance with data policies. The scanners can be encapsulated as containers, that are deployed in the cloud environment using elastic compute instances, such as EC2 resources, Lambda resources, etc.

At block 1030, objects in the cloud environment are queued and, at block 1032, the objects are partitioned into a plurality of object chunks. At block 1034, a number (M) of object chunks are identified. At block 1036, depending upon the number M, a number (N) of instances of the server-less container-less scanners are initialized. In one example, the number M is significantly larger than the number N (block 1038). For example, the number M can be ten times more (block 1040) than the number N, one hundred times more (block 1042) than the number N, etc. Of course, other numbers of object chunks and instances of the scanners can be utilized, as represented at block 1044.

The scanners are dynamically scalable (block 1046), and each scanner can be portable and independently executable as a microservice (block 1048).

At block 1050, a multiplicity of different data patterns to scan are obtained. For example, the data patterns can include sensitive string patterns (block 1052), social security numbers (block 1054), credit card numbers (block 1056), or other data patterns (block 1058).

For each scanner, a corresponding object chunk is scanned exactly once to detect the multiplicity of different data patterns, as represented at block 1060. Accordingly, each scanner can identify a number of different data patterns, through a given pass through the object chunk. This single pass scanning increases efficiency by decreasing scanning latency. In one example, a multiplicity of object metadata can be detected at block 1062.

Sensitivity metadata is generated at block 1064 based on the detected data patterns. The system is controlled based on the sensitivity metadata at block 1066. For example, the sensitivity metadata is sent to a metadata store in a control plane in the cloud environment at block 1068. Alternatively, or in addition, the cloud attack surface graph is modified at block 1070. For example, sensitivity annotation is applied to the graph at block 1072.

Figures 1, 24:
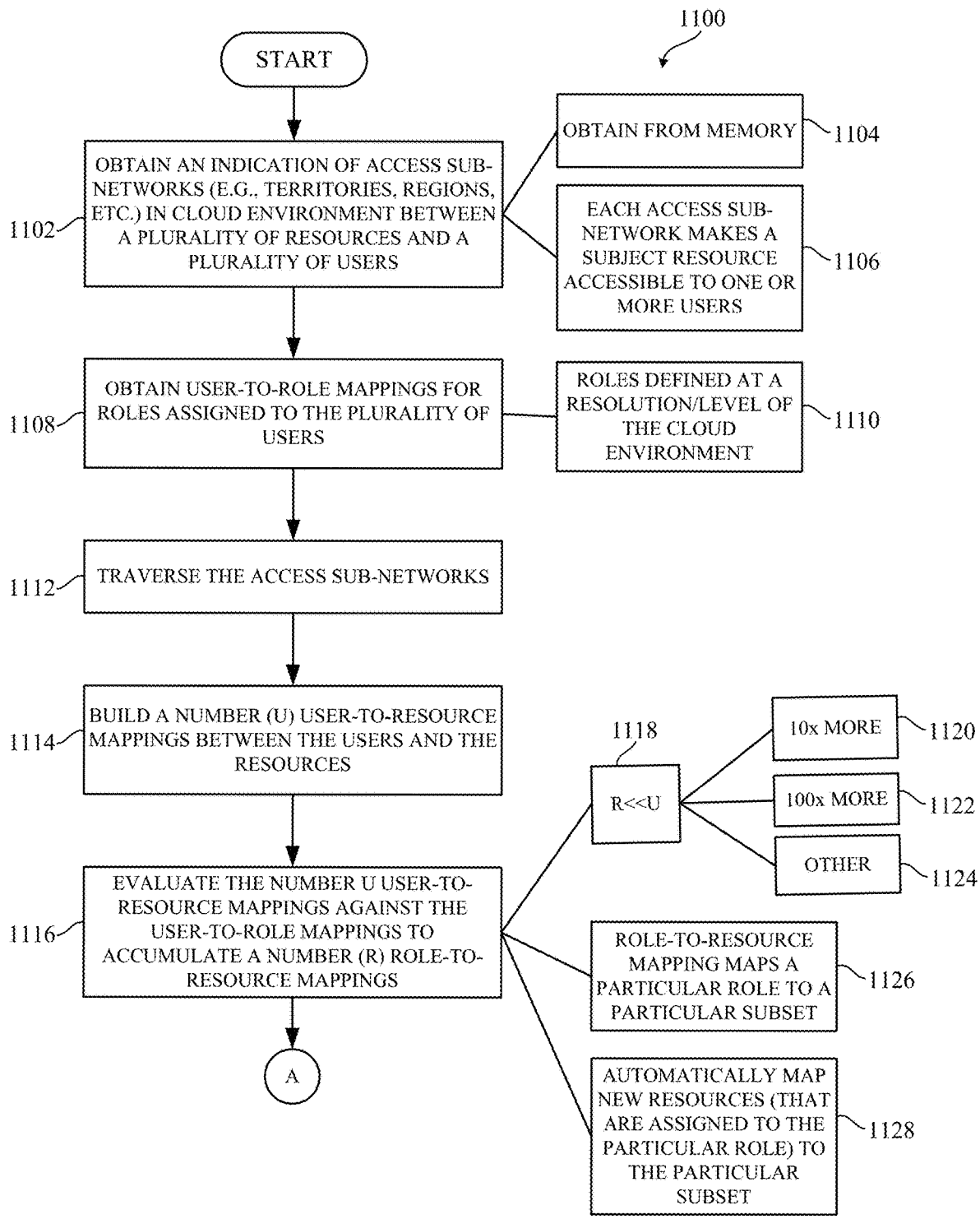
Figures 2, 24:
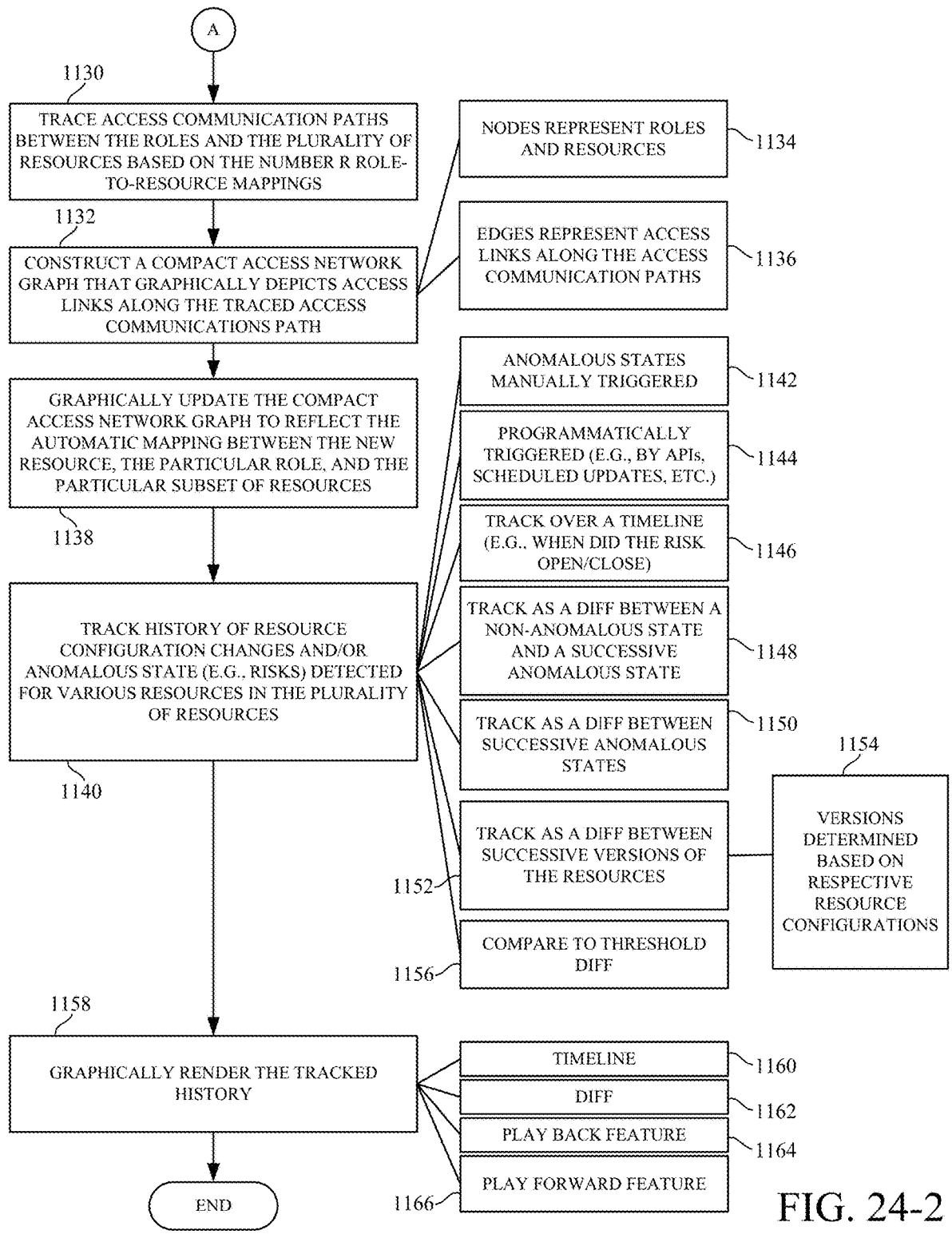

FIGS. 24-1 and 24-2 (collectively referred to as FIG. 24) provide a flow diagram 1100 illustrating one example of depicting access links along communication paths between roles and resources. At block 1102, an indication of access sub-networks (e.g., territories, regions, etc.) in a cloud environment between a plurality of resources and a plurality of users is obtained. For example, the indication can be obtained from memory at block 1104. In one example, the access sub-networks are identified as subnetworks that make a subject resource accessible to one or more users, as represented at block 1106.

At block 1108, user-to-role mappings for roles assigned to the plurality of users is obtained. For example, access management and control system 128 is used to identify roles defined at a particular resolution or level of the cloud environment, as represented at block 1110.

The access sub-networks are traversed at block 1112 and a number (U) of user-to-resource mappings between the users and the resources are built based on traversing the sub-networks, as represented at block 1114.

At block 1116, the number U of user-to-resource mappings is evaluated against the user-to-role mappings to accumulate a number (R) of role-to-resource mapping. In one example, the number U is significantly larger than the number R, as represented at block 1118. For example, the number U can be ten times more (block 1120) or one hundred times more (block 1122) than the number R. Of course, other numbers of mappings can be utilized as well, as represented at block 1124.

In one example, at block 1126 a role-to-resource mapping maps a particular role to a particular subset of resources. Also, new resources that are assigned to the particular role are automatically mapped to the particular subset, as represented at block 1128.

At block 1130, access communication paths between the roles and the plurality of resources are traced based on the number R of role-to-resource mapping.

At block 1132, a compact access network graph is constructed that graphically depicts access links along the traced access communication path. For example, the graph can include nodes that represent roles and resources (block 1134), and edges that represent access links along the access communication paths (block 1136). At block 1138, the compact access network graph can be graphically updated to reflect the new resource assigned at block 1128.

At block 1140, a history of resource configuration changes and/or anomalous state (e.g., risks) detected for various resources is tracked. For example, this tracking can be manually triggered at block 1142, or programmatically triggered at block 1154. Further, the history can be tracked over a timeline, such as to indicate when a particular risk opened and/or closed, as represented at block 1146.

At block 1148, a difference between a non-anomalous state and a successive anomalous state is tracked. The tracking can also include tracking a difference between successive anomalous states at block 1150 and/or a difference between successive versions of the resources at block 1152. For example, the versions can be determined based on respective resource configurations of the successive versions, at block 1144. The tracked difference can be compared to a threshold difference at block 1156, to determine whether to track the instance of the resource configuration and/or state change.

At block 1158, the tracked history can be graphically rendered, such as on a timeline at block 1160. The tracked difference can be graphically rendered at block 1162. Further, the tracked history can be provided with a playback feature 1164 or a play forward feature 1166, which allow a user to navigate through the tracked history.

Figure 25:
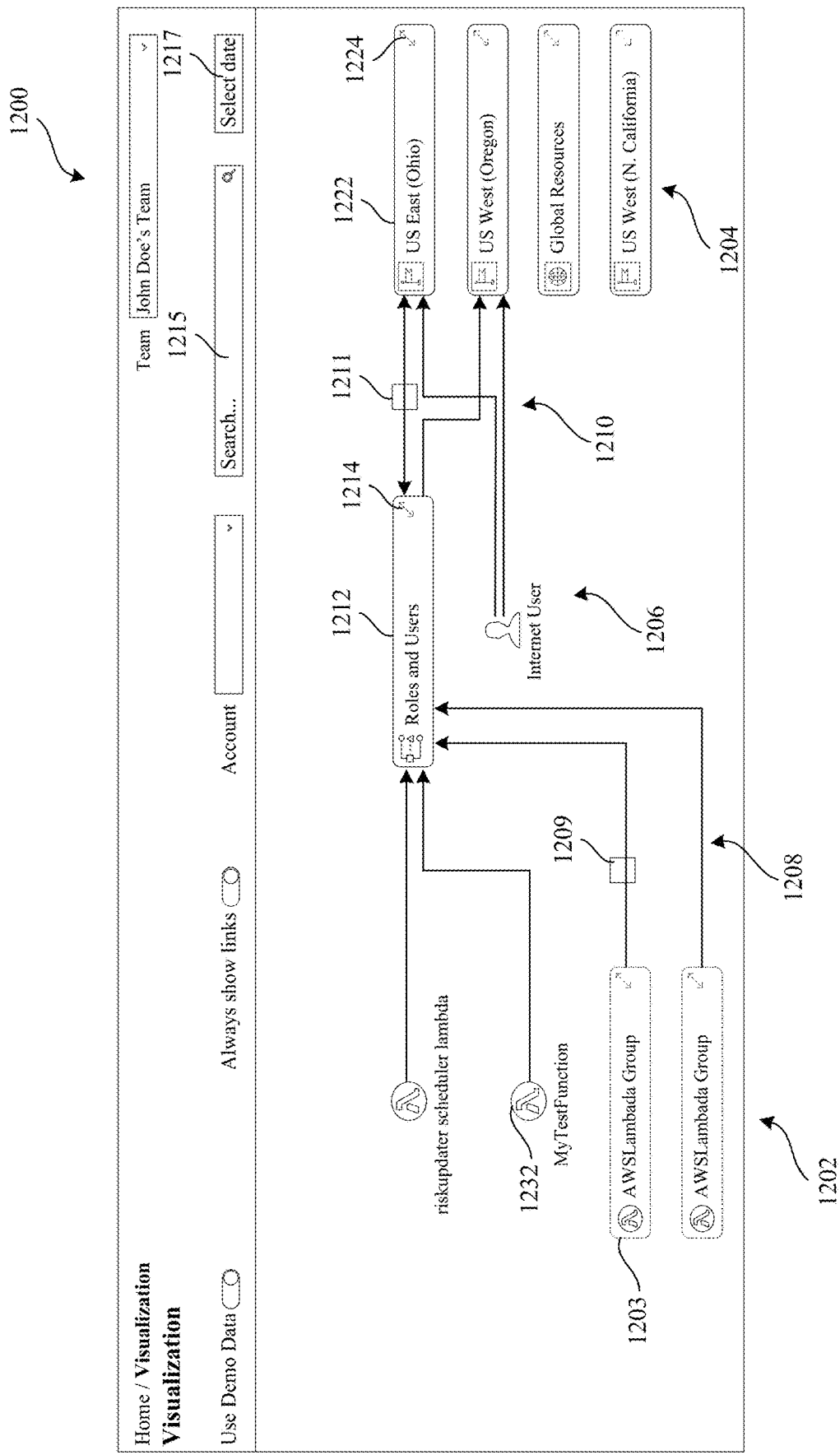

FIG. 25 illustrates a user interface display 1200 that includes a visualization of access communication paths. The visualization in FIG. 25 can be rendered as a cloud infrastructure graph (e.g., map) that shows relationships between compute and storage resources and/or mappings between users, roles, and resources, based on the permissions data and the access control data. Further, the visualization can be augmented using sensitivity classification data to represent propagation of breach attack along communication paths. For example, the visualization in FIG. 25 can be configured to render the subset(s) of resources identified in FIG. 10. That is, display 1200 can include the cloud attack surface map at block 626.

As shown in FIG. 25, nodes 1202 represent compute resources and nodes 1204 represent storage resources. Illustratively, the storage resources include data stores or buckets within a particular cloud service. Nodes 1206 represent roles and/or users. The links (e.g., access paths) or edges 1208 between nodes 1202 and 1206 represent that compute resources that can access the particular roles represented by nodes 1206. The edges or links 1210 represent the storage resources that can be accessed by the particular roles or users represented by nodes 1206.

Based on these relationships between compute and storage relationships, display elements can be rendered along, or otherwise visually associated with, the edges 1208 and/or 1210, to identify and graphically depict the propagation of breach attack. For instance, vulnerability display elements can be rendered in association with edges 1208 and/or 1210 to identify that a subject vulnerability signature (e.g., one or more risk signatures shown in FIG. 12) has been identified in the data, based on querying the permissions and access control data using the subject vulnerability signature. For example, display element 1209 represents a risk signature between nodes 1203 and 1212 and display element 1211 represents (such as by including a description, icon, label, etc.) a risk signature between nodes 1212 and 1222. Each display element 1209, 1211 can represent (such as by including a description, icon, label, etc.) corresponding likelihood and impact scores, can be actuatable to render details of the subject vulnerability, such as in a display pane on display 1200. The details can include which risk signature has been matched, which sensitive data is at risk, etc.

The graph can be interactive at a plurality of different resolutions or levels. For example, a user can interact with the graph to zoom into a specific subset, e.g., based on cloud vendor concepts of proximity (regions, virtual private clouds (VPCs), subnets, etc.). Node 1212 includes an expand actuator 1214 that is actuatable to expand the display to show additional details of the roles, role groups, and/or users represented by node 1212.

When zooming into one region, such as when using the actuators discussed below, other regions can be zoomed out. This can be particularly advantageous when handling large diagrams. Further, the graph includes one or more filter mechanisms configured to filter the graph data by logical properties, such as names, values of various fields, IP addresses, etc. For example, a free form search box 1215 is configured to receive search terms and filter out all resources (e.g., by removing display of those resources) except those resources matching the search terms. In one example, the search terms include a subject vulnerability signature (e.g., containing private and sensitive content, public accessibility, accessibility by a particular user and/or role, particular applications running on the resources, access types, etc.).

An input mechanism 1217 is configured to receive a temporal filter or search criterion. For example, a filter criterion is entered by a user to represent at least one of a creation time or date of computer resources and storage resources. Further, a query can be entered specifying at least one temporal period, wherein the cloud infrastructure map is updated to graphically return at least one prior state (e.g., a permissions state, an access control state, and/or a sensitivity data classification state) of compute resources and storage resources based on the temporal period.

A checkbox (not shown in FIG. 25, and which can be global to the diagram) provides the ability to toggle whether or not direct neighbors of the matching resources are also displayed, even if those neighbors themselves don't match the search terms. This allows users to search for specific resources and immediately visualize all entities that have access to the searched resources. To illustrate, assume a search for personally identifiable information (PII) matches a set of S3 buckets. In this case, the graph renders resources that have access to that PII. Further, the graph can show associated data and metadata (e.g., properties extracted from cloud APIs, properties derived such as presence of sensitive data, access paths, etc.). This data and metadata can be shown on a panel to the left or right of the diagram (such as shown in FIGS. 27-30). Further, user can actuate user interface controls to collapse/expand this panel. In one example, the panel remains collapsed or expanded until changed, even across different searches and login sessions. Additionally, the display can groups properties in related categories (e.g., summary, all metadata retrieved from the cloud, all metadata derived, local annotations, etc.), and the diagram can be filtered (such as by using the free form search bar mentioned above) by metadata such as tags, applications running on them, identified owners, time since created, etc.). The state of the resources can be shown as of a user defined date or time. A calendar component can allow users to select a particular date to visualize historical state data as of that particular date.

In one example, a user interface control allows user to define critical data (e.g., crown jewel data), such as through a filter mechanism (e.g., search box 1215). The display then visually highlights that critical data along with all entities with access (defined by a filter such as CAN_READ/CAN_WRITE/CAN_SYNC etc) to the critical data. Anomalous configured access (different levels of access among similar resources can be visually highlighted in the display. For example, if there are four EC2 instances in a worker group connected to the same load balancer, all of the EC2 instances are expected to have the same type of access. However, if one of the EC2 instances has different access, the EC2 instance is identified as anomalous and visually highlighted to the user. Similarly, the display can visually highlight anomalous actual access. That is, instead of inspecting configured access, the system looks at actual access determined using, for example, access logs (e.g., cloudtrail logs, S3 access logs, etc.).

Further, the display can be configured to allow the user to add tags to one or more selected resources in the diagram. For instance, when users visualize cloud assets in context, the user can add additional tags that let the user write policies, perform filtering etc. that further aid in visualization and understanding. The user interface allows the user to choose one or more resources and add tags (keys and values in AWS Tags, for example) to selected resources.

Figure 26:
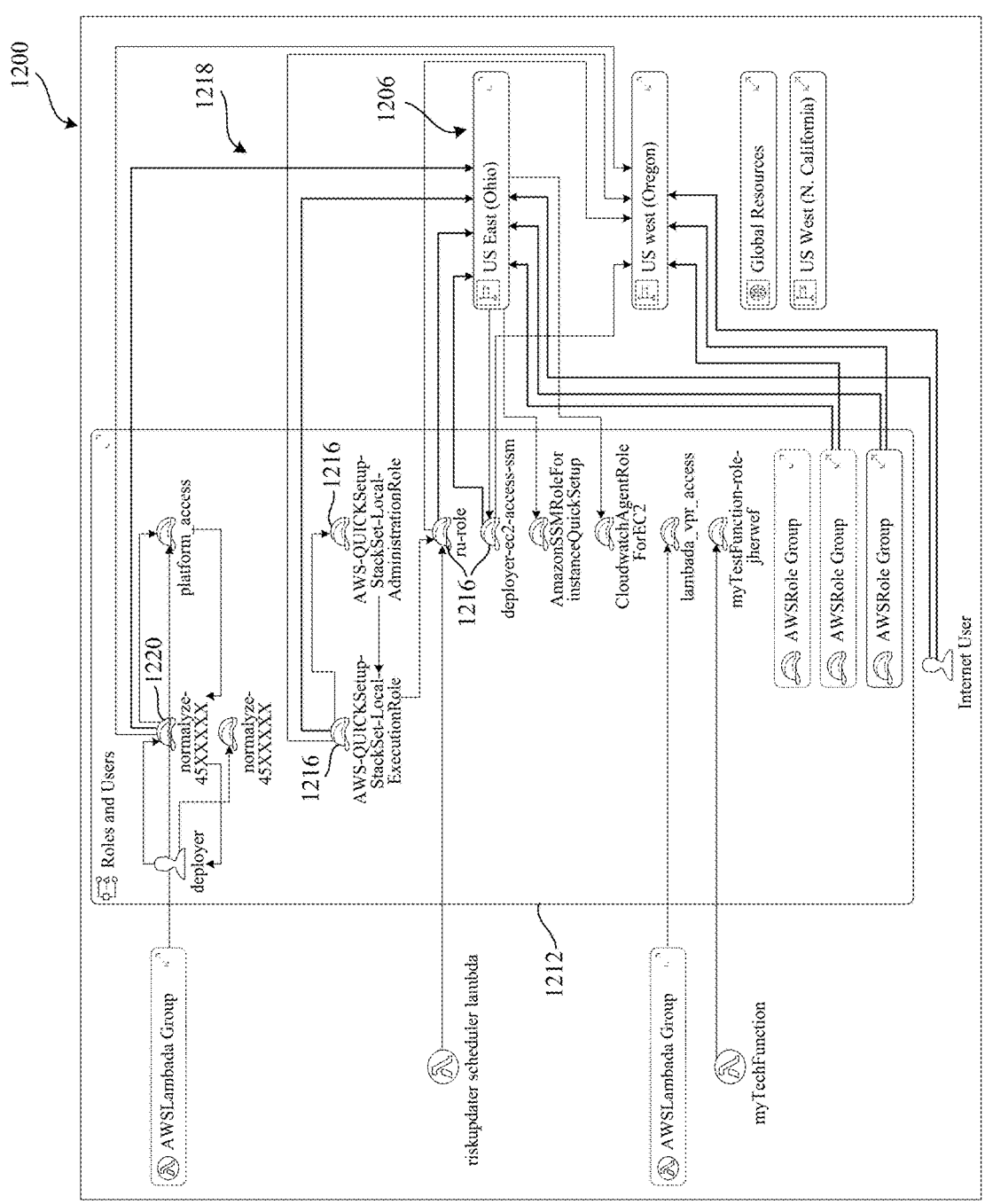

FIG. 26 shows display 1200 after actuation of actuator 1214. As shown in FIG. 26, node 1212 has been expanded to show particular roles or role groups 1216 and the relationships between those roles and role groups (as represented by links 1218), to the nodes 1206. Role groups 1216 is represented by an actuatable display element, that is actuatable to display additional details associated with the corresponding role. For example, display element 1220 is actuatable to display details of the corresponding role, as shown in FIG. 27.

Figure 28:
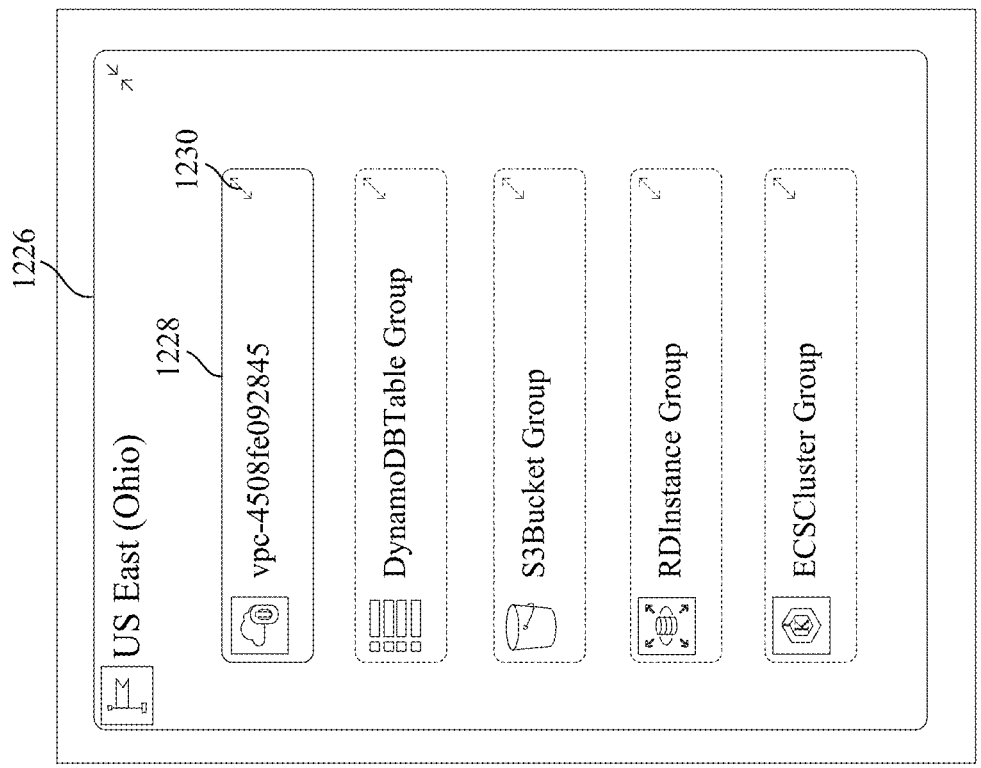
Figure 29:
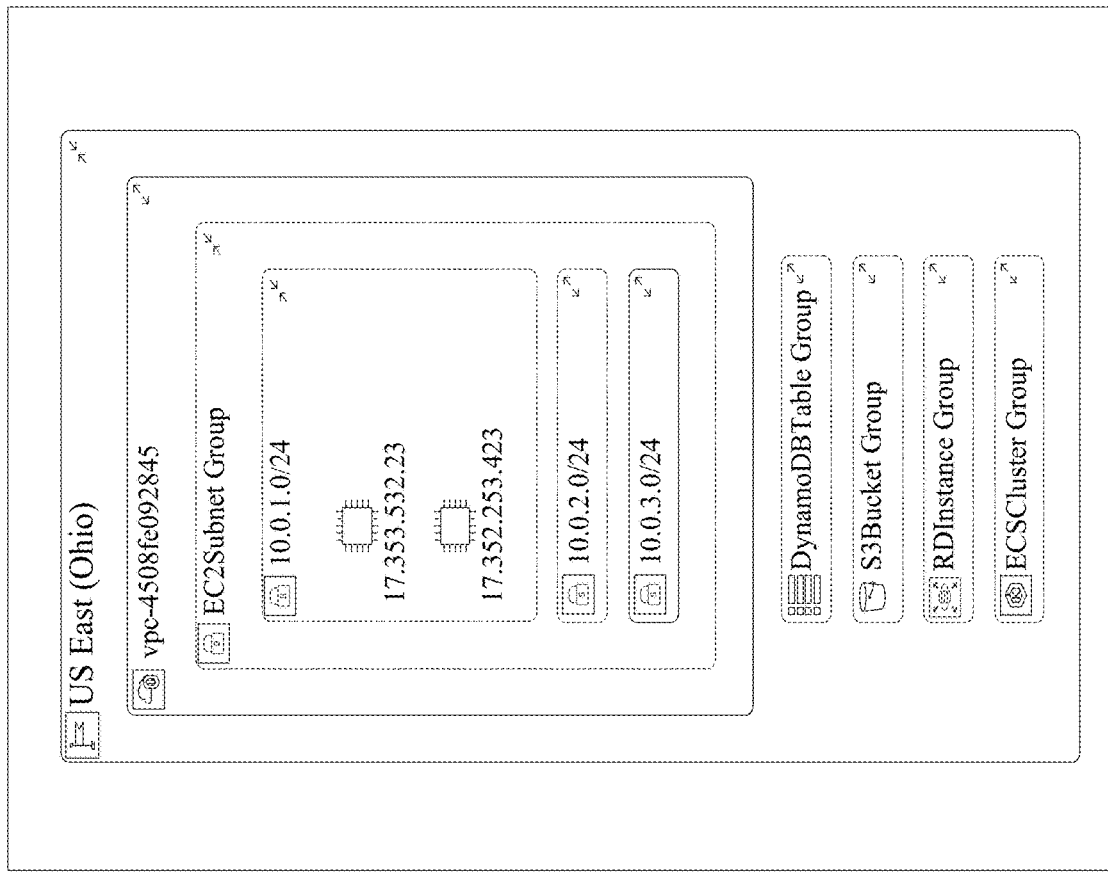

Referring again to FIG. 25, the nodes 1204 representing the storage resources are also actuatable to show additional details. For example, node 1222 includes an actuator 1224 that is actuatable to display the view shown in FIG. 28. FIG. 28 includes a representation 1226 of the constituents of the storage resource represented by node 1222. One or more of the elements are further actuatable to show additional details of the constituent. For example, node display element 1228 includes an actuator 1230 to show, in the example display of FIG. 29, details of the virtual private cloud represented by node display element 1228.

Referring again to FIG. 25, node 1232 is actuatable to show details of the corresponding compute resource. An example display for compute resource details is shown in FIG. 30.

FIG. 31 shows one example of a user interface display 1250 that visualizes resources identified based on the data scanning performed on cloud service 108-1. Display 1250 includes a list of display elements 1252, each representing a particular resource. Each entry includes an account ID 1254, a resource type 1256, a name 1258, and a region 1260. A details actuator 1262 can be actuated to show additional details of the corresponding resource. For example, FIG. 32 shows a display 1264, that is displayed in response to actuation of actuator 1262.

Referring again to FIG. 31, display 1250 includes navigation actuators 1266, that are actuatable to navigate through different portions of the list. FIG. 33 illustrates a second page displayed in response to actuation of control 1268.

FIG. 34 shows an example of a user interface display 1270 displaying details of a particular resource, and includes a details actuator 1272. Actuation of actuator 1272 displays the interface shown in FIG. 35. As shown in FIG. 35, the resource (illustratively "config-service-main") is an AWS role having an access type identified at display element 1274. The access type typically depends on the resource. In the present case, a principle 1276 identifies the entities that have the given role, and the access type identifies that the identified entities can assume the given role relative to the resource. This definition connects the roles to the resources.

Figure 36:
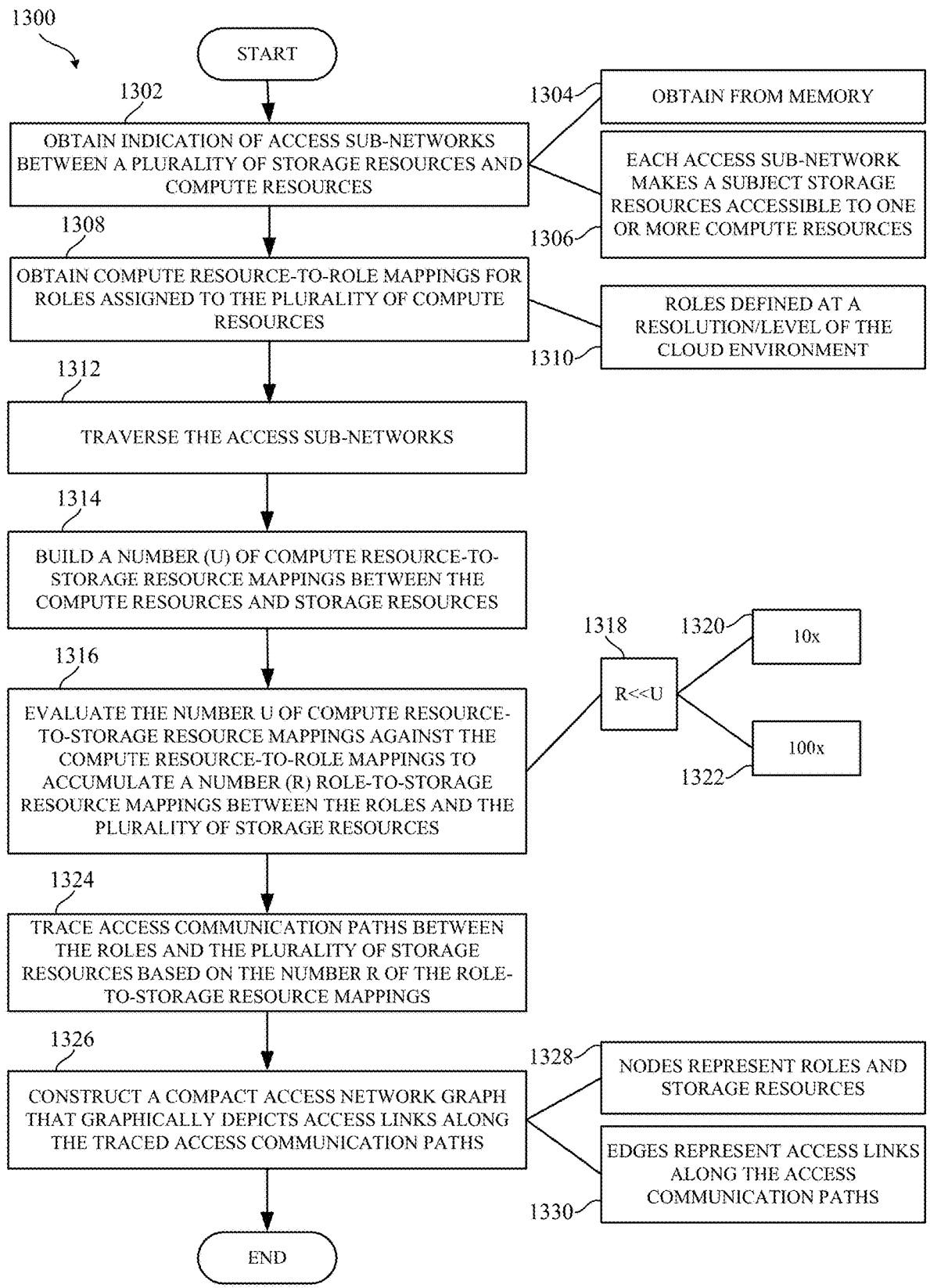
FIG. 36 provide a flow diagram for streamlined analysis of access sub-networks in a cloud environment.

FIG. 36 illustrates a flow diagram 1300 for streamlined analysis of access sub-networks, such as regions or territories, in a cloud environment. At block 1302, an indication of access sub-networks between a plurality of storage resources and compute resources is obtained. For example, the indication can be obtained from memory at block 1304. In one example, each access sub-network makes a subject storage resource accessible to one or more compute resources, as represented at block 1306.

At block 1308, compute resources-to-role mappings for roles assigned to the plurality of compute resources is obtained. Each mapping, in one example, maps a particular resource to a particular role defined in the cloud environment. The roles can be defined at a resolution or level of the cloud environment, as represented at block 1310.

At block 1312, the access sub-networks are traversed to build, at block 1314, a number (U) of compute resources-to-storage resource mappings between the compute resources and storage resources. Each mapping, in one example, maps a particular compute resource to a particular storage resource.

At block 1316, the number U of compute resources-to-storage resource mappings is evaluated against the compute resource-to-role mappings to accumulate a number (R) role-to-storage resource mappings between the roles and the plurality of storage resources. Each mapping, in the number R, maps a particular role to a particular storage resource and indicates which storage resource that particular role can access. In one example, the number U is significantly larger than the number R, as represented at block 1318. For example, the number U can be greater than approximately ten times the number R, as represented at block 1320. In another example, the number U is greater than approximately one hundred times the number R, as represented at block 1322. These, of course, are for sake of example only.

At block 1324, the access communication paths are traced between the roles and the plurality of storage resources based on the number R of the role-to-storage resource mappings.

At block 1326, a compact access network graph is constructed that graphically depicts access links along the traced access communication paths. Examples of a network graph are discussed above. Briefly, in one example, nodes in the graph represent roles and storage resources (block 1328), and edges represent access links along the access communication paths (block 1330).

It can thus be seen that the present disclosure describes technology for security posture analysis of a cloud account. In some described examples, the technology can discover sensitive data among the cloud storage resources and as well as access patterns to the sensitive data, using local scanners that reduce or eliminate need to send the cloud data outside the cloud environment. This improves data security. Further, the technology facilitates the discover of security vulnerabilities to understand the data security posture, detect, and remediate the security vulnerabilities, and to prevent future breaches to sensitive data. The system provides real-time visibility and control on the control data infrastructure by discovering resources, sensitive data, and access paths, and tracking resource configuration, deep context, and trust relationships in real-time as a graph or other visualization.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms. For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

The above discussion has described a variety of different systems, components, logic, and interactions. One or more of these systems, components, logic and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 37:
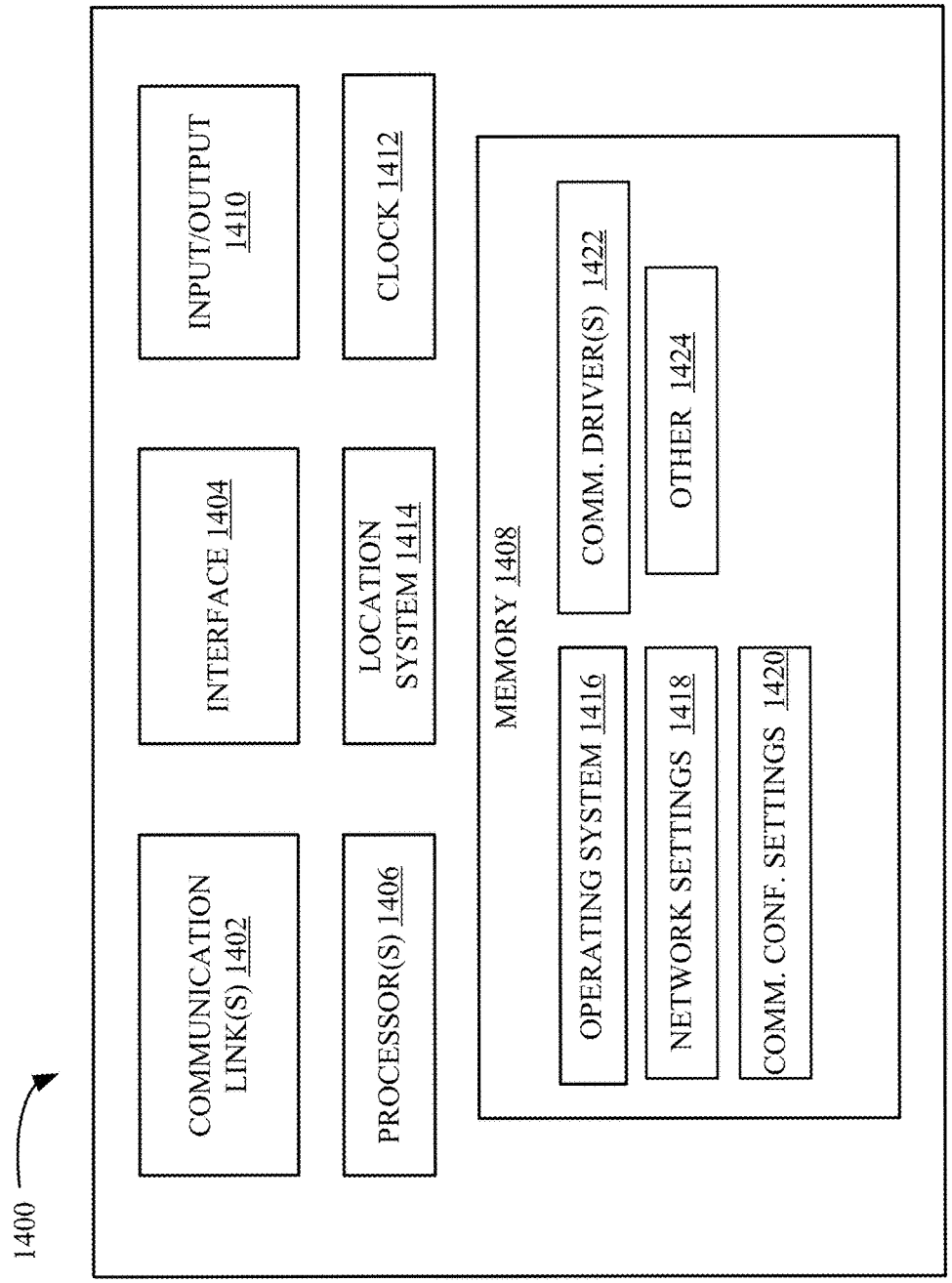
FIG. 37 is a simplified block diagram of one example of a client device.
Figure 38:
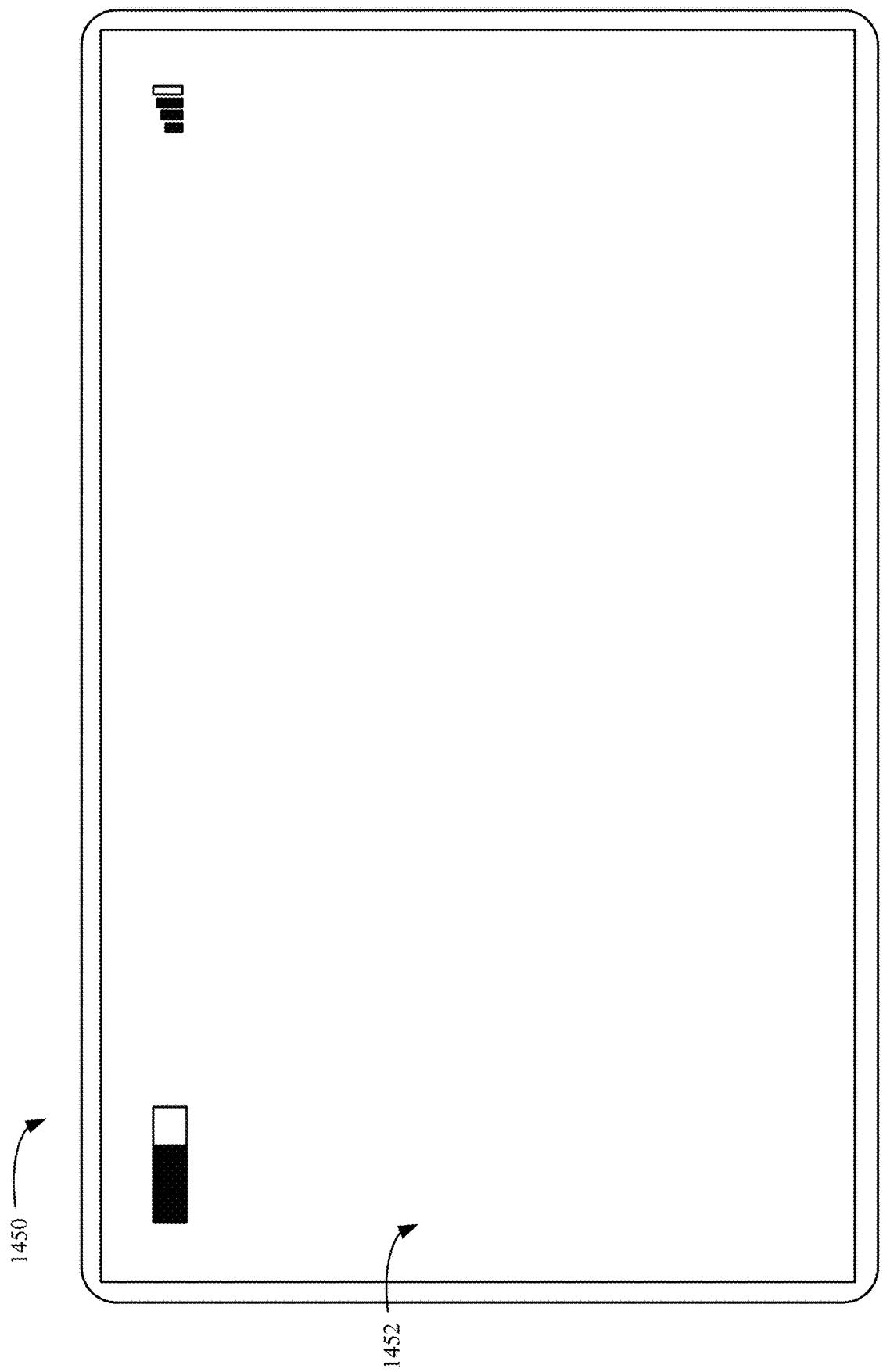
FIG. 38 illustrates an example of a handheld or mobile device.

FIG. 37 is a simplified block diagram of one example of a client device 1400, such as a handheld or mobile device, in which the present system (or parts of the present system) can be deployed. FIG. 38 illustrates an example of a handheld or mobile device.

One or more communication links 1402 allows device 1400 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1404. Interface 1404 and communication links 1402 communicate with one or more processors 1406 (which can include processors or servers described with respect to the figures) along a communication bus (not shown in FIG. 14), that can also be connected to memory 1408 and input/output (I/O) components 1410, as well as clock 1412 and a location system 1414.

Components 1410 facilitate input and output operations for device 1400, and can include input components such as microphones, touch screens, buttons, touch sensors, optical sensors, proximity sensors, orientation sensors, accelerometers. Components 1410 can include output components such as a display device, a speaker, and or a printer port.

Clock 1412 includes, in one example, a real time clock component that outputs a time and date, and can provide timing functions for processor 1406. Location system 1414 outputs a current geographic location of device 1400 and can includes a global positioning system (GPS) receiver, a LORAN system, a dead reckoning system, a cellular triangulation system, or other positioning system. Memory 1408 stores an operating system 1416, network applications and corresponding configuration settings 1418, communication configuration settings 1420, communication drivers 1422, and can include other items 1424. Examples of memory 1408 include types of tangible volatile and non-volatile computer-readable memory devices. Memory 1408 can also include computer storage media that stores computer readable instructions that, when executed by processor 1406, cause the processor to perform computer-implemented steps or functions according to the instructions. Processor 1406 can be activated by other components to facilitate functionality of those components as well.

FIG. 38 illustrates one example of a tablet computer 1450 having a display screen 1452, such as a touch screen or a stylus or pen-enabled interface. Screen 1452 can also provide a virtual keyboard and/or can be attached to a keyboard or other user input device through a mechanism, such as a wired or wireless link. Alternatively, or in addition, computer 1450 can receive voice inputs.

Figure 39:
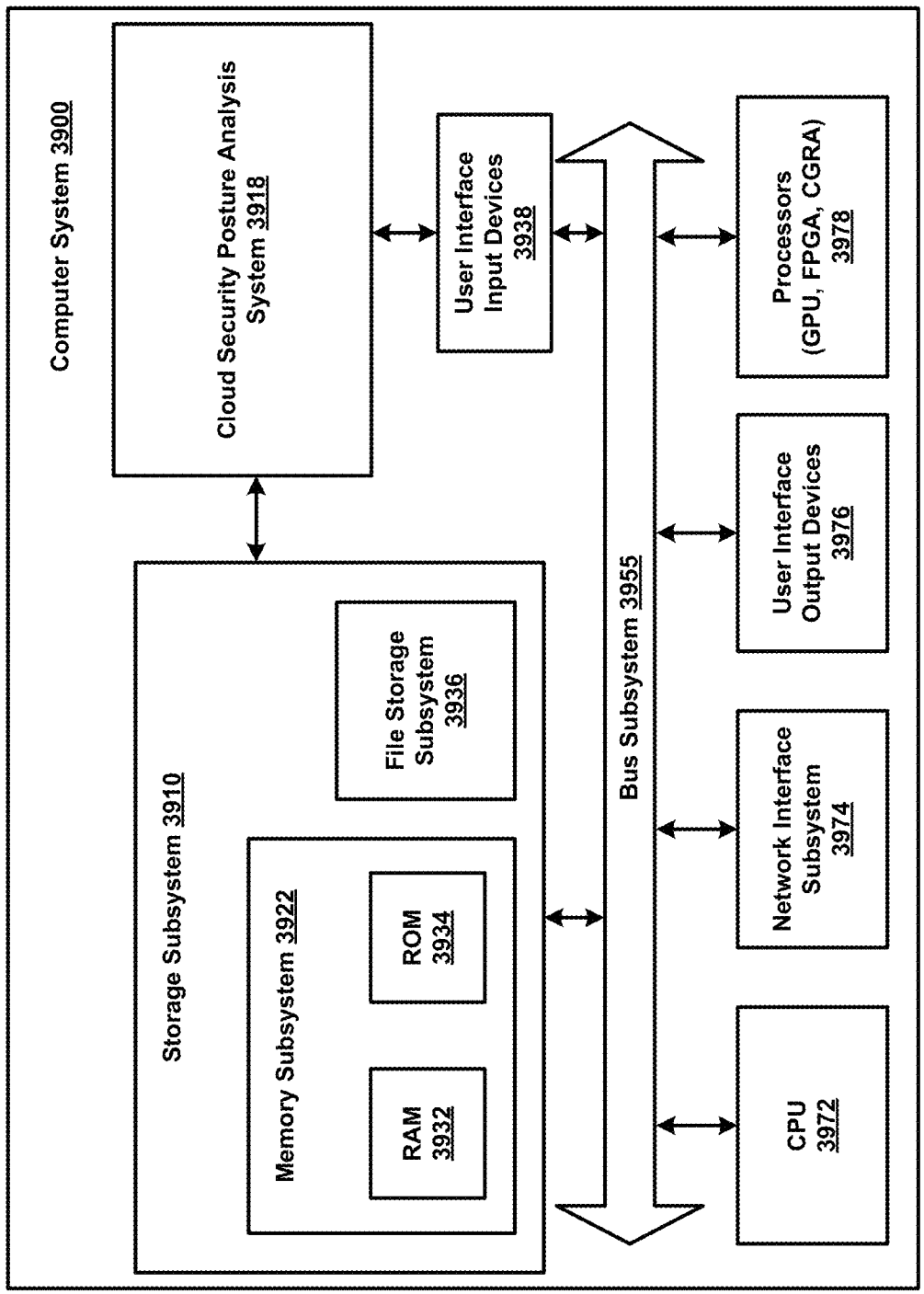
FIG. 39 shows an example computer system.

FIG. 39 shows an example computer system 3900 that can be used to implement the technology disclosed. Computer system 3900 includes at least one central processing unit (CPU) 3972 that communicates with a number of peripheral devices via bus subsystem 3955. These peripheral devices can include a storage subsystem 3910 including, for example, memory devices and a file storage subsystem 3936, user interface input devices 3938, user interface output devices 3976, and a network interface subsystem 3974. The input and output devices allow user interaction with computer system 3900. Network interface subsystem 3974 provides an interface to outside networks, including an interface to corresponding interface devices in other computer systems.

In one implementation, cloud security posture analysis system 3918 is communicably linked to the storage subsystem 3910 and the user interface input devices 3938.

User interface input devices 3938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 3900.

User interface output devices 3976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 3900 to the user or to another machine or computer system.

Storage subsystem 3910 stores programming and data constructs that provide the functionality of some or all of the modules and methods described herein. These software modules are generally executed by processors 3978.

Processors 3978 can be graphics processing units (GPUs), field-programmable gate arrays (FPGAs), application-specific integrated circuits (ASICs), and/or coarse-grained reconfigurable architectures (CGRAs). Processors 3978 can be hosted by a deep learning cloud platform such as Google Cloud Platform™, Xilinx™, and Cirrascale™. Examples of processors 3978 include Google's Tensor Processing Unit (TPU)™, rackmount solutions like GX4 Rackmount Series™, GX50 Rackmount Series™, NVIDIA DGX-1™, Microsoft' Stratix V FPGA™, Graphcore's Intelligent Processor Unit (IPU)™, Qualcomm's Zeroth Platform™ with Snapdragon processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 3922 used in the storage subsystem 3910 can include a number of memories including a main random access memory (RAM) 3932 for storage of instructions and data during program execution and a read only memory (ROM) 3934 in which fixed instructions are stored. A file storage subsystem 3936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 3936 in the storage subsystem 3910, or in other machines accessible by the processor.

Bus subsystem 3955 provides a mechanism for letting the various components and subsystems of computer system 3900 communicate with each other as intended. Although bus subsystem 3955 is shown schematically as a single bus, alternative implementations of the bus subsystem can use multiple busses.

Computer system 3900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 3900 depicted in FIG. 39 is intended only as a specific example for purposes of illustrating the preferred implementations of the present invention. Many other configurations of computer system 3900 are possible having more or less components than the computer system depicted in FIG. 39.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding section—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for streamlined analysis of access sub-networks in a cloud environment, comprising: memory storing access sub-networks in a cloud environment between a plurality of resources and a plurality of users, wherein a subject access sub-network makes a subject resource accessible to one or more users; memory storing user-to-role mappings for roles assigned to the plurality of users, wherein the roles are defined at a resolution of the cloud environment; and accumulation logic, having access to the access sub-networks and to the user-to-role mappings, and configured to traverse the access sub-networks to build a number U user-to-resource mappings between the plurality of users and the plurality of resources, and to evaluate the number U user-to-resource mappings against the user-to-role mappings to accumulate a number R role-to-resource mappings between the roles and the plurality of resources, wherein $R \ll U$.

2. The system of claim 1, wherein the number U user-to-resource mappings is greater than approximately one hundred times the R role-to-resource mappings.

3. The system of claim 1, wherein the number U user-to-resource mappings is greater than approximately one thousand times the R role-to-resource mappings.

4. The system of claim 1, further configured to:
trace access communication paths between the roles and the plurality of resources based on the number R role-to-resource mappings; and
construct a compact access network graph that graphically depicts access links along the traced access communication paths as edges between nodes representing the roles and the plurality of resources.

5. The system of claim 1, wherein a particular role-to-resource mapping in the number R role-to-resource mappings maps a particular role to a particular subset of resources in the plurality of resources.

6. The system of claim 5, wherein the accumulation logic is configured to:
detect a new resource assigned the particular role; and
automatically map the detected new resources to the particular subset of resources.

7. The system of claim 6, wherein the compact access network graph is graphically updated to reflect the automatic mapping between the new resource, the particular role, and the particular subset of resources.

8. The system of claim 1, further configured to track a history of anomalous states detected for resources in the plurality of resources.

9. The system of claim 8, wherein the history of anomalous states is tracked over a timeline.

10. The system of claim 8, wherein the history of anomalous states is tracked as a diff between a non-anomalous state and a successive anomalous state.

11. The system of claim 8, wherein the history of anomalous states is tracked as a diff between successive anomalous states.

12. The system of claim 11, wherein the history of anomalous states is tracked as a diff between successive versions of the resources.

13. The system of claim 12, wherein respective versions of the resources are determined from respective configurations of the resources.

14. The system of claim 8, wherein the anomalous states are manually triggered.

15. The system of claim 8, wherein the anomalous states are programmatically triggered.

16. The system of claim 8, wherein the history of anomalous states, the timeline, and the diff are graphically generated with a play back feature and a play forward feature.

17. A computer-implemented method for streamlined analysis of access sub-networks in a cloud environment, the computer-implemented method comprising: identifying access sub-networks in a cloud environment between a plurality of resources and a plurality of users, wherein a subject access, sub-network makes a subject resource accessible to one or more users; obtaining user-to-role mappings for roles assigned to the plurality of users, wherein the roles are defined at a resolution of the cloud environment; traversing the access sub-networks to build a number U user-to-resource mappings between the plurality of users and the plurality of resources; and evaluating the U user-to-resource mappings against the user-to-role mappings to accumulate a number R role-to-resource mappings between the roles and the plurality of resources, wherein $R \ll U$.

18. A system for streamlined analysis of access sub-networks in a cloud environment, comprising: memory storing access sub-networks in a cloud environment between a plurality of storage resources and a plurality of compute resources, wherein a subject access sub-network makes a subject storage resource accessible to one or more compute resources; memory storing compute resource-to-role mappings for roles assigned to the plurality of compute resources, wherein the roles are defined at a resolution of the cloud environment; and accumulation logic, having access to the access sub-networks and to the compute resource-to-role mappings, and configured to traverse the access sub-networks to build a number U compute resource-to-storage resource mappings between the plurality of compute resources and the plurality of storage resources, and to evaluate the number U compute resource-to-storage resource mappings against the compute resource-to-role mappings to accumulate a number R role-to-storage resource mappings between the roles and the plurality of storage resources, wherein R<<U.

* * * * *